US011107287B2

(12) United States Patent
Ikeda et al.

(10) Patent No.: US 11,107,287 B2
(45) Date of Patent: Aug. 31, 2021

(54) INFORMATION PROCESSING APPARATUS AND INFORMATION PROCESSING METHOD

(71) Applicant: SONY CORPORATION, Tokyo (JP)

(72) Inventors: Tetsuo Ikeda, Tokyo (JP); Takayuki Sakamoto, Kanagawa (JP); Takuo Ikeda, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/651,377

(22) PCT Filed: Aug. 22, 2018

(86) PCT No.: PCT/JP2018/031018
§ 371 (c)(1),
(2) Date: Mar. 27, 2020

(87) PCT Pub. No.: WO2019/069575
PCT Pub. Date: Apr. 11, 2019

(65) Prior Publication Data
US 2020/0294316 A1    Sep. 17, 2020

(30) Foreign Application Priority Data
Oct. 5, 2017 (JP) .............................. JP2017-195347

(51) Int. Cl.
*G06T 19/00* (2011.01)
*G06F 3/0481* (2013.01)
*G06T 19/20* (2011.01)

(52) U.S. Cl.
CPC ........ *G06T 19/006* (2013.01); *G06F 3/04815* (2013.01); *G06T 19/20* (2013.01); *G06T 2200/24* (2013.01); *G06T 2219/2004* (2013.01)

(58) Field of Classification Search
CPC ... G06T 19/006; G06T 19/20; G06T 2200/24; G06T 2219/2004; G06F 3/04815
See application file for complete search history.

(56) References Cited

U.S. PATENT DOCUMENTS

2012/0216149 A1    8/2012  Kang et al.
2015/0332075 A1*  11/2015  Burch ................... G06F 3/0425
                                                              345/156
(Continued)

FOREIGN PATENT DOCUMENTS

CN      107615214 A     1/2018
JP      2013-164697 A   8/2013
(Continued)

OTHER PUBLICATIONS

International Search Report and Written Opinion of PCT Application No. PCT/JP2018/031018, dated Oct. 2, 2018, 10 pages of ISRWO.

*Primary Examiner* — Chong Wu
(74) *Attorney, Agent, or Firm* — Chip Law Group

(57) ABSTRACT

An information processing apparatus includes an acquisition unit that acquires three-dimensional information on a real object including one or more real objects. The information processing apparatus further includes a control unit that controls a method of interaction between a user and a virtual object mapped and displayed on a surface of the real object, based on the three-dimensional information on the real object.

27 Claims, 58 Drawing Sheets

(56) References Cited

U.S. PATENT DOCUMENTS

2016/0055675 A1* 2/2016 Kasahara ................ G06F 3/011
                                                      345/633
2017/0168651 A1* 6/2017 Ikeda .................. G06F 3/04812
2018/0096536 A1* 4/2018 Goto ........................ G06T 7/74
2018/0150186 A1* 5/2018 Norieda ............. G02B 27/0172

FOREIGN PATENT DOCUMENTS

| | | | |
|---|---|---|---|
| JP | 2013206322 A * | 10/2013 | ........... G06T 19/006 |
| JP | 2014-238828 A | 12/2014 | |
| JP | 2016-051436 A | 4/2016 | |
| JP | 2016051436 A * | 4/2016 | ......... G06F 3/04883 |
| KR | 10-2012-0095247 A | 8/2012 | |
| WO | 2016/185845 A1 | 11/2016 | |
| WO | 2017/163720 A1 | 9/2017 | |

* cited by examiner

FIG.27
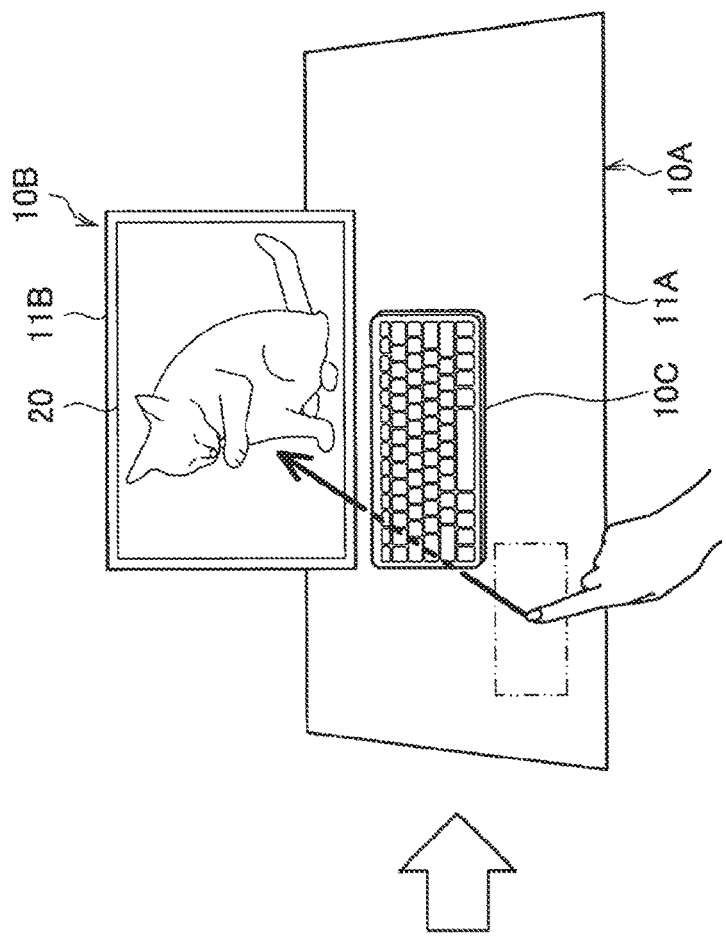
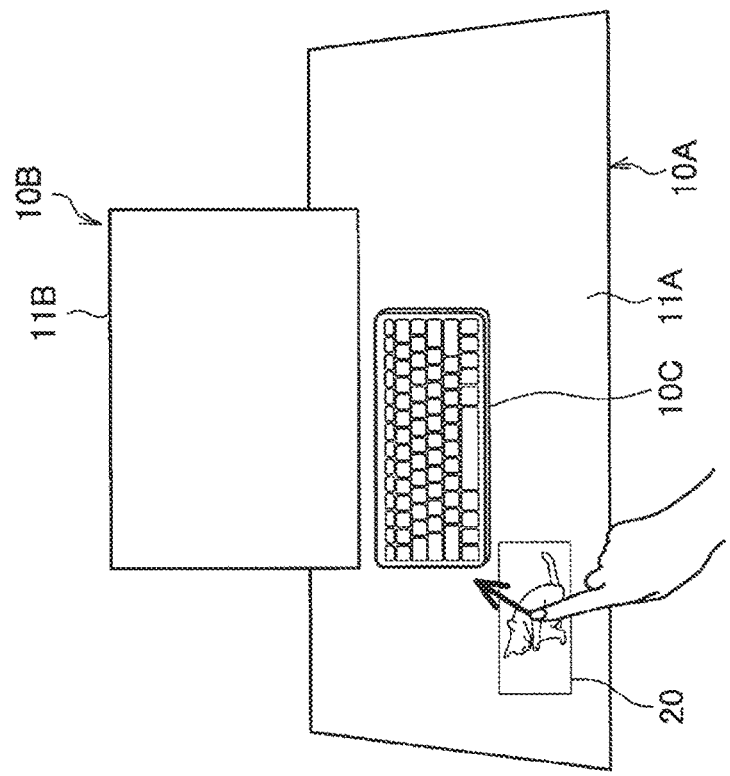

FIG.32
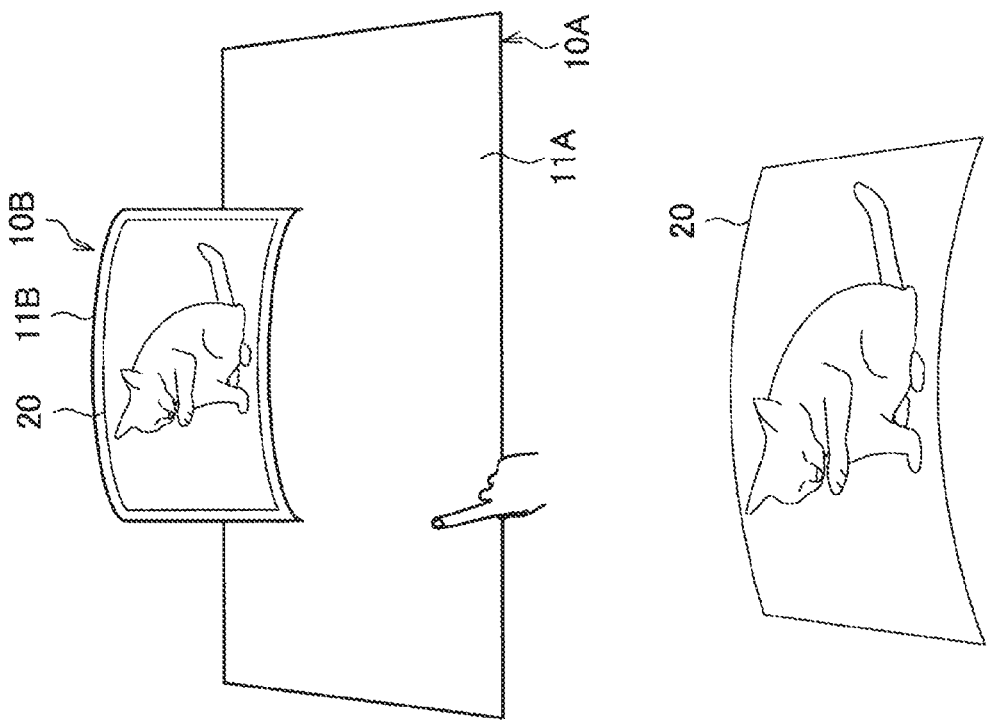
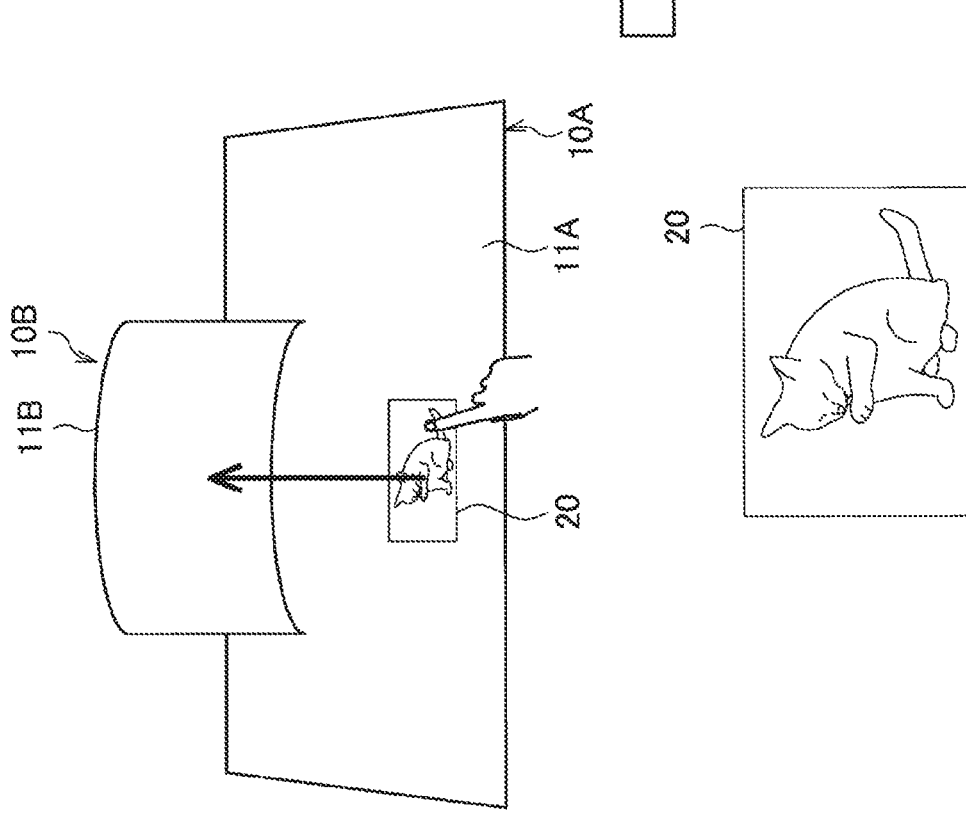

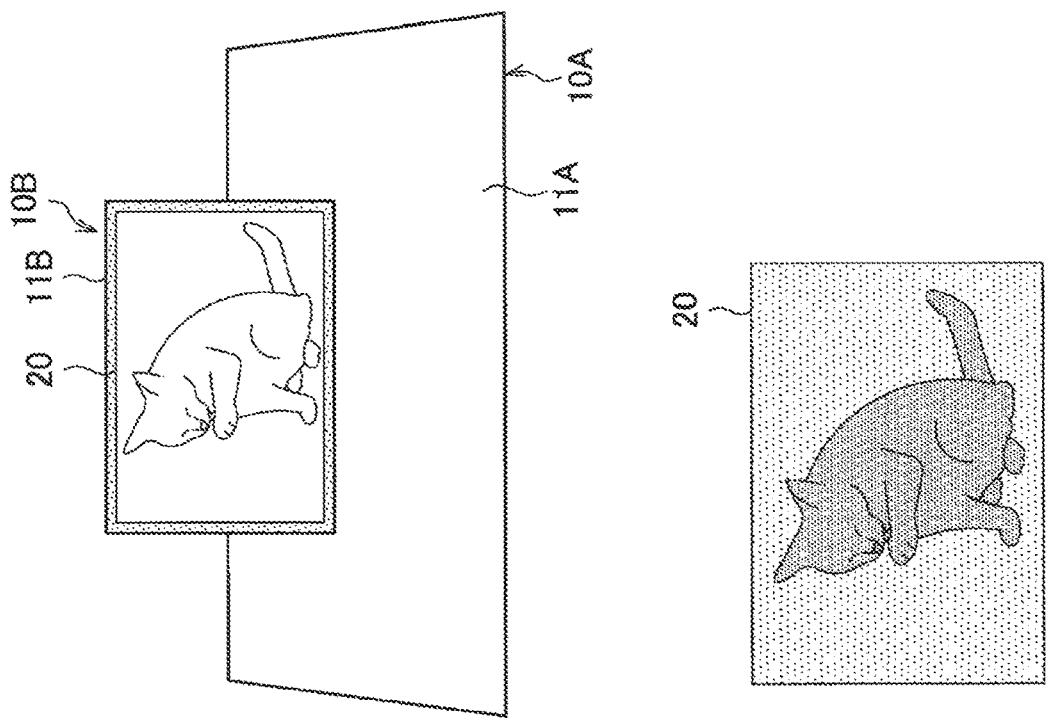
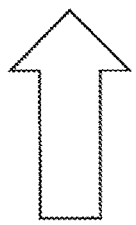
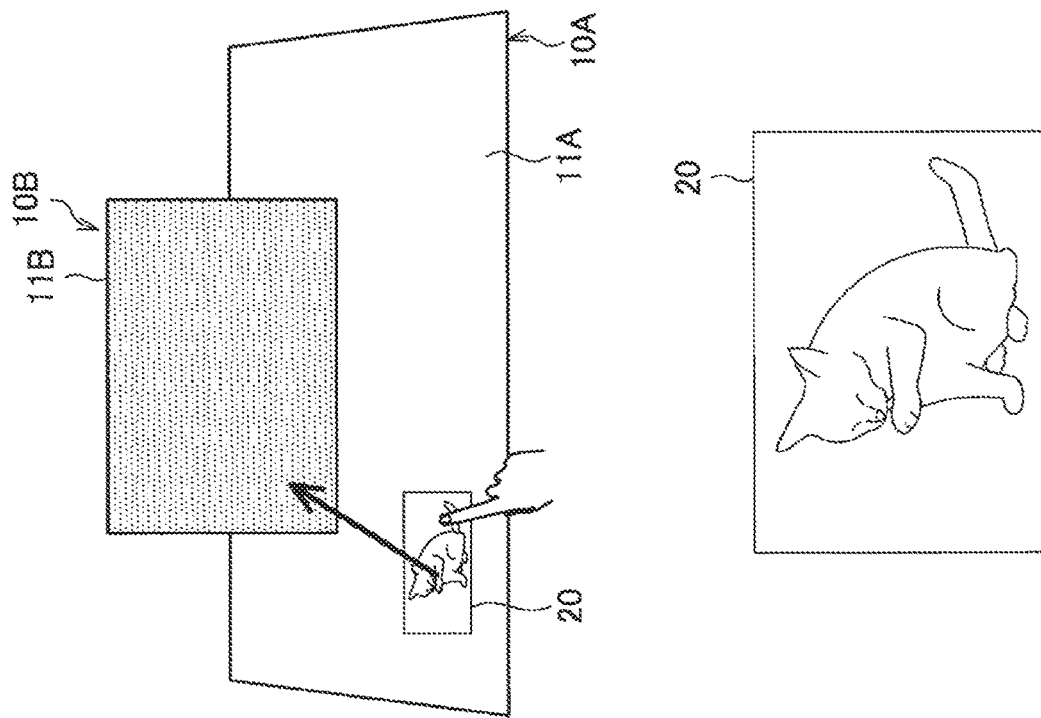
FIG.35

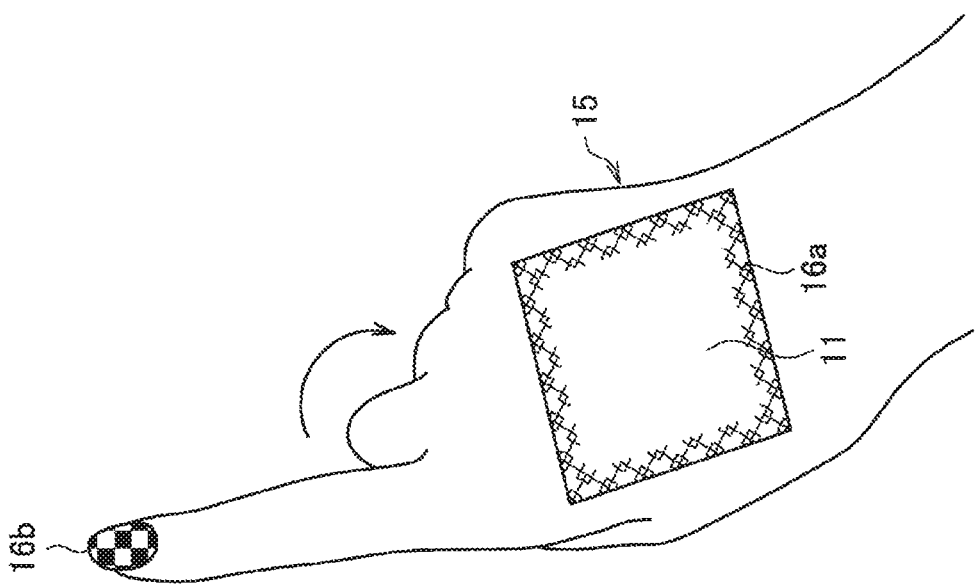
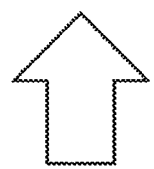
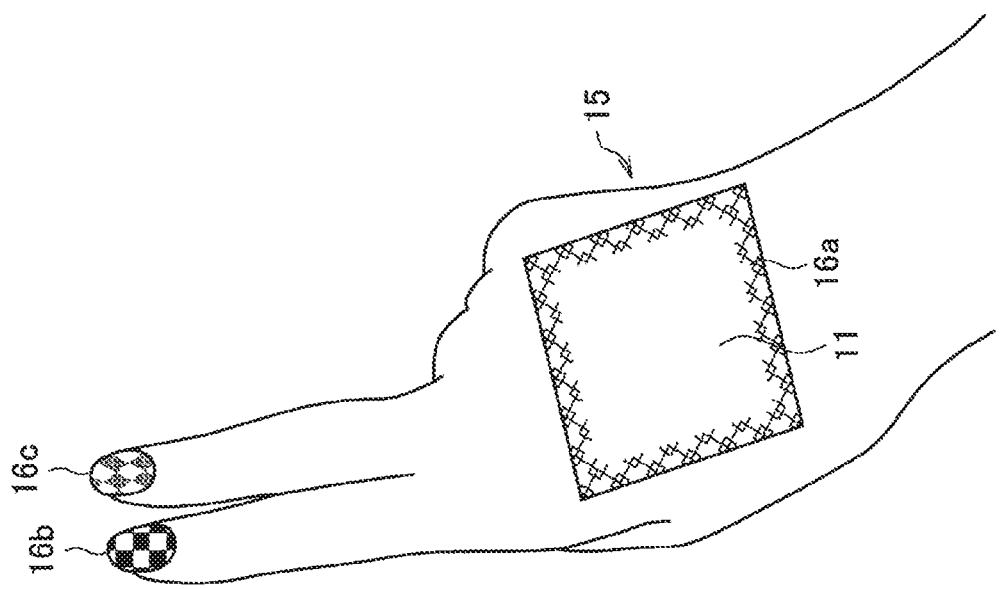
FIG.57

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/031018 filed on Aug. 22, 2018, which claims priority benefit of Japanese Patent Application No. JP 2017-195347 filed in the Japan Patent Office on Oct. 5, 2017. Each of the above-referenced applications is hereby incorporated herein by reference in its entirety.

FIELD

The present disclosure relates to an information processing apparatus, an information processing method, and a program.

BACKGROUND

Recent development of information communication techniques has entailed research and development of various interfaces for controlling apparatuses. Such interfaces include one that is provided via a displayed virtual object.

For example, Patent Literature 1 listed below discloses a technique for performing display control for moving a virtual object so as to avoid a real object located on a display surface. Furthermore, Patent Literature 2 listed below discloses a technique of calculating relative positions of a target real object and a display device that displays a virtual object, to easily arrange the virtual object, corresponding to the target real object, in an Augmented Reality (AR) space.

CITATION LIST

Patent Literature

Patent Literature 1: JP 2016-51436 A
Patent Literature 2: JP 2013-164697 A

SUMMARY

Technical Problem

However, the techniques disclosed in the above-mentioned patent literature have quite recently been developed, and still have room for improvement in terms of usability of the interface provided via a displayed virtual object.

In view of this, the present disclosure provides a mechanism for further improving the usability of an interface provided via a displayed virtual object.

Solution to Problem

According to the present disclosure, an information processing apparatus is provided that includes: an acquisition unit that acquires three-dimensional information on a real object including one or more real objects; and a control unit that controls a method of interaction between a user and a virtual object mapped and displayed on a surface of the real object, based on the three-dimensional information on the real object.

Moreover, according to the present disclosure, an information processing method executed by a processor is provided that includes: acquiring three-dimensional information on a real object including one or more real objects; and controlling a method of interaction between a user and a virtual object mapped and displayed on a surface of the real object, based on the three-dimensional information on the real object.

Moreover, according to the present disclosure, a program is provided that causes a computer to function as: an acquisition unit that acquires three-dimensional information on a real object including one or more real objects; and a control unit that controls a method of interaction between a user and a virtual object mapped and displayed on a surface of the real object, based on the three-dimensional information on the real object.

Advantageous Effects of Invention

As described above, with the present disclosure, it is possible to further improve the usability of the interface provided via the displayed virtual object. Note that the advantageous effects described above are not necessarily limiting, and any of the effects illustrated in the present specification or other effects that can be learned from the present specification may be achieved in addition to or in place of the advantageous effects described above.

BRIEF DESCRIPTION OF DRAWINGS

FIG. 27 is a diagram illustrating a specific example of the display control process based on a user operation for designating a movement direction according to the embodiment.

FIG. 32 is a diagram illustrating a specific example of the coordinate correction process according to the embodiment.

FIG. 35 is a diagram illustrating a specific example of a color correction process according to the embodiment.

FIG. 57 is a diagram illustrating a specific example of display control based on relative positions of markers according to the embodiment.

DESCRIPTION OF EMBODIMENTS

Figure 1:
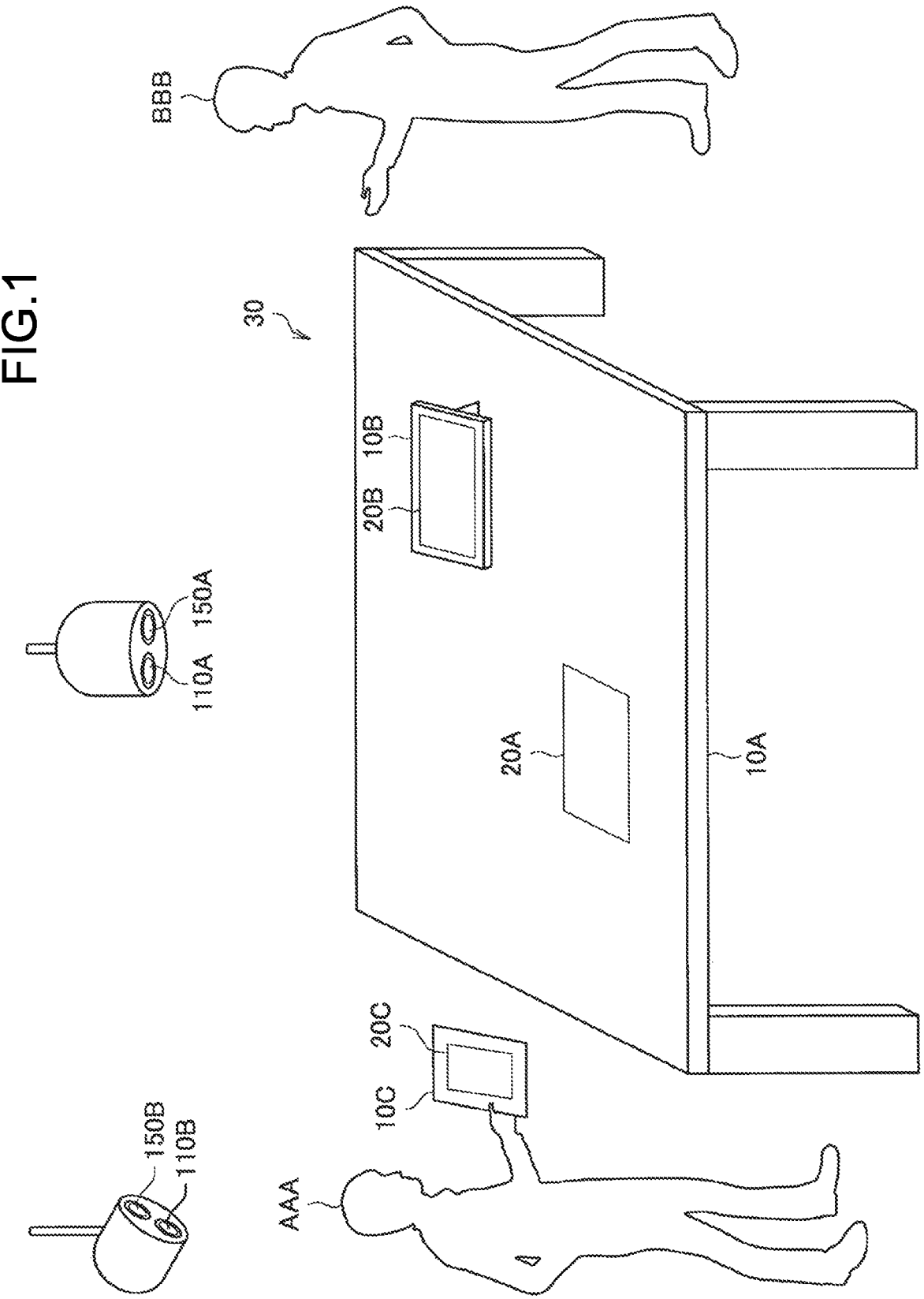
FIG. 1 is a diagram illustrating an example of a configuration of an information processing system according to an embodiment of the present disclosure.

Hereinafter, preferred embodiments of the present disclosure will be described in detail with reference to the accompanying drawings. In the present specification and the drawings, components having substantially the same functional configuration will be denoted with the same reference numerals and redundant description will be omitted.

The description will be made in the following order.
1. Overview
2. Configuration Example
3. First Embodiment
4. Second Embodiment
5. Hardware Configuration Example

1. Overview

First of all, an overview of an information processing system according to an embodiment of the present disclosure will be described with reference to FIG. 1. FIG. 1 is a diagram illustrating an example of a configuration of an information processing system according to an embodiment of the present disclosure.

Referring to FIG. 1, an information processing system 100 according to an embodiment of the present disclosure includes an input unit 110 (110A and 110B) and an output unit 150 (150A and 150B). The input unit 110 and the output unit 150 are installed in a real space (physical space) 30.

The real space 30 is a real space in which a user (AAA, BBB) can operate. The real space 30 may be a closed space such as indoors, or may be an open space such as outdoors. One space (for example, one room) may be regarded as one real space, or a plurality of spaces (for example, the internal space of a house having a plurality of rooms and the like) may be collectively regarded as one real space.

The output unit 150 is a device that maps and displays a virtual object (hereinafter, also referred to as a display object) indicating various types of information on an arbitrary surface of the real space 30, thereby visually notifying the users of the information. As the output unit 150, for example, a projector is used. In the example illustrated in FIG. 1, the output unit 150 is suspended from the ceiling to be disposed above the real space 30, for example, and projects a display object 20 (20A to 20C) on a surface of a real object 10 (10A to 10C). In the example illustrated in FIG. 1, an output unit 150A projects a display object 20A on a table 10A, and projects a display object 20B on a surface of a real object 10B placed on the table 10A. An output unit 150B projects a display object 20C onto a surface of a real object 10C held by a user AAA.

The display object is any information displayed by the information processing system 100. The display object may include a content such as an image (still image/movie), an operation interface such as an on-screen keyboard, an application screen, and the like.

The input unit 110 is a device that inputs information on the real space 30 and information on the users. In the example illustrated in FIG. 1, the input unit 110 is provided above the real space 30 in a state of being suspended from, for example, the ceiling. The input unit 110 may be an imaging device that targets the real space 30 as an imaging target. In addition, as the input unit 110, for example, a camera that captures an image with one lens, a stereo camera that can acquire information in the depth direction by capturing images with two lenses, or the like can be used.

The information processing system 100 can acquire information inside the real space 30 by analyzing captured images captured by the imaging device. The information inside the real space 30 is information on the shape, position, and orientation of the real object 10 existing in the real space 30, and information on the position, orientation, and operation of the user. In particular, when a stereo camera is used as the input unit 110, the information processing system 100 can acquire a map of distances from the input unit 110 (that is, depth information) by analyzing the captured images. Then, based on the depth information, the information processing system 100 compares the depth information of a real object with the depth information of a user's hand, for example, thereby being able to detect the user's hand touching or approaching the real object and the user's hand leaving the real object.

In the present embodiment, the position of an operation tool (for example, the user's hand) on the display object 20 is detected based on the images captured by the input unit 110, and various types of information are input based on the detected position of the operation tool. That is, the user can perform various operation inputs by moving the operation tool on the display object 20. For example, when a user's hand in contact with the display object 20 is detected, an operation input to the display object 20 is performed. In the following description, a case where a user's hand is used as an operation tool will be described as an example, but the present embodiment is not limited to this example, and various operation members such as a stylus may be used as the operation tool.

Here, the present embodiment is not limited to such an example, and the user's operation input may be executed by another method. For example, a touch panel may be provided on the surface of the real object 10 as the input unit 110, and a user operation input may be detected by contact of the user's fingers or the like on the touch panel. Furthermore, not only operations on the display object but also voice input or the like may be used.

The information processing system 100 can output information using an arbitrary location in the real space 30 as the output location. For example, the information processing system 100 can project the display object 20 not only on the table 10A but also on the real object 10C held by the user. For example, when what is called a moving projector is used as the output unit 150, the information processing system 100 provides the control of the output location by changing the projection direction of the moving projector. Alternatively, when a fixed projector is used as the output unit 150, the information processing system 100 selects a projector that can perform projection on a desired location from a plurality of projectors, whereby control of the output location may be provided. The information processing system 100 can input information on an arbitrary location by making the input unit 110 in the same manner. The information processing system 100 can thus output information to an arbitrary location in the real space 30, and can also detect a user input to a screen output to an arbitrary location.

The configuration of the information processing system 100 according to the present embodiment has been described above.

2. Configuration Example

Figure 2:
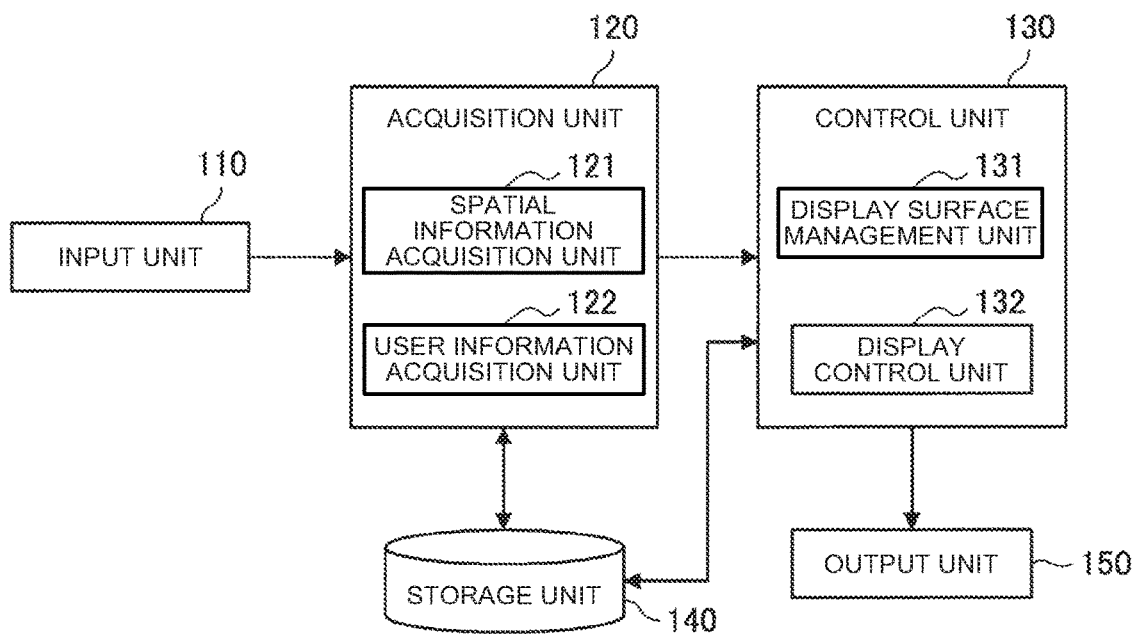
FIG. 2 is a block diagram illustrating an example of a configuration of the information processing system according to the embodiment.

FIG. 2 is a block diagram illustrating an example of a configuration of the information processing system 100 according to the present embodiment. As illustrated in FIG. 2, the information processing system 100 includes the input unit 110, an acquisition unit 120, a control unit 130, a storage unit 140, and the output unit 150. Note that the information processing system 100 may be implemented as a single device or may be implemented as a plurality of devices.

(1) Input Unit 110

The input unit 110 has a function of inputting information on users or the real space. The input unit 110 can be implemented by various devices.

For example, the input unit 110 may include an imaging device. The imaging device includes a lens system, a drive system, and an imaging sensor, and captures images (still images or moving images).

For example, the input unit 110 may include a depth sensor. The depth sensor is a device that acquires depth information of an infrared distance measuring device, an ultrasonic distance measuring device, a time of flight (ToF) distance measuring device, a laser imaging detection and ranging (LiDAR), a stereo camera, or the like.

For example, the input unit 110 may include a sound collection device (microphone). The sound collection device is a device that collects surrounding sounds and outputs voice data converted into digital signals via an amplifier and an analog digital converter (ADC).

For example, the input unit 110 may include an inertial sensor. An inertial sensor is a device that detects inertial information such as acceleration or angular velocity. The inertial sensor is attached to a user, for example.

For example, the input unit 110 can be implemented as a biosensor. The biosensor is a device that detects biological information such as a user's heartbeat or body temperature. The biosensor is attached to a user, for example.

For example, the input unit 110 may include an environmental sensor. The environmental sensor is a device that detects environmental information such as lightness, temperature, humidity, or atmospheric pressure of the real space.

For example, the input unit 110 may include a device that inputs information based on physical contact with a user. Examples of such a device include a mouse, a keyboard, a touch panel, a button, a switch, and a lever. These devices can be mounted on a terminal device such as a smartphone, a tablet terminal, or a personal computer (PC).

For example, the input unit 110 can be implemented as a wireless communication device. The wireless communication device conforms to wireless communication standards such as wireless local area network (LAN), Wi-Fi (registered trademark), Bluetooth (registered trademark), Zigbee (registered trademark), or near field communication (NFC), and is capable of communicating with other devices.

The input unit 110 inputs information based on control by the acquisition unit 120. For example, the acquisition unit 120 can control the magnification ratio and the imaging direction of the imaging device.

The input unit 110 may include one of or a combination of a plurality of the above-described input devices, or may include a plurality of input devices of the same type.

(2) Acquisition Unit 120

The acquisition unit 120 has a function of acquiring information in the real space from the input information input using the input unit 110. As illustrated in FIG. 2, the acquisition unit 120 includes a spatial information acquisition unit 121 and a user information acquisition unit 122. The spatial information acquisition unit 121 has a function of acquiring information on the real space (hereinafter also referred to as spatial information). The user information acquisition unit 122 has a function of acquiring user information (hereinafter also referred to as user information). The acquisition unit 120 outputs the acquired spatial information and user information to each of the display surface management unit 131, the storage unit 140, and the display control unit 132.

Spatial Information

The spatial information acquisition unit 121 acquires spatial information based on the information input by the input unit 110. Hereinafter, the spatial information will be described.

The spatial information may include three-dimensional information indicating the type or the shape of a real object existing in the real space, and information indicating the position and the orientation. For example, the spatial information acquisition unit 121 acquires such pieces of information by performing image recognition on a captured image and analysis on depth information. Furthermore, the spatial information acquisition unit 121 may acquire these pieces of information based on user input.

The spatial information can include three-dimensional information indicating the shape of the space. The three-dimensional information indicating the shape of the space is information indicating the shape of the space defined by a real object existing in the real space. For example, the spatial information acquisition unit 121 acquires three-dimensional information indicating the shape of the space, based on the depth information. When the information indicating the type, the shape, the position, the type, and the orientation of a real object in the real space is acquirable, the spatial information acquisition unit 121 may acquire the three-dimensional information indicating the shape of the space while taking such information into consideration.

The spatial information may include information such as the material, color, or texture of the surface forming the space (that is, the surface of the real object existing in the real space). For example, the spatial information acquisition unit 121 acquires these pieces of information by recognizing captured images. When the information indicating the type, the shape, the position, and the orientation of a real object in the real space is acquirable, the spatial information acquisition unit 121 may acquire these pieces of information while taking such information into consideration.

The spatial information may also include information on a state inside a real space, such as the lightness, temperature, and humidity of the real space. For example, the spatial information acquisition unit 121 acquires these pieces of information, based on the environment information.

The spatial information includes at least one type of the information described above.

User Information

The user information acquisition unit 122 acquires user information based on the information input by the input unit 110. Hereinafter, the user information will be described.

The user information may include whether a user exists in the real space, the number of users existing in the real space, and identification information of each user. For example, the user information acquisition unit 122 acquires these pieces of information by recognizing the face portion of the user included in captured images.

The user information may include user attribute information. The attribute information is information indicating user attributes such as age, sex, work, family structure, or friendship. For example, the user information acquisition unit 122 acquires user attribute information, based on captured images or by making an inquiry to a database storing the attribute information using the user identification information.

The user information may include information indicating the position of the user. For example, the user information acquisition unit 122 acquires information indicating the position of the user, based on captured images and the depth information.

The user information may include information indicating the orientation of the user. For example, the user information acquisition unit 122 acquires information indicating the orientation of the user, based on captured images, the depth information, and the inertia information. The orientation of the user may refer to the orientation of the whole body such as pausing, standing, sitting, or lying down, or the orientation of a partial body such as face, torso, hand, foot, or fingers.

The user information may include information indicating the user's action. For example, the user information acquisition unit 122 may recognize the user's action in an arbitrary method, such as an optical method using an imaging device or both an imaging device and a marker, an inertial sensor method using an inertial sensor attached to the user, or a method using the depth information, thereby acquiring the information indicating the user's action. The user's action may refer to an action using the whole body such as movement, or an action using a part of the body such as a hand gesture. In addition, as the user information, a user input on a screen mapped and displayed on an arbitrary surface of the real space as described above with reference to FIG. 1 is also acquired as the information indicating the user's action.

The user information may include information input by the user by voice. For example, the user information acquisition unit 122 can acquire such information by recognizing the speech of the user.

The user information includes at least one type of the information described above.

(3) Control Unit 130

The control unit 130 controls the overall operation of the information processing system 100 as a whole. As illustrated in FIG. 2, the control unit 130 includes a display surface management unit 131 and a display control unit 132.

Display Surface Management Unit 131

The display surface management unit 131 manages the display surface in the real space on which the display object can be displayed. The display surface management unit 131 defines a surface satisfying a predetermined condition as the display surface, among the surfaces of the real object existing in the real space. Then, the display surface management unit 131 generates and updates various types of information on the display surface.

Display Control Unit 132

The display control unit 132 has a function of causing the output unit 150 to output information, based on the information acquired by the acquisition unit 120, the information managed by the display surface management unit 131, and the information stored in the storage unit 140.

For example, the display control unit 132 causes the display object to be displayed on the display surface. Specifically, the display control unit 132 causes the output unit 150 to map and display a display object on an arbitrary surface in the real space that is defined as the display surface. For example, when the output unit 150 is a projection device (projector), the display control unit 132 causes the projector to project a display object in a space in the real space. When the output unit 150 is a transmissive display, the display control unit 132 causes the transmissive display to display an Augmented Reality (AR) object in a space in the real space in a superimposed manner.

In particular, the display control unit 132 has a function of controlling a method of interaction between the user and the display object mapped and displayed on the surface of the real object, based on the three-dimensional information on the real object. For example, based on the three-dimensional information on the real object, the display control unit 132 performs control for enabling/disabling the interaction between the display object and the user, performs control to decide the display surface for displaying a display object, and controls the content of the display object. Thus, the optimal method for interaction is made available by the user based on the three-dimensional information on the real object, whereby the user can enjoy improved usability.

The display control unit 132 may cause the output unit 150 to output any other information such as auditory information, tactile information, or olfactory information in a space, in addition to the visual information.

The control of the output location can be provided, for example, by selecting an output device that outputs information from among a plurality of output devices different from each other in the installed location or the output direction. For example, the control of the display location is provided by selecting a projector that projects a display object from among a plurality of fixed projectors different from each other in the projection direction.

Control of the output location can be performed by causing the output device to change the output location. For example, the control of the output location related to visual information can be provided by, for example, driving a moving projector to change projection directions. Control of the output location related to auditory information can be provided, for example, by changing the directivity of a directional speaker, using an ultrasonic speaker, or using a wavefront synthesis technique.

(4) Storage Unit 140

The storage unit 140 has a function of temporarily or permanently storing information for the operation of the information processing system 100. For example, the storage unit 140 stores information on the display surface and information on the display object. The storage unit 140 constructs an information storage database (DB) including a display surface information accumulation table, a marker information accumulation table, and an event definition accumulation table described later.

(5) Output Unit 150

The output unit 150 is a device that outputs information to the users. The output unit 150 can be implemented by various devices.

The output unit 150 may include a display device that outputs visual information. The output unit 150 maps and outputs the visual information onto the surface of a real object. An example of this output unit 150 is a projection device (that is, a projector). The projector may be, for example, a fixed wide-angle projector, or what is called a moving projector including a movable part that can change the projection direction, such as a Pan/Tilt drive type. In addition, examples of the output unit 150 capable of mapping and outputting visual information onto the surface of a real object include devices such as a head mounted display (HMD) having a transmissive display. In a device having a transmissive display, an augmented reality (AR) object is superimposed and displayed on the surface of a real object. In the present embodiment, the output unit 150 that outputs visual information will be described as a projector.

The output unit 150 may include a voice output device that outputs auditory information. Examples of this output unit 150 include a speaker, a directional speaker, an earphone, and a headphone.

The output unit 150 may include a tactile output device that outputs tactile information. Examples of the tactile information include vibration, force sense, temperature, or electrical stimulation. Examples of the output unit 150 that outputs tactile information include a motor, an actuator, and a heat source.

The output unit 150 may include a device that outputs olfactory information. Examples of the olfactory information include a scent. Examples of the output unit 150 that outputs olfactory information include an aroma diffuser.

The output unit 150 outputs information based on the control by the display control unit 132. For example, the output unit 150 can change the projection direction of the moving projector or the directivity of the directional speaker, based on the control by the display control unit 132.

The output unit 150 may include one of or a combination of a plurality of the above-described output devices, or may include a plurality of output devices of the same type.

In particular, in the present embodiment, it is desirable that a plurality of output devices of the same type be installed in the real space with different installation locations or output directions. This is because it is possible to output the information using an arbitrary location in the real space as the output location.

3. First Embodiment

In a first embodiment, a surface of another real object placed on the real object used as the main display surface, is used as a sub display surface.

(1) Overall Process Flow

First of all, the overall process flow will be described with reference to FIG. 3.

Figure 3:
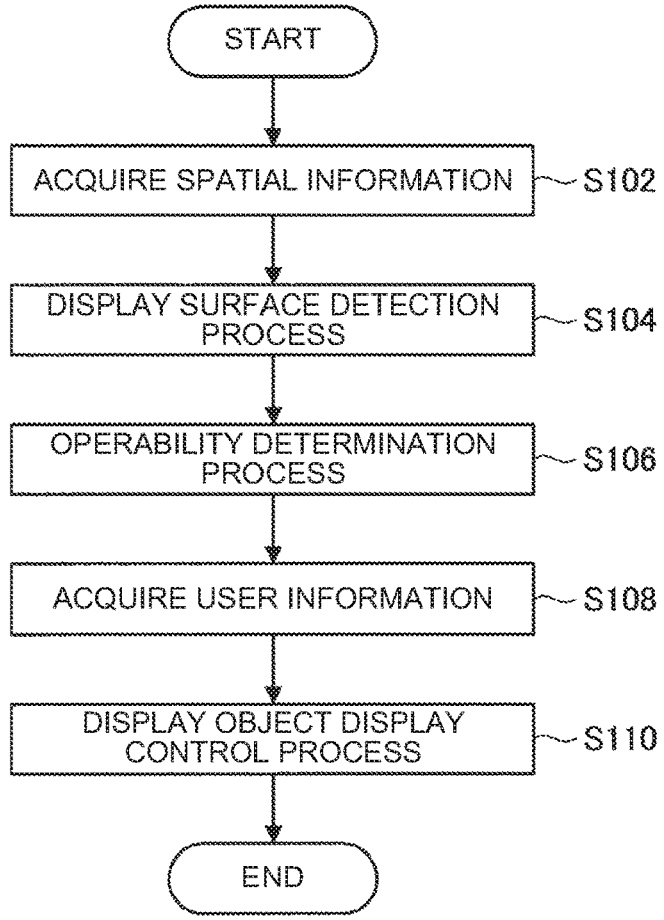
FIG. 3 is a flowchart illustrating an example of a flow of a display control process executed by an information processing system according to a first embodiment.

FIG. 3 is a flowchart illustrating an example of a flow of a display control process executed by the information processing system 100 according to the present embodiment. As illustrated in FIG. 3, the acquisition unit 120 first acquires the spatial information (Step S102). Next, the display surface management unit 131 executes a display surface detection process (Step S104). Next, the display surface management unit 131 executes operability determination process (Step S106). Next, the acquisition unit 120 acquires user information (Step S108). Then, the display control unit 132 executes a display object display control process (Step S110).

The display surface detection process, the operability determination process, and the display object display control process will be described in detail below.

(2) Display Surface Detection Process

The display surface detection process is a process of detecting a display surface on which the display object can be mapped and displayed, from surfaces of the real object.

The display surface management unit 131 detects a display surface on which the display object can be mapped and displayed from surfaces of the real object, based on at least one of the gradient, area, color, and lightness of the surfaces of the real object. For example, the display surface management unit 131 detects a surface (surface of the real object) that satisfies the following conditions, as a display surface. A first condition is that an angle formed between a plane orthogonal to the projection direction (optical axis) of the projector included in the output unit 150 and the target plane is 0 degrees (that is, orthogonal), or within a predetermined range enabling distortion correction. The surface gradient will be described later in detail with reference to FIG. 17 and the like. A second condition is that the area (size) of the target surface is equal to or greater than a predetermined threshold (first threshold). A third condition is that the color of the target surface is not a color unsuitable for projection, such as black or dark gray. A fourth condition is that the lightness of the target surface is below a predetermined threshold. The display surface management unit 131 detects a surface satisfying such conditions as a display surface. The display surface may be a flat surface or a curved surface. The display surface may be a continuous surface or two or more physically separated surfaces.

The display surface management unit 131 detects a first display surface with the largest area and a second display surface other than the first display surface as display surfaces. For example, in the example illustrated in FIG. 1, the display surface management unit 131 detects the top surface of the table 10A as the first display surface, and detects the surfaces of the real objects 10B and 10C facing the output unit 150 as the second display surfaces.

The display surface detection result is stored in the display surface information accumulation table. Table 1 below illustrates an example of items in the display surface information accumulation table.

TABLE 1

| Example of items in display surface information accumulation table | | | | |
|---|---|---|---|---|
| ID | Position | Size | Gradient | Operable flag |

In Table 1 illustrated above, "ID" indicates identification information on the display surface, "Position", "Size", and "Gradient" indicate the position, the size, and the gradient of the display surface, and "Operable flag" indicates whether an operational input on the display surface can be received.

The display surface detection process may include a first process related to the area and a second process related to the color and the lightness performed in this order. Hereinafter, each process will be described in detail.

(2.1) First Process

The first process is a process for detecting a surface that satisfies a predetermined condition regarding the area. The first process will be described below in detail. In the following description, the detection of the display surface and the displaying of the display object are assumed to be performed with reference to each pixel of the captured image captured by the input unit 110.

Process Flow

Figure 4:
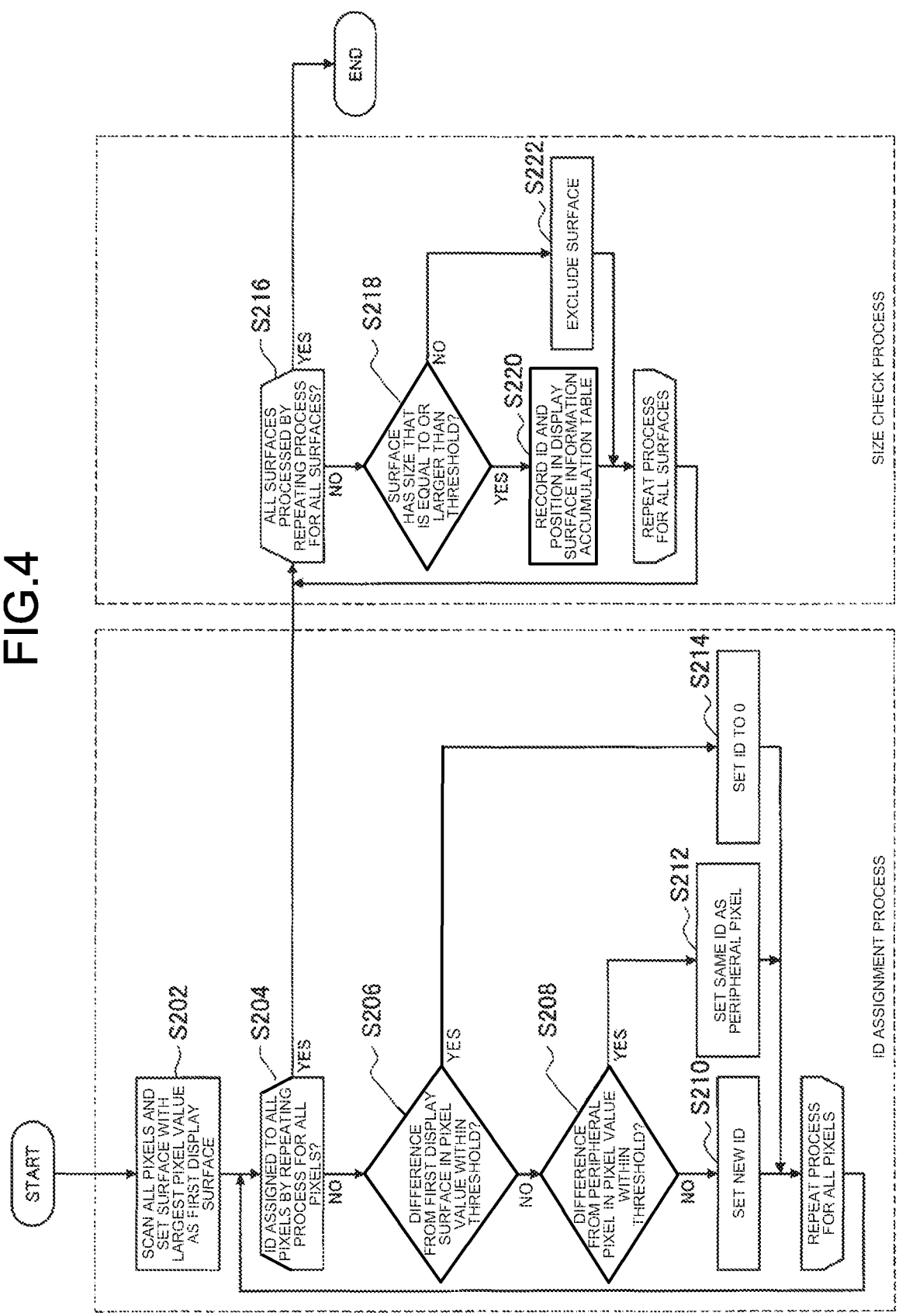
FIG. 4 is a flowchart illustrating an example of a flow of a first process of a display surface detection process executed by the information processing system according to the embodiment.

FIG. 4 is a flowchart illustrating an example of a flow of the first process of the display surface detection process executed by the information processing system 100 according to the present embodiment. The first process of the display surface detection process illustrated in FIG. 4 includes an ID assignment process and a size check process.

First of all, the display surface detection process will be described. First of all, the display surface management unit 131 scans all pixels and sets the surface having the largest pixel value as the first display surface (Step S202). This pixel value is a pixel value of a captured image captured by a stereo camera, and includes depth information. After that, the display surface management unit 131 determines whether IDs are assigned to all the pixels (Step S204). When there is a pixel that not assigned an ID yet (Step S204/NO), the following processes are performed while switching the target pixel. The display surface management unit 131 determines for the target pixel, whether the pixel value difference from the first display surface does not exceed a threshold (Step S206), and determines whether the pixel value difference from the peripheral pixel values does not exceed the threshold (Step S208). When it is determined that the two differences both exceed the threshold (Step S206/NO, Step S208/NO), the display surface management unit 131 sets a new ID for the target pixel. When it is determined that the former difference exceeds the threshold but the latter difference does not exceed the threshold (Step S206/YES, Step S208/NO), the display surface management unit 131 assigns the target pixel with the same ID as the peripheral pixels. When it is determined that the former difference does not exceed the threshold, the display surface management unit 131 sets the ID of the target pixel to 0. Note that the ID 0 corresponds to the first display surface. The display surface management unit 131 repeats the processes related to Steps S206 to S214 for all pixels. When IDs have been assigned to all the pixels (Step S204/YES), the process proceeds to the size check process.

Next, the size check process will be described. The display surface management unit 131 determines whether all the surfaces have been processed (Step S216). When there is a surface that has not been processed yet (Step S216/NO), the following processes are performed while switching the target surface. The display surface management unit 131 determines whether the size of the surface is equal to or larger than a threshold (Step S218). This surface is a set of pixels with the same ID. When it is determined that the size of the surface is equal to or larger than the threshold (Step S218/YES), the display surface management unit 131 records the ID and position of the target surface in the display surface information accumulation table (Step S220). On the other hand, when it is determined that the size of the surface is not equal to or greater than the threshold (Step S218/NO), the display surface management unit 131 excludes the target surface (Step S222). The display surface management unit 131 repeats the processes related to Steps S218 to S222 for all the surfaces (that is, for all the IDs). When all the surfaces have been processed (Step S216/YES), the process ends.

First Specific Example

Hereinafter, a first specific example related to the first process of the display surface detection process described above will be described with reference to FIGS. 5 to 8. Note that the coordinate axes in the present embodiment are defined by an X axis and a Y axis that are two-dimensional coordinate axes on a horizontal plane, and by a Z axis that is an axis orthogonal to the XY plane.

Figure 5:
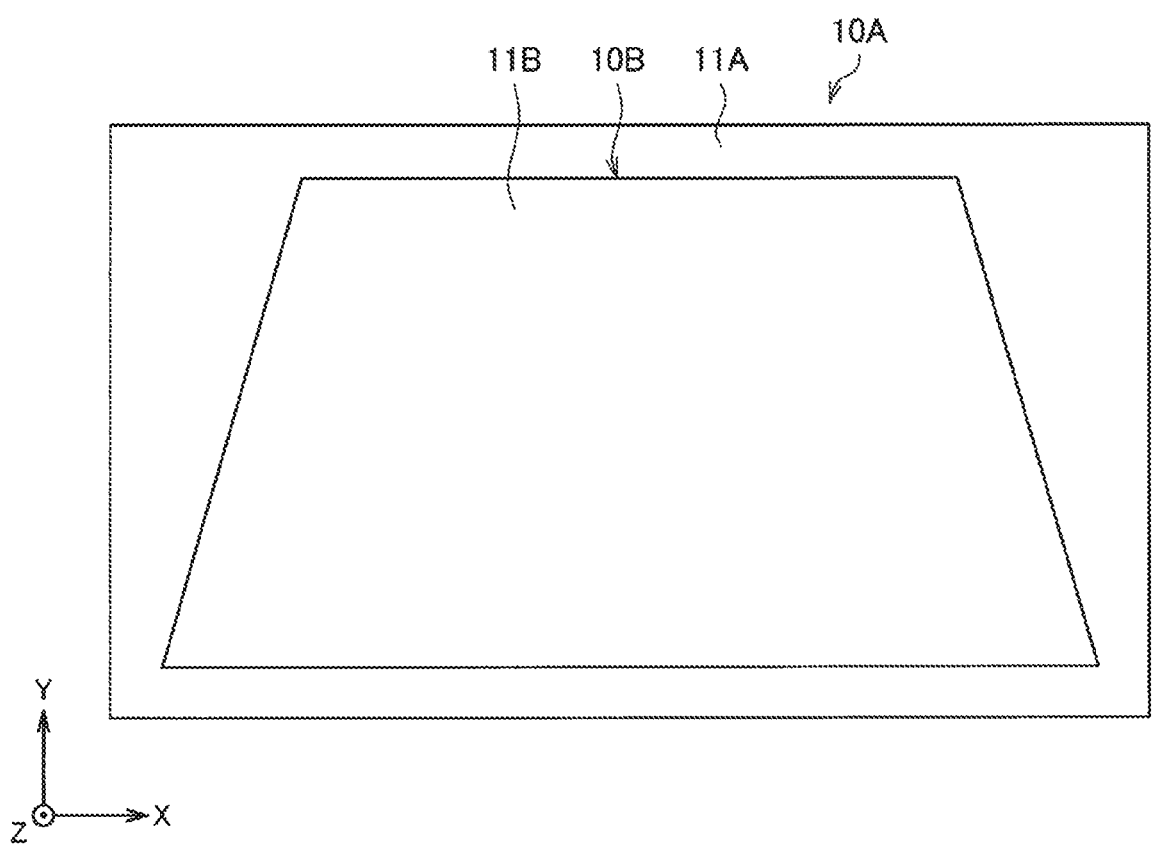
FIG. 5 is a diagram illustrating a first specific example related to the first process of the display surface detection process according to the embodiment.
Figure 6:
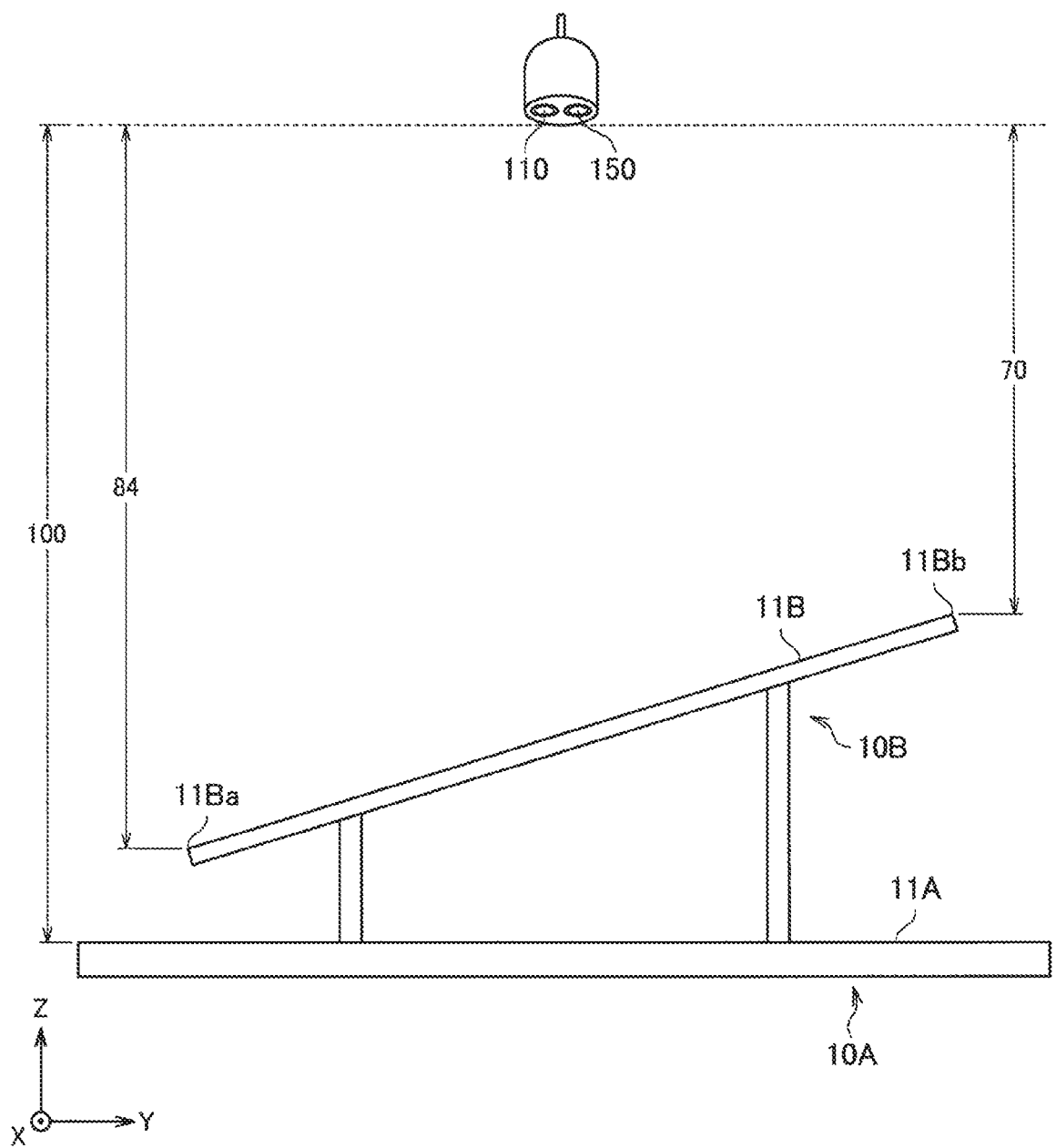
FIG. 6 is a diagram illustrating the first specific example related to the first process of the display surface detection process according to the embodiment.

FIGS. 5 to 8 are diagrams illustrating a first specific example related to the first process of the display surface detection process according to the present embodiment. As illustrated in FIG. 5, in this specific example, a real object 10B is placed on a table 10A. A top surface 11A of the table 10A and a top surface (inclined surface) 11B of the real object 10B face a +Z axis direction. FIG. 6 is diagram illustrating the table 10A and the real object 10B illustrated in FIG. 5 as viewed in a +X axis direction. As illustrated in FIG. 6, the top surface 11B of the real object 10B is inclined relative to the top surface 11A of the table 10A. The top surface 11A of the table 10A extends along the Y axis direction, with a Z axis distance from the top surface 11A of the table 10A to the input unit 110 and to the output unit 150 being 100 cm. A Z axis distance from an end portion 11Ba of the top surface 11B of the real object 10B on a −Y axis direction side to the input unit 110 and to the output unit 150 is 84 cm. A Z axis distance from an end portion 11Bb of the top surface 11B of the real object 10B on a +Y axis direction side to the input unit 110 and to the output unit 150 is 70 cm.

Figure 7:
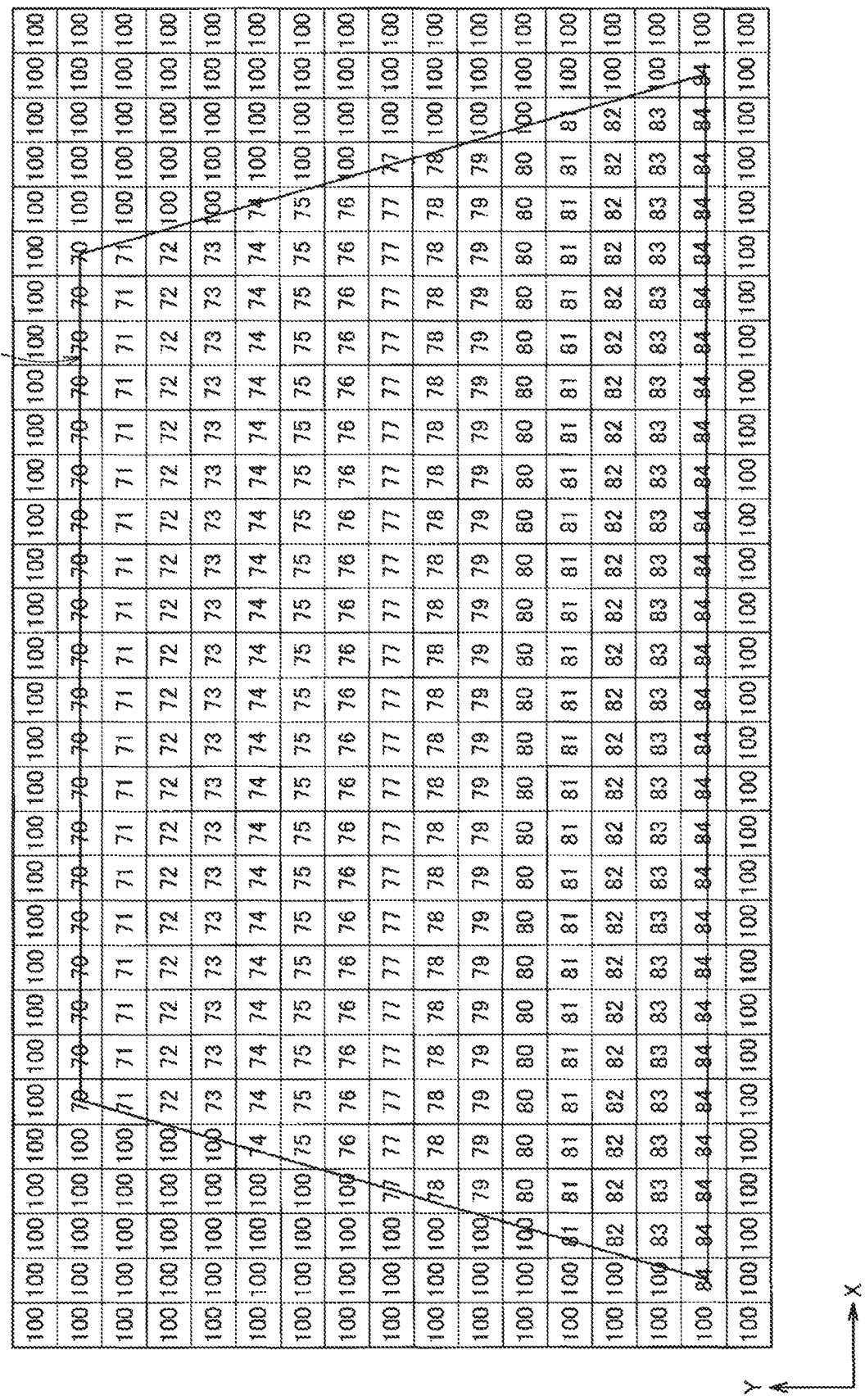
FIG. 7 is a diagram illustrating the first specific example related to the first process of the display surface detection process according to the embodiment.

FIG. 7 illustrates pixel values of pixels of the captured image, including depth information, obtained by the stereo camera included in the input unit 110. The pixel values illustrated in this figure indicate the distances from the surface of the real object corresponding to the pixels to the input unit 110 and to the output unit 150. As illustrated in FIG. 7, all the pixel values of pixels 13A corresponding to the top surface 11A of the table 10A are 100. The pixel values of pixels 13B corresponding to the top surface 11B of the real object 10B are uniform along the X direction, and decreases toward the +Y axis direction side.

Figure 8:
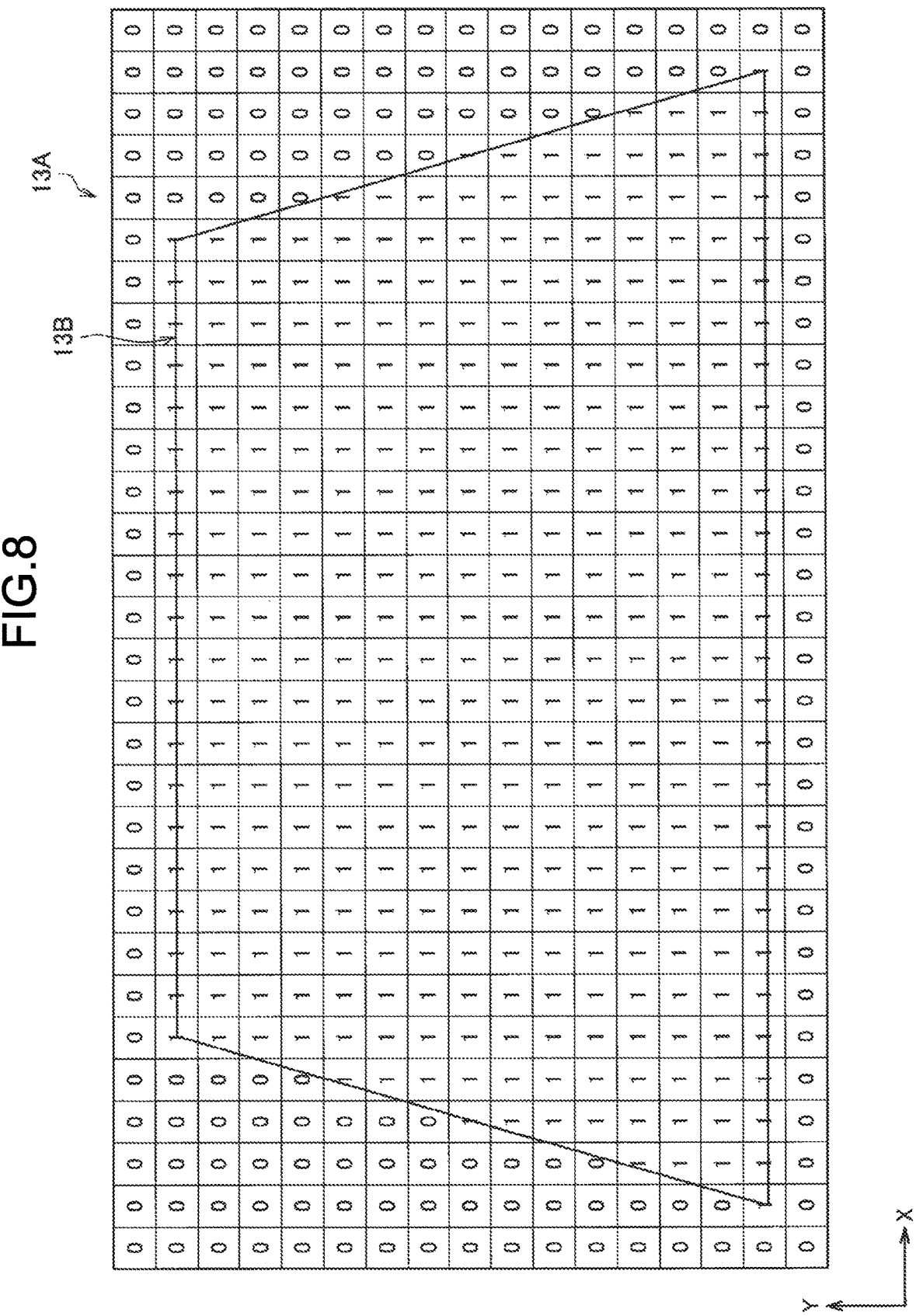
FIG. 8 is a diagram illustrating the first specific example related to the first process of the display surface detection process according to the embodiment.

FIG. 8 illustrates a result of the display surface detection process based on the pixel values illustrated in FIG. 7. As illustrated in FIG. 7, the rate of the pixel values of 100 is the highest. Thus, as illustrated in FIG. 8, the pixels 13A corresponding to the top surface 11A of the table 10A are detected as the first display surface, and have 0 as the ID. On the other hand, the pixels 13B corresponding to the top surface 11B of the real object 10B are different from the pixel values 100 of the first display surface by a difference exceeding a threshold, and are different from each other by a difference not exceeding the threshold. In this specific example, the threshold of the difference between pixel values is assumed to be 5. Thus, as illustrated in FIG. 8, the pixels 13B corresponding to the top surface 11B of the real object 11B are detected as the second display surface, and have 1 as the ID.

Table 2 below illustrates an example of information recorded in the display surface information accumulation table as a result of the process described above. The origin of the XY coordinates is assumed to be the center of the top surface 11A of the table 10A. Furthermore, in the information stored in the display surface information accumulation table described below, description of the first display surface is omitted.

TABLE 2

Example of display surface information accumulation table after first process of display surface detection process

| ID | Position | Size | Gradient | Operable flag |
|---|---|---|---|---|
| 1 | 0, 0 | | | |

Second Specific Example

Hereinafter, a second specific example related to the first process of the display surface detection process described above will be described with reference to FIGS. 9 to 12.

Figure 9:
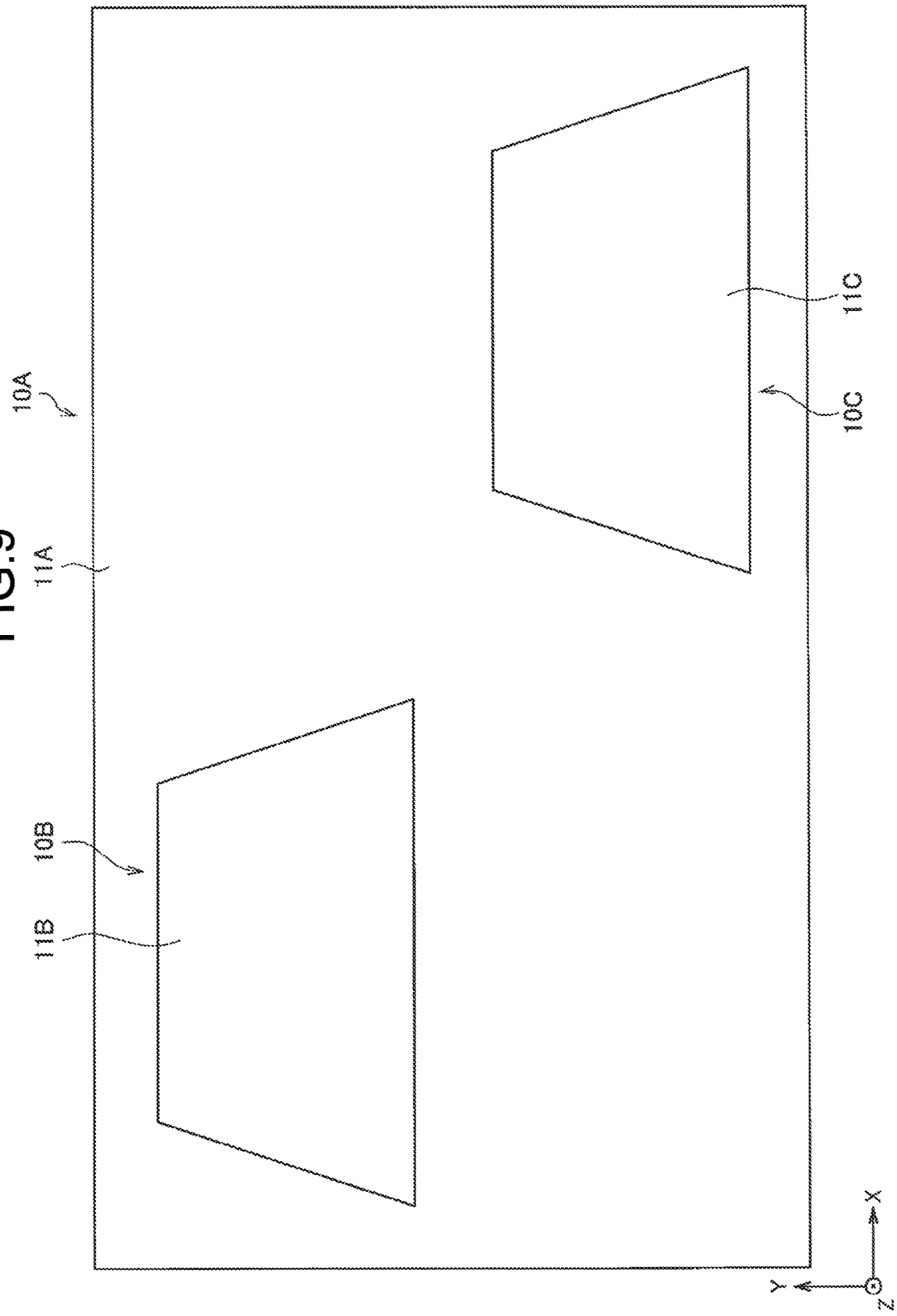
FIG. 9 is a diagram illustrating a second specific example related to the first process of the display surface detection process according to the embodiment.
Figure 10:
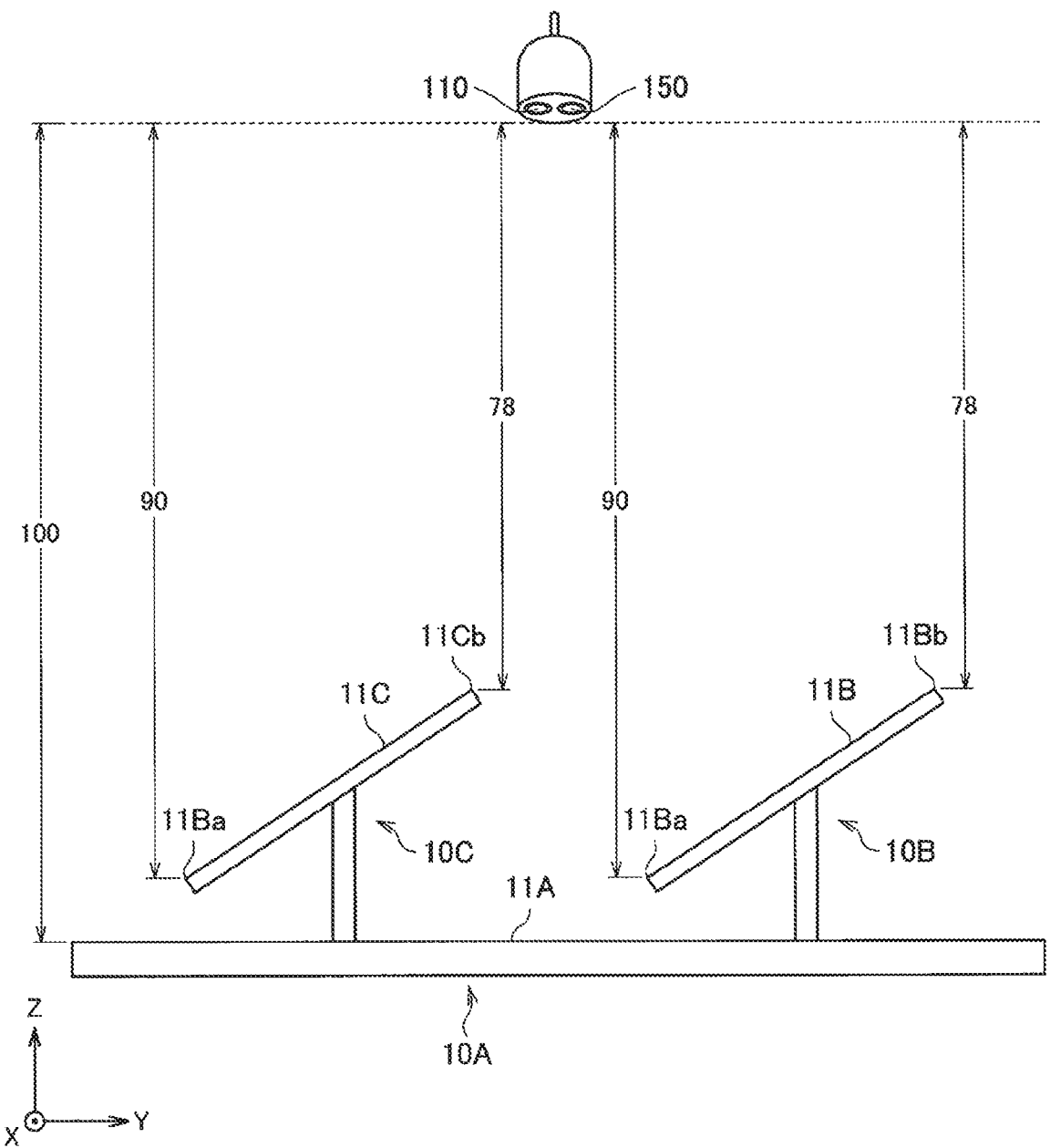
FIG. 10 is a diagram illustrating the second specific example related to the first process of the display surface detection process according to the embodiment.

FIGS. 9 to 12 are diagrams illustrating the second specific example related to the first process of the display surface detection process according to the present embodiment. As illustrated in FIG. 9, in this specific example, real objects 10B and 10C are placed on a table 10A. The top surface 11A of the table 10A, the top surface 11B of the real object 10B, and a top surface 11C of the real object 10C face the +Z axis direction side. FIG. 10 is diagram illustrating the table 10A and the real objects 10B and 10C illustrated in FIG. 9 as viewed in the +X axis direction. As illustrated in FIG. 10, the top surfaces 11B and 11C of the real objects 10B and 10C are inclined relative to the top surface 11A of the table 10A. The top surface 11A of the table 10A extends along the Y axis direction, with a Z axis distance from the top surface 11A of the table 10A to the input unit 110 and to the output unit 150 being 100 cm. A Z axis distance from end portions 11B$a$ and 11C$a$ of the top surfaces 11B and 11C of the real objects 10B and 10C on the −Y axis direction side to the input unit 110 and to the output unit 150 is 90 cm. A Z axis distance from end portions 11B$b$ and 11C$b$ of the top surfaces 11B and 11C of the real objects 10B and 10C on the +Y axis direction side to the input unit 110 and to the output unit 150 is 70 cm.

Figure 11:
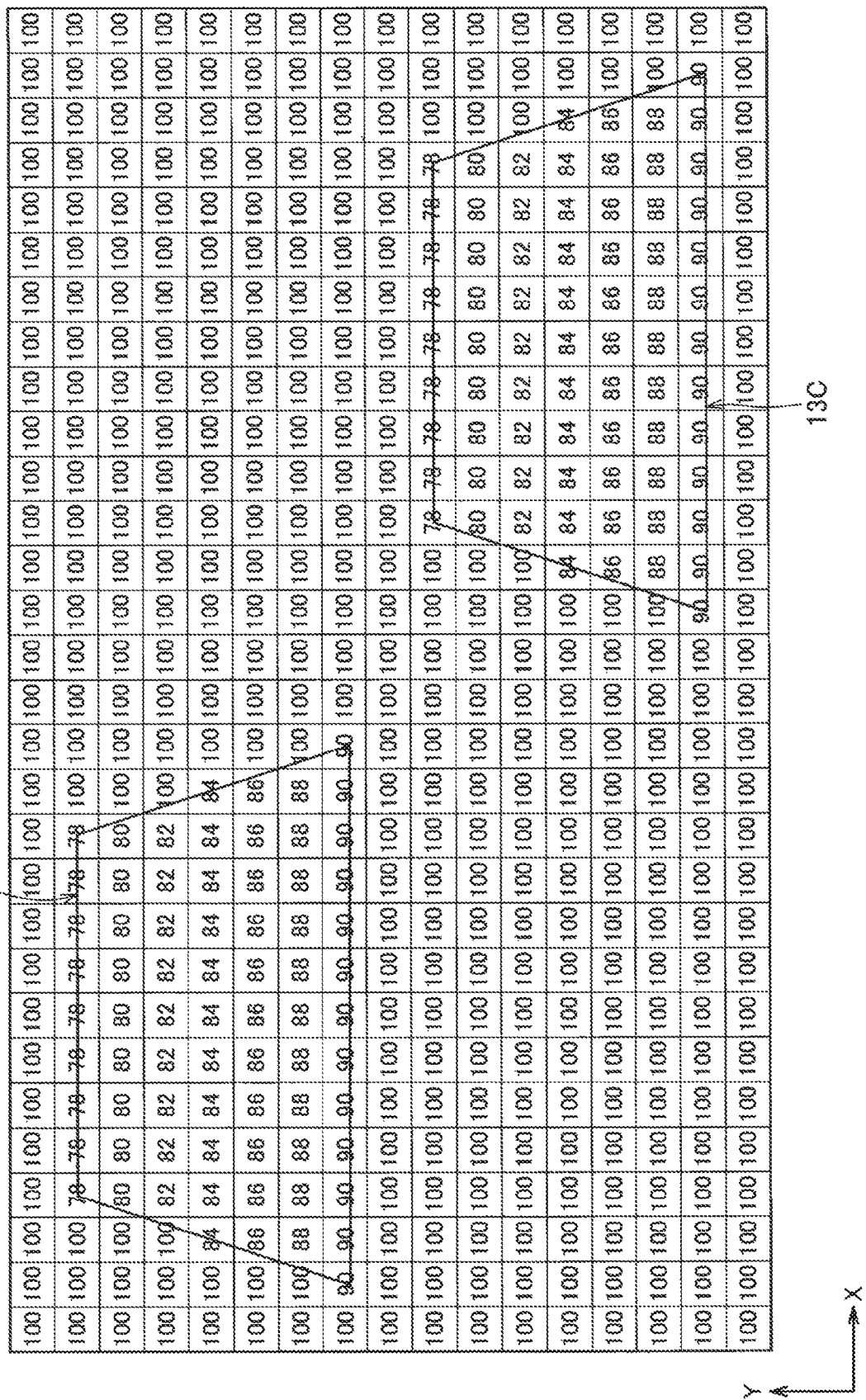
FIG. 11 is a diagram illustrating the second specific example related to the first process of the display surface detection process according to the embodiment.

FIG. 11 illustrates pixel values of pixels of the captured image, including depth information, obtained by the stereo camera included in the input unit 110. The pixel values illustrated in this figure indicate the distances from the surface of the real object corresponding to the pixels to the input unit 110 and to the output unit 150. As illustrated in FIG. 11, all the pixel values of pixels 13A corresponding to the top surface 11A of the table 10A are 100. The pixel values of pixels 13B and pixels 13C corresponding to the top surfaces 11B and 11C of the real objects 10B and 11C are uniform along the X direction, and decreases toward the +Y axis direction side.

Figure 12:
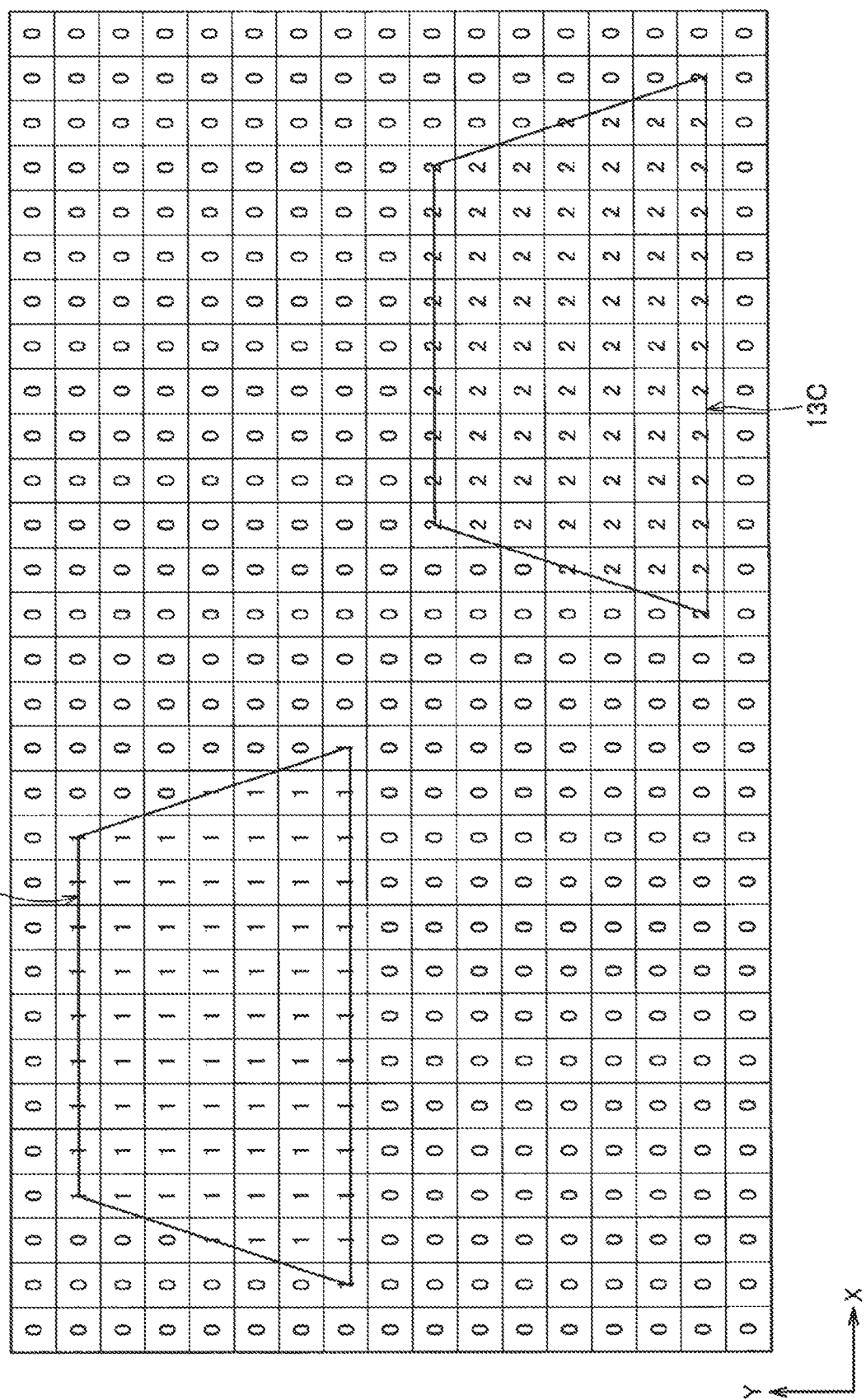
FIG. 12 is a diagram illustrating the second specific example related to the first process of the display surface detection process according to the embodiment.

FIG. 12 illustrates a result of the display surface detection process based on the pixel values illustrated in FIG. 11. As illustrated in FIG. 11, a rate of the pixel values of 100 is the highest. Therefore, as illustrated in FIG. 12, the pixels 13A corresponding to the top surface 11A of the table 10A are detected as the first display surface, and have 0 as the ID. On the other hand, the pixels 13B corresponding to the top surface 11B of the real object 10B are different from the pixel values 100 of the first display surface by a difference exceeding a threshold, and are different from each other by a difference not exceeding the threshold. In this specific example, the threshold of the difference between pixel values is assumed to be 5. Thus, as illustrated in FIG. 8, the pixels 13B corresponding to the top surface 11B of the real object 11B are detected as the second display surface, and have 1 as the ID. The pixel 13C corresponding to the top surface 11C of the real object 10C are similarly detected as the second display surface, and have 2 as the ID.

Table 3 below illustrates an example of information recorded in the display surface information accumulation table as a result of the process described above.

TABLE 3

Example of display surface information accumulation table after first process of display surface detection process

| ID | Position | Size | Gradient | Operable flag |
|---|---|---|---|---|
| 1 | −340, 192 | | | |
| 2 | 340, −192 | | | |

(2.2) Second Process

The second process is a process of detecting, as the display surface, a surface that satisfies predetermined conditions regarding color and lightness among the surfaces detected by the first process. Thus, only the surfaces detected in the first process are processed in the second process, meaning that the calculation load can be reduced. The second process will be described below in detail.

Process Flow

Figure 13:
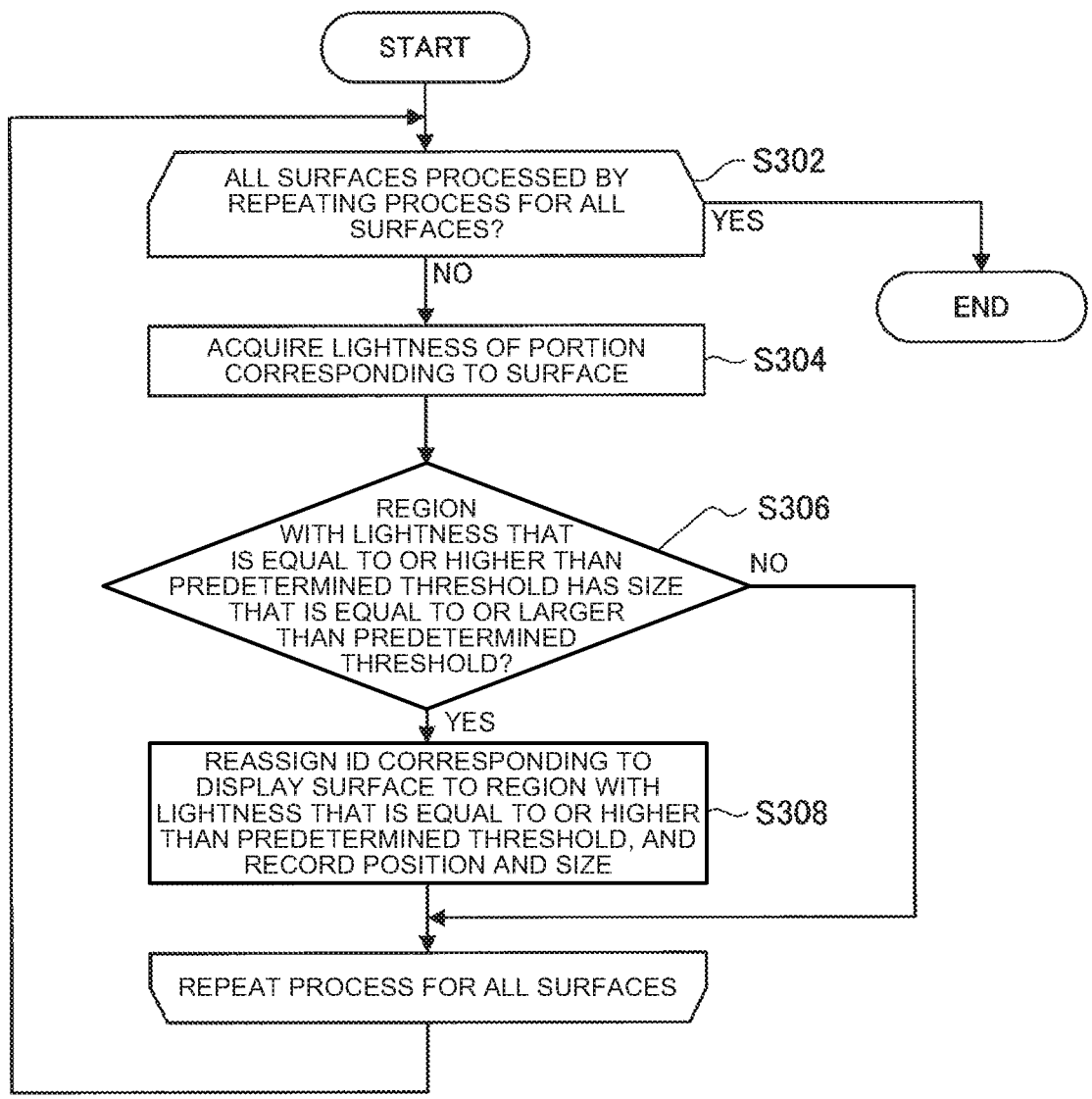
FIG. 13 is a flowchart illustrating an example of a flow of a second process of the display surface detection process executed by the information processing system according to the embodiment.

FIG. 13 is a flowchart illustrating an example of a flow of the second process of the display surface detection process executed by the information processing system 100 according to the present embodiment. The display surface management unit 131 determines whether all the surfaces have been processed (Step S302). When there is a surface that has not been processed yet (Step S302/NO), the following processes are performed while switching the target surface. The display surface management unit 131 acquires the lightness of a portion corresponding to the surface (Step S304). Next, the display surface management unit 131 determines whether the size of a region, in the surface, where the lightness is equal to or greater than a predetermined threshold, is equal to or larger than a predetermined threshold (Step S306). When the region, in the surface, where the lightness is equal to or greater than the predetermined threshold is determined to have a size equal to or larger than the predetermined threshold (Step S306/YES), the display surface management unit 131 reassigns the region with the ID corresponding to the display surface, and then records the position and size of the region in the display surface information accumulation table (Step S308). When the region, in the surface, where lightness is equal to or greater than the predetermined threshold does not have a size that is equal to or larger than the predetermined threshold (Step S306/NO), the display surface management unit 131 set the region to be a region that has been processed. The display surface management unit 131 repeats the processes related to Steps S302 to S308 for all the surfaces (that is, for all the IDs). When all the surfaces have been processed (Step S302/YES), the process ends.

Specific Example

Hereinafter, a specific example related to the second process of the display surface detection process described above will be described with reference to FIGS. 14 to 16.

Figure 14:
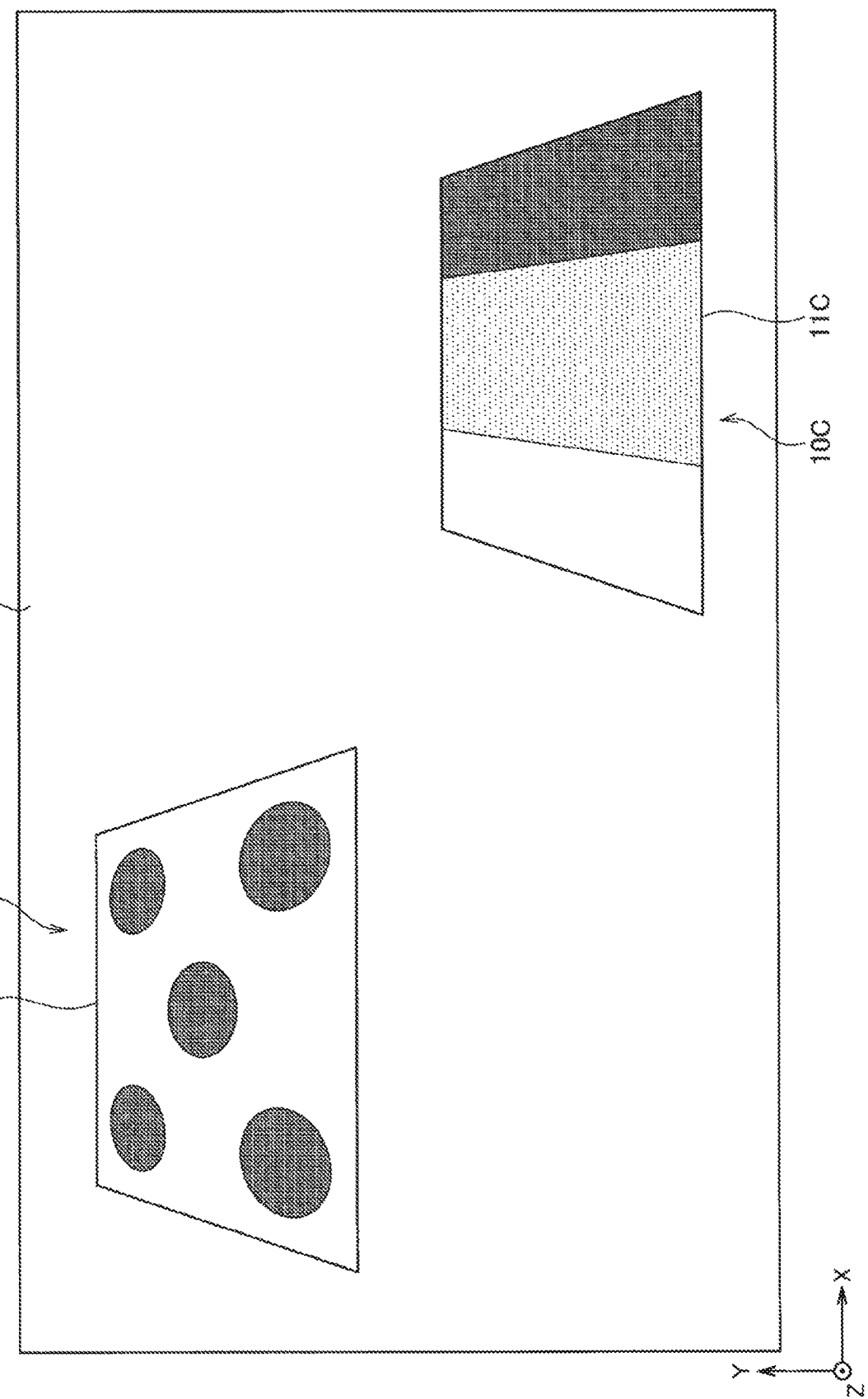
FIG. 14 is a diagram illustrating a specific example related to the second process of the display surface detection process according to the embodiment.
Figure 15:
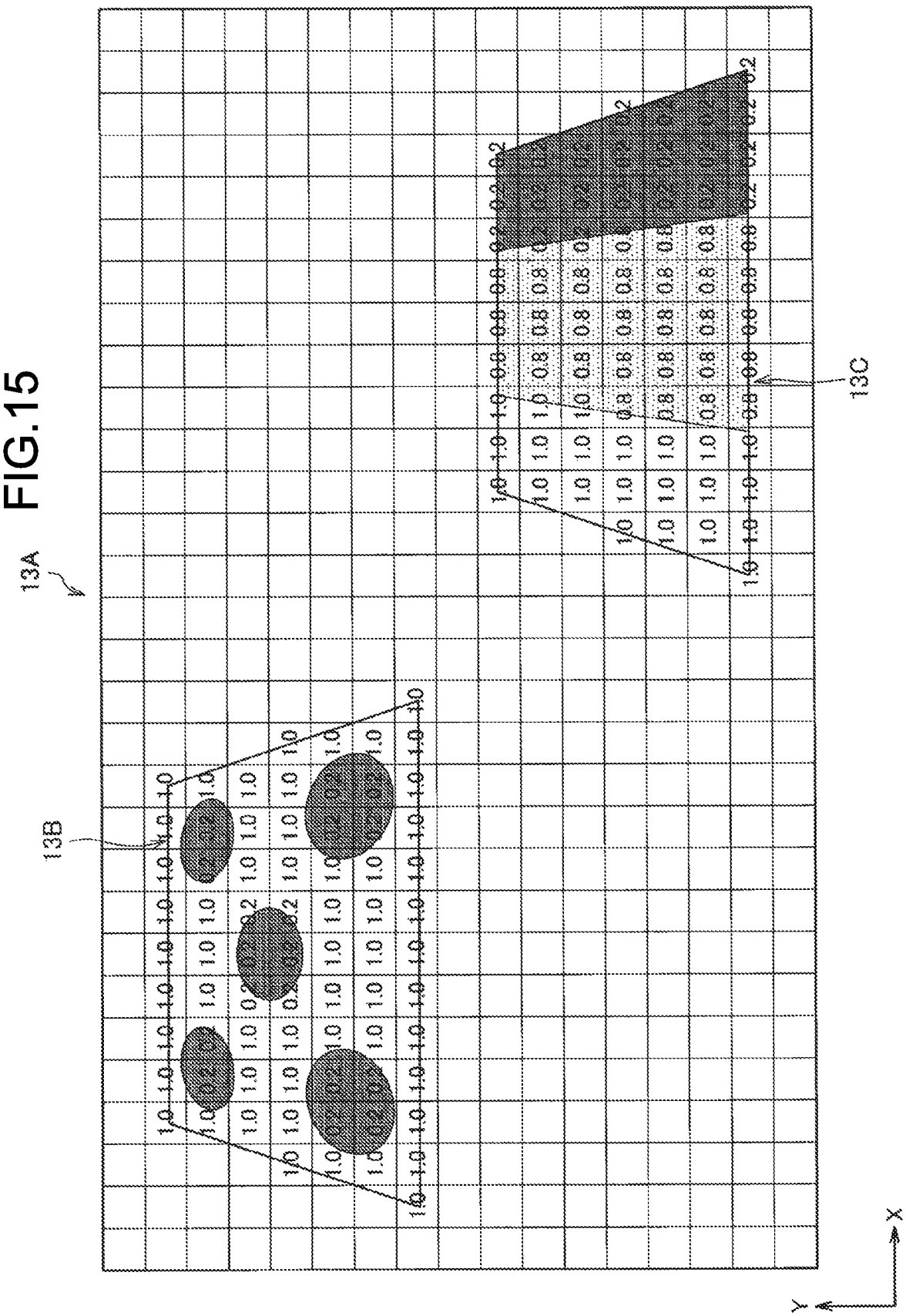
FIG. 15 is a diagram illustrating the specific example related to the second process of the display surface detection process according to the embodiment.
Figure 16:
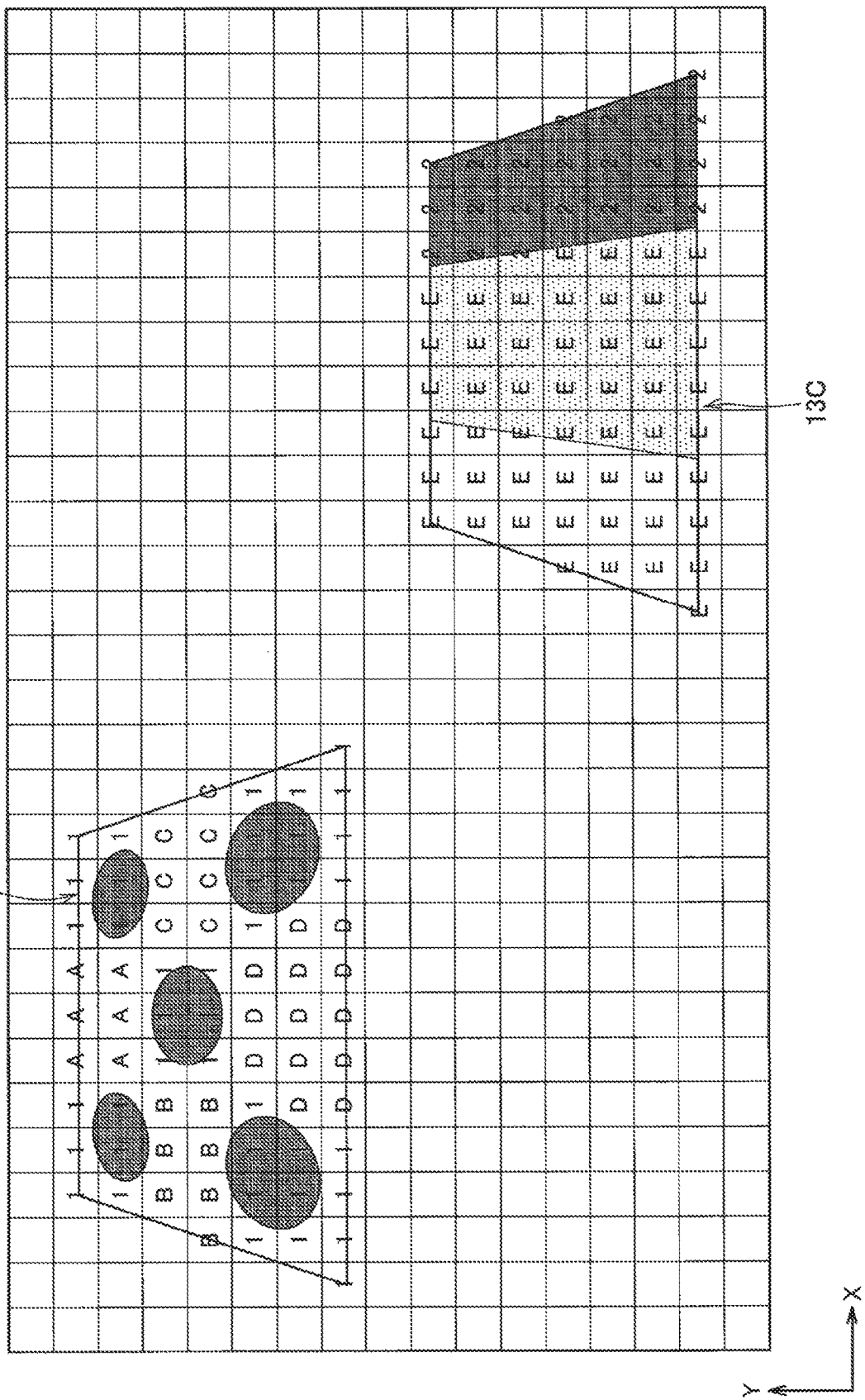
FIG. 16 is a diagram illustrating the specific example related to the second process of the display surface detection process according to the embodiment.

FIGS. 14 to 16 are diagrams illustrating the specific example related to the second process of the display surface detection process according to the present embodiment. As illustrated in FIG. 14, in this specific example, real objects 10B and 10C are placed on a table 10A. The real objects 10B and 10C are assumed to be arranged as described above with reference to FIGS. 9 to 12. As illustrated in FIG. 14, a top surface 11B of the real object 10B has a polka dot pattern, and a top surface 11C of the real object 10C has a color gradation with the color darkening from the −X axis direction side toward the +X axis direction side.

FIG. 15 illustrates the lightness of each pixel of the captured image obtained by the input unit 110. As illustrated in FIG. 15, of pixels 13B and 13C respectively corresponding to the top surfaces 11B and 11C of the real objects 10B and 10C, those not in a patterned (colored) region have the lightness of 1.0 and those in a colored region have the lightness of 0.2 or 0.8.

FIG. 16 illustrates a result of the display surface detection process based on the lightness illustrated in FIG. 15. As illustrated in FIG. 16, of the pixels 13B and 13C respectively corresponding to the top surfaces 11B and 11C of the real objects 10B and 10C, those in a region with the lightness that is equal to or higher than a threshold are provided with new IDs A to E. In this specific example, the lightness threshold is assumed to be 0.5.

Table 4 below illustrates an example of information recorded in the display surface information accumulation table as a result of the process described above.

TABLE 4

Example of display surface information accumulation table after second process of display surface detection process

| ID | Position | Size | Gradient | Operable flag |
|----|----------|------|----------|---------------|
| 1  | −340, 192 |     |          |               |
| 2  | 340, −192 |     |          |               |
| A  | −340, 288 | 6   |          |               |
| B  | −510, 192 | 7   |          |               |
| C  | −170, 192 | 7   |          |               |
| D  | −340, 96  | 13  |          |               |
| E  | 300, −192 | 51  |          |               |

Figure 17:
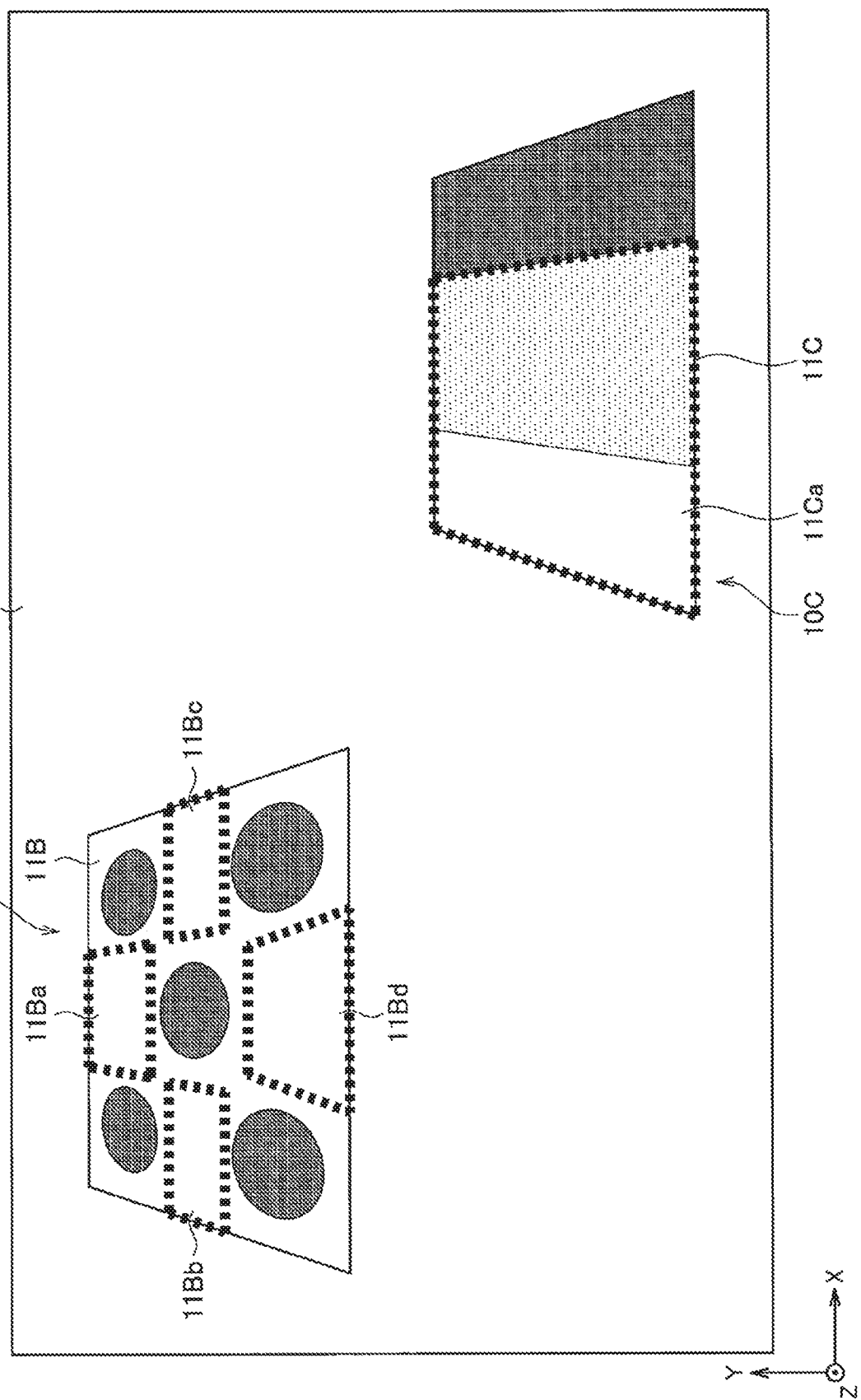
FIG. 17 is a diagram illustrating a specific example of a display surface detected by the display surface detection process according to the embodiment.

FIG. 17 is a diagram illustrating a specific example of the display surface detected by the display surface detection process according to the present embodiment. In the top surface 11B of the real object 10B, a region 11Ba is a display surface with A as the ID, a region 11Bb is a display surface with B as the ID, a region 11Bc is a display surface with C as the ID, and a region 11Bd is a display surface with D as the ID. Regions in the top surface 11B of the real object 10B other than the display surfaces 11Ba to 11Bd will not be regarded as the display surface. In the top surface 11C of the real object 10C, a region 11Ca is a display surface with E as the ID. Regions in the top surface 11C of the real object 10C other than the display surface 11Ca will not be regarded as the display surface.

(3) Operability Determination Process

The display surface management unit 131 classifies a display surface with an area that is equal to or larger than a predetermined threshold (second threshold) as a surface capable of receiving the user operation, and otherwise classifies the display surface as a surface incapable of receiving user operation. The display surface management unit 131 categorizes display surfaces with an enough area to display a display object into a surface having an area large enough to receive an operation input such as touching and flicking operations using a finger, and a surface with an area not large enough. The threshold (second threshold) here is smaller than the area threshold (first threshold) in the display surface detection process. As a result, a surface having an area not large enough to receive an operation input can also be used as a display surface.

The display surface management unit 131 classifies a display surface with a gradient that is not larger than a predetermined threshold as the surface capable of receiving the user operation, and otherwise classifies the display surface as a surface incapable of receiving user operation. The display surface management unit 131 categorizes display surfaces with an enough area to display a display object into a surface having gradient with which an operation input such as touching and flicking operations using a finger can be received, and a surface not having such gradient. The threshold here may be the same as or different from the gradient threshold in the display surface detection process.

Figure 18:
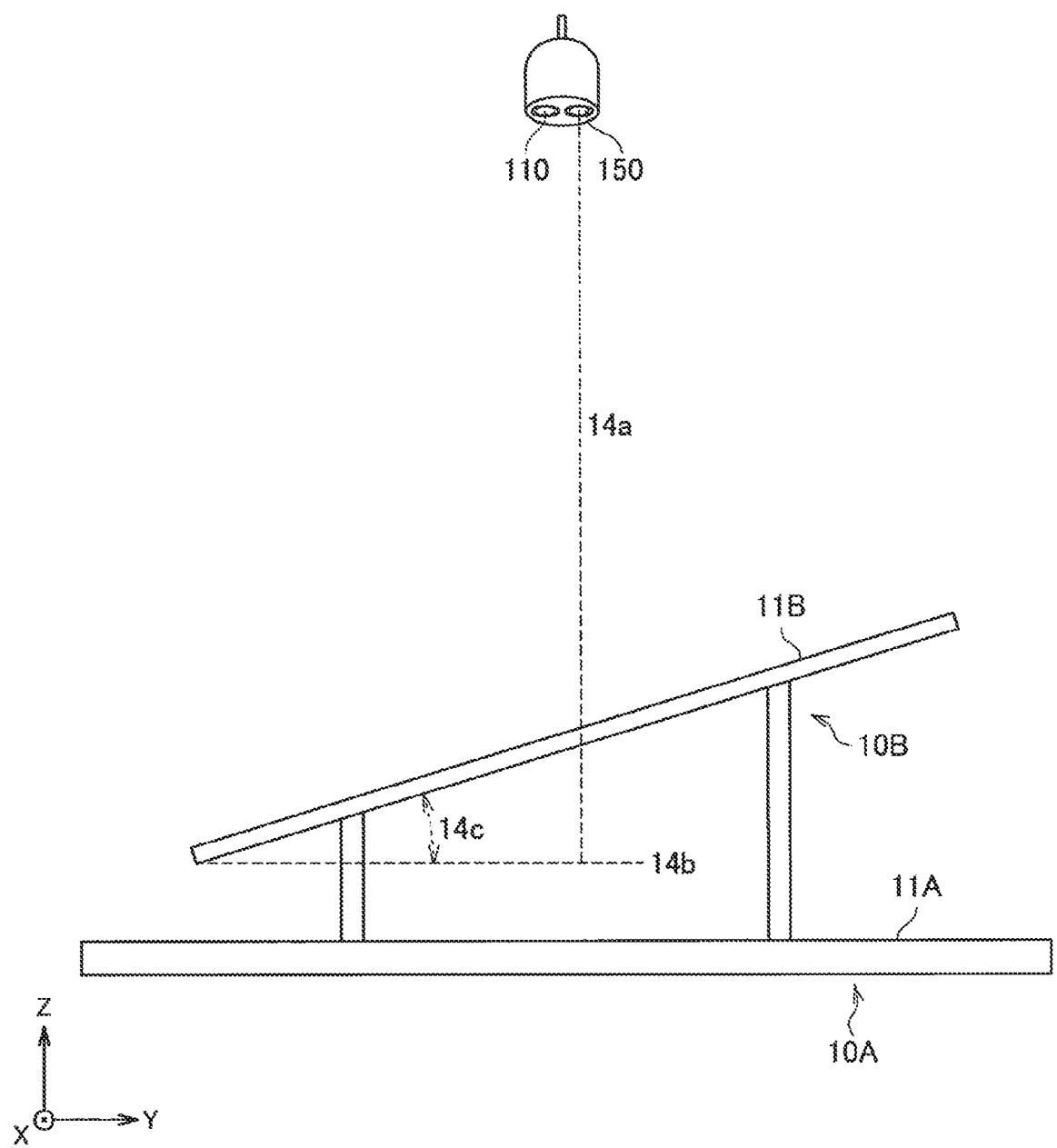
FIG. 18 is a diagram illustrating a gradient of a surface according to the embodiment.

Now, the gradient of the surface will be described with reference to FIG. 18. FIG. 18 is a diagram illustrating the gradient of a surface according to the present embodiment. The drawing illustrates the gradient of the top surface 11B of the real object 10B according to the specific example illustrated in FIG. 6. The gradient of the top surface 11B is an angle 14c between a plane 14b and the top surface 11B orthogonal to a projection direction (optical axis) 14a of the projector included in the output unit 150. When the angle 14c is 0 degrees (that is, when the optical axis 14a and the top surface 11B are orthogonal to each other) or within a predetermined range, the display surface management unit 131 detects the top surface 11B as the display surface capable of receiving the operation input. The display surface management unit 131 may use the angle itself as a threshold determination target, or may perform threshold determination on values (such as sine, cosine, and tangent) calculated based on the angle.

A specific flow of the operability determination process will be described below.

Process Flow

Figure 19:
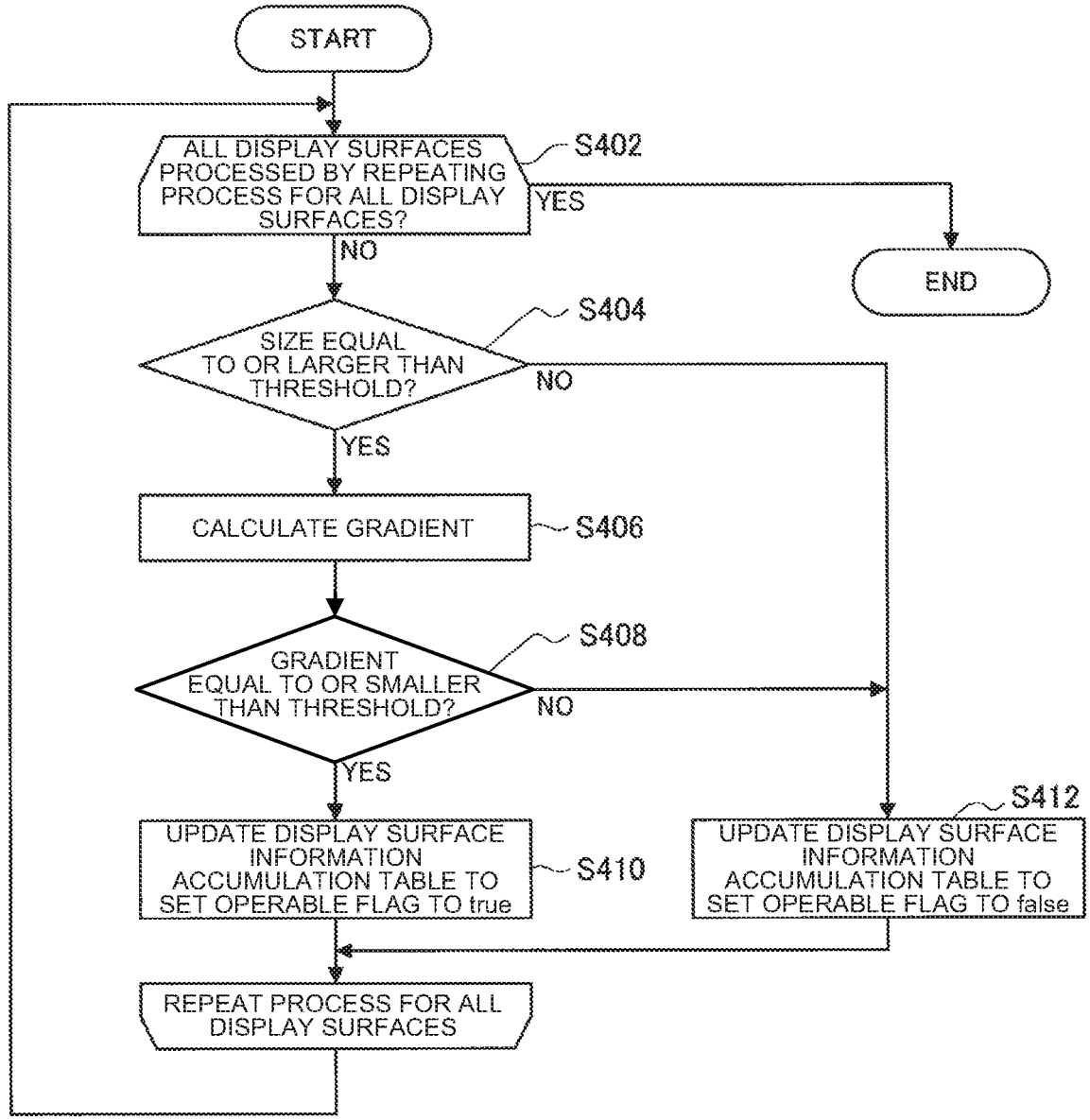
FIG. 19 is a flowchart illustrating an example of a flow of an operability determination process executed by the information processing system according to the embodiment.

FIG. 19 is a flowchart illustrating an example of a flow of the operability determination process executed by the information processing system 100 according to the present embodiment. As illustrated in FIG. 19, the display surface management unit 131 determines whether all the display surfaces have been processed (Step S402). When there is a surface that has not been processed yet (Step S402/NO), the following processes are performed while switching the target display surface. The display surface management unit 131 determines whether the size of the display surface is equal to or larger than a predetermined threshold (Step S404). When it is determined that the size of the display surface is equal to or larger than the predetermined threshold (Step S404/YES), the display surface management unit 131 calculates the gradient of the display surface (Step S406). Next, the display surface management unit 131 determines whether the gradient of the display surface is equal to or larger than a predetermined threshold (Step S408). When it is determined that the gradient of the display surface is equal to or larger than the predetermined threshold (Step S408/YES), the display surface management unit 131 updates the display surface information accumulation table so that the display surface has the operable flag set to be True (Step S410). In this manner, a display surface that is capable of receiving a user operation is detected. On the other hand, when it is determined that the size of the display surface is not equal to or larger than the predetermined threshold or when it is determined that the gradient of the display surface is not equal to or smaller than the predetermined threshold (Step S404/NO or Step S408/NO), the display surface management unit 131 updates the display surface information accumulation table so that the display surface has the operable flag set to be False (Step S412). In this manner, a display surface incapable of receiving user operation is detected. The display surface management unit 131 repeats the processes related to Steps S404 to S412 for all the surfaces (that is, for all the IDs). When all the surfaces have been processed (Step S402/YES), the process ends.

Specific Example

Table 5 below illustrates results of the operability determination process on the display surfaces with the IDs A to E obtained by the specific example of the second process of the display surface detection process described above with reference to FIGS. 14 to 17. In this specific example, the size threshold is assumed to be 20, and the gradient threshold is assumed to be 45°.

TABLE 5

Example of display surface information
accumulation table after operability
determination process

| ID | Position  | Size | Gradient | Operable flag |
|----|-----------|------|----------|---------------|
| 1  | −340, 192 |      |          |               |
| 2  | 340, −192 |      |          |               |
| A  | −340, 288 | 6    | 31°      | false         |
| B  | −510, 192 | 7    | 31°      | false         |
| C  | −170, 192 | 7    | 31°      | false         |
| D  | −340, 96  | 13   | 31°      | false         |
| E  | 300, −192 | 51   | 31°      | true          |

As illustrated in above Table 5, the display surfaces with IDs A to D are detected as display surfaces incapable of receiving user operation, and the display surface with ID E is detected as the display surface capable of receiving user operation. Specifically, the display surfaces 11B$a$ to 11B$d$ illustrated in FIG. 17 are detected as the display surfaces that are incapable of receiving user operation, and the display surface 11C$a$ is detected as the display surface capable of receiving user operations.

(4) Display Control Process

The display surface management unit 131 performs a display control process for the display object based on the spatial information and the user information.

Specifically, the display control unit 132 selects a display surface for mapping and displaying the display object. For example, the display control unit 132 selects an appropriate display surface based on: properties of the display object such as the size of the display object, the content of the display object, and whether the display object is capable of receiving user operation; and properties of the display surface such as the gradient, the size, the color, and the lightness of the display surface.

Also when a user operation for moving the display object is performed, the display control unit 132 selects a display surface for displaying the display object, that is, a display screen as the movement destination of the display object. The display control unit 132 extracts the display surfaces as movement destination candidates, and determines whether each of the display surfaces as the movement destination candidates (determination target) is suitable as the movement destination of the display object. Upon determining that there is a display surface suitable as the movement destination, the display control unit 132 moves the display object so that the display object as the movement target is displayed on this display surface. On the other hand, upon determining that there is no display surface suitable as the movement destination, the display control unit 132 performs feedback indicating that the movement cannot be performed.

When mapping and displaying the display object on the display surface, the display control unit 132 performs various correction processes on the display object depending on the situation. The correction process includes a coordinate correction process, a re-layout process, and a color correction process. These processes will be described in detail later. When selecting the display surface for displaying the display object, the display control unit 132 tries the correction processes to be applied, and uses the display surface on which all the correction processes to be applied have been successfully performed as the display surface for displaying the display object.

Display control by the information processing system 100 will be described below in detail.

(4.1) Display Control Based on User Operation including designation of display surface as movement destination When a user operation for designating a display surface as the movement destination and moving a display object is performed, the display control unit 132 displays the display object on the designated display surface. An example of the user operation for designating a movement destination display surface includes a drag-and-drop operation in which a finger touching the display object is moved and released at the display surface as the movement destination. The user operation for designating the display surface as the movement destination further includes an operation of selecting the display surface as the movement destination from a list of display surfaces as movement destination candidates.

The display surface as the movement destination can be arbitrarily designated. The display surface that can be designated includes a first display surface and a second display surface. More specifically, the display surfaces that can be designated include one region in the first display surface or the second display surface, and an application corresponding to another existing display object displayed on the first display surface or the second display surface. When the application corresponding to another existing display object is designated as the movement destination, the content (such as image data or music data for example) related to the display object as the movement target is processed by the application designated as the movement destination. The display control unit 132 evaluates each display surface designated by the user as the determination target, based on a predetermined evaluation criterion. The display control unit 132 confirms the designated display surface satisfying a predetermined criterion, to be the movement destination.

The display control unit 132 determines whether the display object as the movement target can be moved to the display surface as the determination target, based on: the area, the gradient, the color, or the lightness of the display surface as the determination target; and the area, the color, and the content of the display object as the movement target. The display control unit 132 evaluates the display surface based on evaluation items such as an area, and confirms the designated display surface satisfying a predetermined criterion, to be the movement destination. Furthermore, the display control unit 132 determines whether the movement can be made, based on whether the correction process to be applied has been successfully performed. The display control unit 132 determines whether the display object as the movement target can be moved to the application, based on whether the data (such as an image for example) related to the display object as the movement target can be processed by the application, in addition to the evaluation items described above. Thus, the display control unit 132 can move the display object to a display surface suitable as a movement destination.

Process Flow

Figure 20:
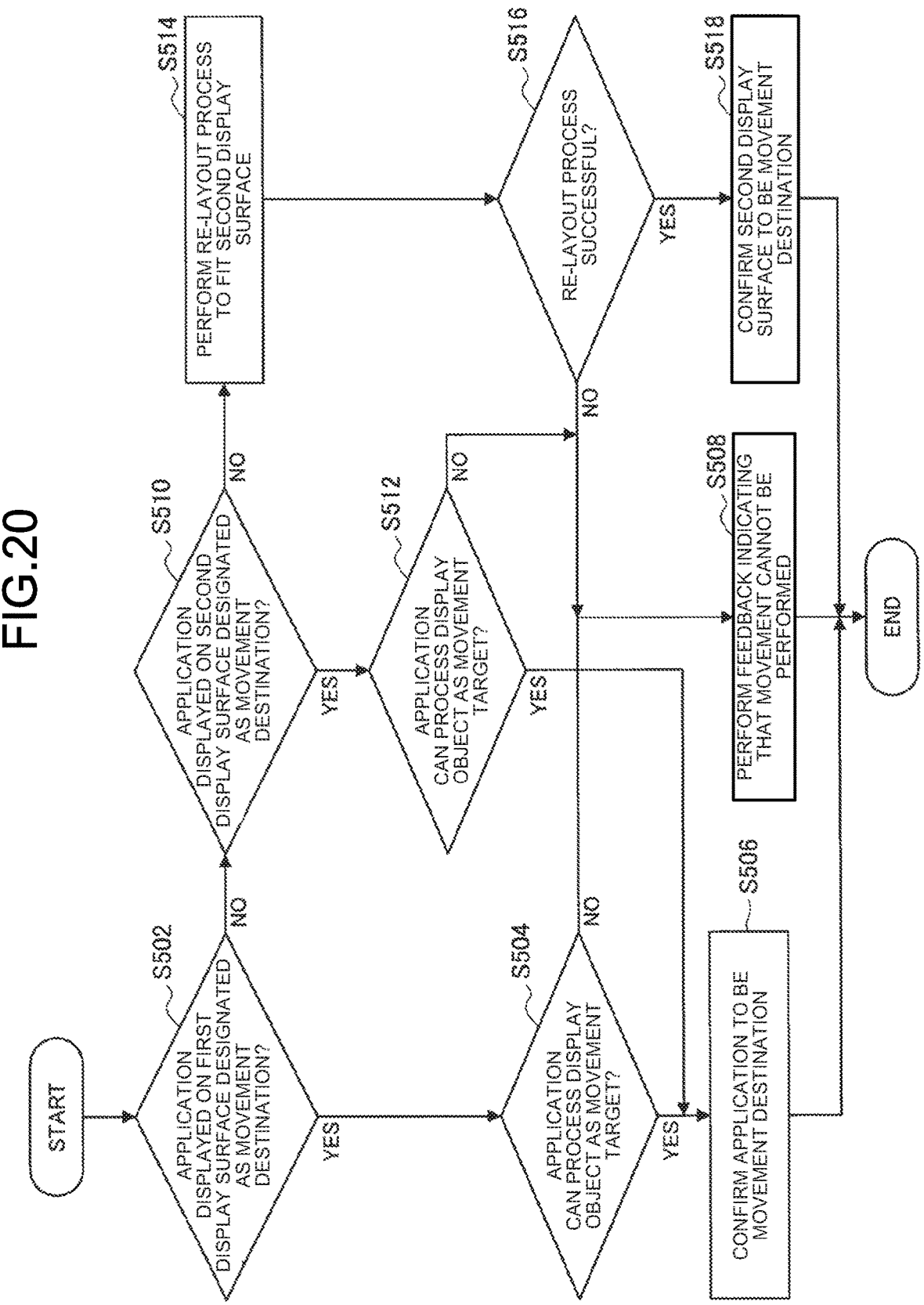
FIG. 20 is a flowchart illustrating an example of a flow of a display control process, based on a user operation including designation of a display surface as a movement destination, executed by the information processing system according to the embodiment.

FIG. 20 is a flowchart illustrating an example of a flow of a display control process, based on a user operation including designation of the display surface as the movement destination, executed by the information processing system 100 according to the present embodiment. In this flowchart, the application corresponding to the other existing display object or the second display surface is assumed to be designated as the movement destination of the display object.

As illustrated in FIG. 20, the display control unit 132 determines whether the application displayed on the first display surface is designated as the movement destination (Step S502). When it is determined that the application displayed on the first display surface is designated as the movement destination (Step S502/YES), the display control unit 132 determines whether the application can process the display object as the movement target (Step S504). When it is determined that the display object can be processed (Step S504/YES), the display control unit 132 confirms the designated application to be the movement destination (Step S506). On the other hand, when it is determined that the display object cannot be processed (Step S504/NO), the display control unit 132 performs feedback indicating that the movement cannot be performed (Step S508).

When it is determined that the application displayed on the first display surface is not designated as the movement destination (Step S502/NO), the display control unit 132 determines whether the application displayed on the second display surface is designated as the movement destination (Step S510). When it is determined that the application displayed on the second display surface is designated as the movement destination (Step S510/YES), the display control unit 132 determines whether the application can process the display object as the movement target (Step S512). When it is determined that the display object can be processed (Step S512/YES), the display control unit 132 confirms the designated application to be the movement destination (Step S506). On the other hand, when it is determined that the display object cannot be processed (Step S512/NO), the display control unit 132 performs feedback indicating that the movement cannot be performed (Step S508).

When it is determined that the application displayed on the second display surface is not designated as the movement destination (Step S510/NO), the display control unit 132 performs a re-layout process to fit the second display surface (Step S514). Next, the display control unit 132 determines whether the re-layout process has been successful (Step S516). When it is determined that the re-layout process has been successful (Step S516/YES), the display control unit 132 confirms the designated second display surface to be the movement destination (Step S518). On the other hand, when it is determined that the re-layout process has failed (Step S516/NO), the display control unit 132 performs feedback for notifying that the movement cannot be performed (Step S508).

Specific Example

Figure 21:
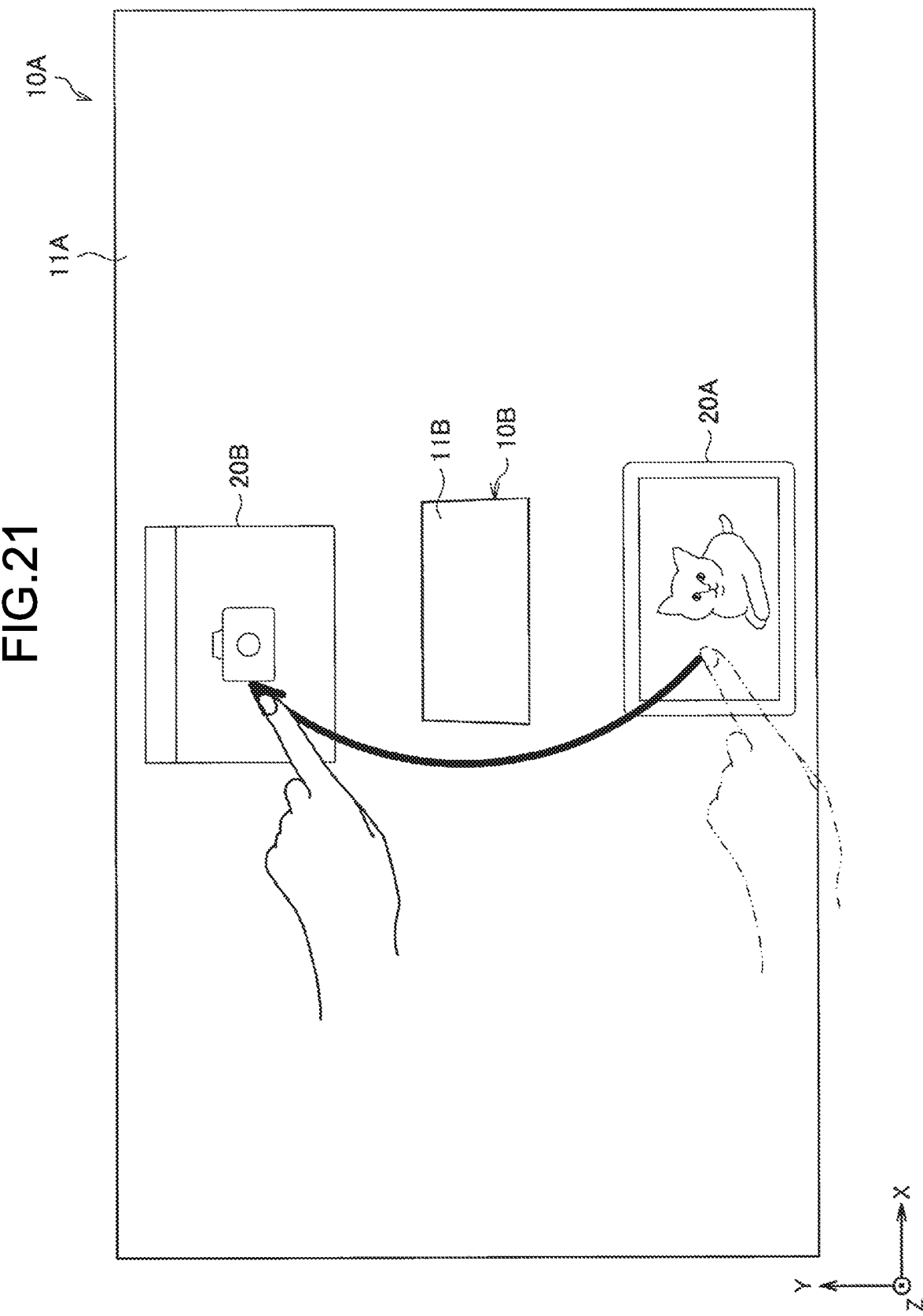
FIG. 21 is a diagram illustrating a specific example of the display control process based on a user operation including designation of a display surface as a movement destination according to the embodiment.

FIG. 21 is a diagram for explaining a specific example of a display control process based on a user operation including designation of a display surface as a movement destination according to the present embodiment. As illustrated in FIG. 21, a real object 10B is placed on a table 10A. A top surface 11A of the table 10A is the first display surface, and a top surface 11B of the real object 10B is the second display surface. Display objects 20A and 20B are displayed on the first display surface 11A. The display object 20A is an image, and the display object 20B is an image viewing application. The image viewing application can process images. Thus, when the user drags and drops the display object 20A onto the display object 20B, the image displayed as the display object 20A moves to the position of the display object 20B to be processed by the image viewing application.

(4.2) Display Control Based on User Operation to Designate Movement Direction

When a user operation for designating the movement direction of the display object is performed, the display control unit 132 displays the display object on the designated display surface in the designated movement direction.

An example of the user operation for designating the movement direction includes a flicking operation of moving a finger in the movement direction in a flicking manner. The user operation for designating the movement direction further includes an operation of selecting the movement direction from a list of a plurality of movement direction candidates.

The display control unit 132 can arbitrarily select the movement destination of the display object. The movement destination candidates include a first display surface and a second display surface. More specifically, the movement destination candidates include one region in the first display surface or the second display surface, and an application corresponding to another existing display object displayed on the first display surface or the second display surface. The display control unit 132 evaluates each of these display surfaces in the movement direction designated by the user as the determination target, based on a predetermined evaluation criterion. The display control unit 132 confirms the display surface satisfying a predetermined criterion or with the highest evaluation value, as the movement destination.

The display control unit 132 determines whether the display object as the movement target can be moved to the display surface as the determination target, based on: the area, the gradient, the color, or the lightness of the display surface as the determination target; and the area, the color, and the content of the display object as the movement target. The display control unit 132 evaluates the display surface based on evaluation items such as an area, and confirms the display surface satisfying a predetermined criterion or with the highest evaluation value, to be the movement destination. Furthermore, the display control unit 132 determines whether the movement can be made, based on whether the correction process to be applied has been successfully performed. The display control unit 132 determines whether the display object as the movement target can be moved to the application, based on whether the data (such as an image for example) related to the display object as the movement target can be processed by the application, in addition to the evaluation items described above. Thus, the display control unit 132 can move the display object to a display surface suitable as a movement destination.

Process Flow

Figure 22:
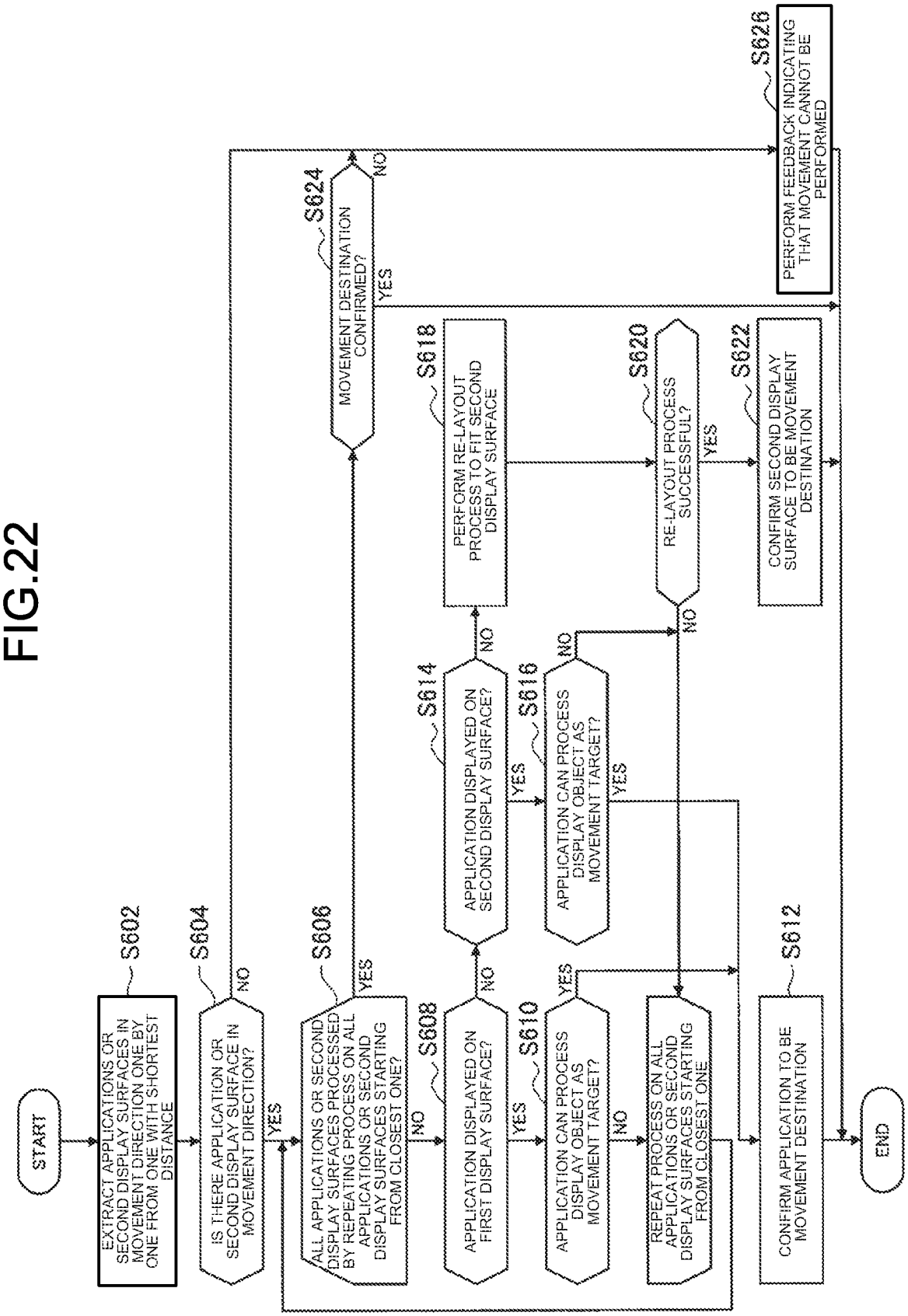
FIG. 22 is a flowchart illustrating an example of a flow of the display control process, based on a user operation including designation of the movement direction, executed by the information processing system according to the embodiment.

FIG. 22 is a flowchart illustrating an example of a flow of a display control process, based on a user operation including designation of the movement direction, executed by the information processing system 100 according to the present embodiment. In this flowchart, the information processing system 100 selects the application corresponding to the other existing display object or the second display surface as the movement destination of the display object.

As illustrated in FIG. 22, the display control unit 132 extracts the applications displayed in the display direction or the second display surfaces in the movement direction, one by one from the one closest to the display object as the movement target (Step S602). Next, the display control unit 132 determines whether there is an application or the second display surface in the movement direction (Step S604). When it is determined that the application or the second display surface is in the movement direction (Step S604/YES), the display control unit 132 performs the following processes on all the applications or second display surfaces determined to be in the movement direction (determination targets). First of all, the display control unit 132 determines whether all the applications or the second display surfaces as the determination targets have been processed (Step S606). When there is an application or second display surface as the determination target that has not been processed yet (Step S606/NO), the display control unit 132 performs the following processes while switching the determination target.

First of all, the display control unit 132 determines whether the determination target is an application displayed on the first display surface (Step S608). When it is determined that the determination target is an application displayed on the first display surface (Step S608/YES), the display control unit 132 determines whether the application as the determination target can process the display object as the movement target (Step S610). When it is determined that the display object can be processed (Step S610/YES), the display control unit 132 confirms the application as the determination target, to be the movement destination (Step S612). On the other hand, when it is determined that the display object cannot be processed (Step S610/NO), the display control unit 132 sets the application as the determination target to be an application that has been processed.

When it is determined that the determination target is not an application displayed on the first display surface (Step S608/NO), the display control unit 132 determines whether the determination target is an application displayed on the second display surface (Step S614). When it is determined that the determination target is an application displayed on the second display surface (Step S614/YES), the display control unit 132 determines whether the application as the determination target can process the display object as the movement target (Step S616). When it is determined that the display object can be processed (Step S616/YES), the display control unit 132 confirms the application as the determination target, to be the movement destination (Step S612). On the other hand, when it is determined that the display object cannot be processed (Step S616/NO), the display control unit 132 sets the application as the determination target to be an application that has been processed.

When it is determined that the application displayed on the second display surface is not the determination target (Step S614/NO), the display control unit 132 performs the re-layout process for fitting to the second display surface (Step S618). Next, the display control unit 132 determines whether the re-layout process has been successful (Step S620). When it is determined that the re-layout process has been successful (Step S620/YES), the display control unit 132 confirms the second display surface as the determination target, to be the movement destination (Step S622). On the other hand, when it is determined that the re-layout process has failed (Step S620/NO), the display control unit 132 sets the second display surface as the determination target to be a display surface that has been processed.

The display control unit 132 repeats the processes related to Steps S608 to S622 described above for all the applications or the second display surfaces as determination targets, one by one from the one closest to the display object as the movement target. When all the applications or the second display surfaces as determination targets have been processed (Step S606/YES), the process proceeds to Step S624.

The display control unit 132 determines whether the movement destination of the display object as the movement target has been confirmed (Step S624). When it is determined that the movement destination of the display object as the movement target has been confirmed (Step S624/YES), the process ends. On the other hand, when it is determined that the movement destination of the display object as the movement target has not been confirmed (Step S624/NO), the display control unit 132 performs feedback indicating that the movement cannot be performed (Step S626).

Specific Example

Figure 23:
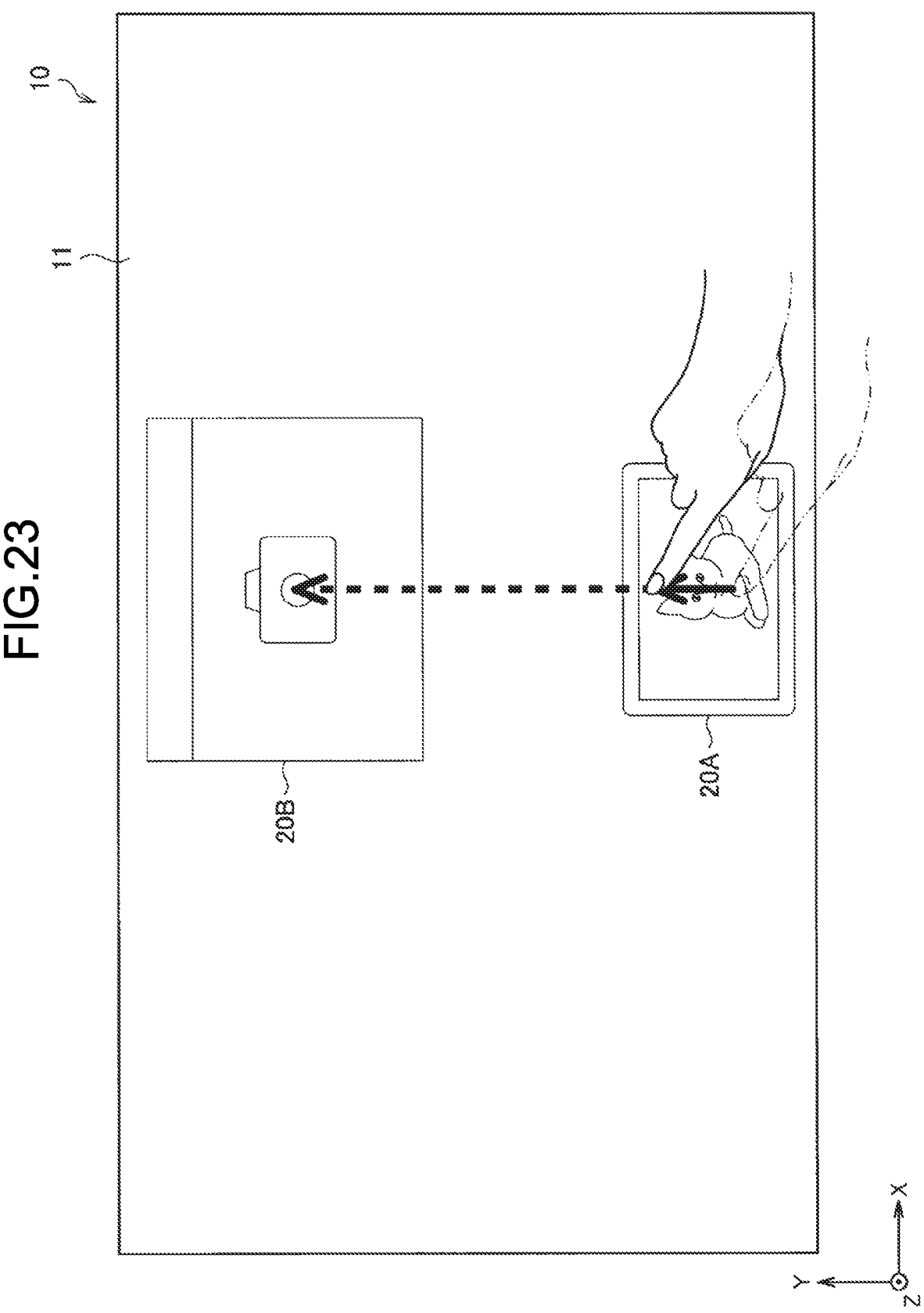
FIG. 23 is a diagram illustrating a specific example of a display control process based on a user operation for designating a movement direction according to the embodiment.

FIG. 23 is a diagram illustrating a specific example of a display control process based on a user operation for designating a movement direction according to the present embodiment. As illustrated in FIG. 23, display objects 20A and 20B are displayed on a top surface 11 of a table 10. The top surface 11 of the table 10 is the first display surface. The display object 20A is an image, and the display object 20B is an image viewing application. The image viewing application can process images. Thus, when the user flicks the display object 20A in a direction toward the display object 20B, the display control unit 132 confirms the image viewing application displayed as the display object 20B to be the movement destination. As a result, the image displayed as the display object 20A moves to the position of the display object 20B to be processed by the image viewing application.

Figure 24:
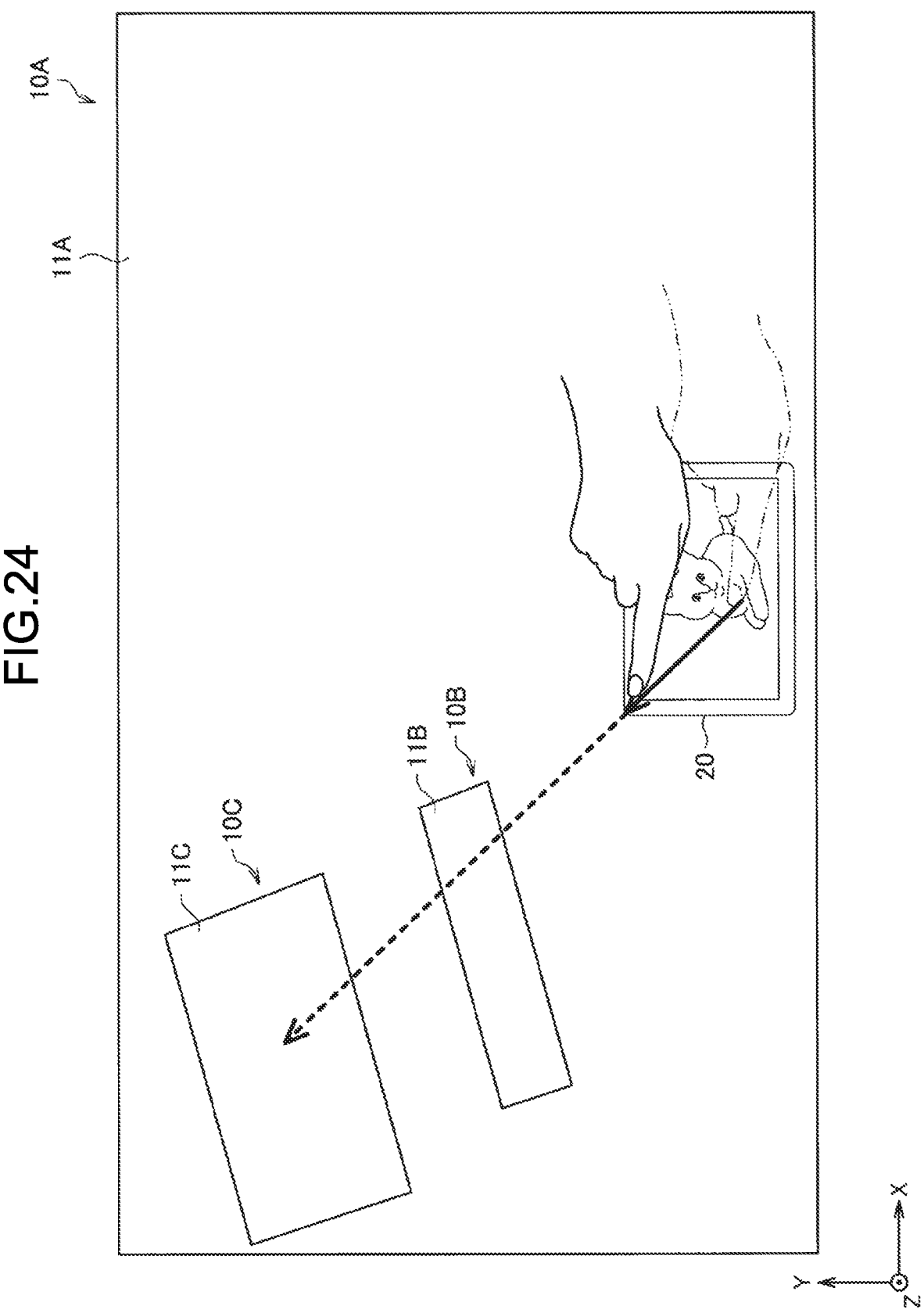
FIG. 24 is a diagram illustrating a specific example of the display control process based on a user operation for designating a movement direction according to the embodiment.

FIG. 24 is a diagram illustrating a specific example of display control process based on a user operation for designating a movement direction according to the present embodiment. As illustrated in FIG. 24, the real objects 10B and 10C are placed on a table 10A. A top surface 11A of the table 10A is the first display surface, and top surfaces 11B and 11C of real objects 10B and 10C are the second display surfaces. A display object 20 is displayed on the first display surface 11A. The user is assumed to have flicked the display object 20 in a direction toward the second display surfaces 11B and 11C. The display control unit 132 first sets the second display surface 11B closer to the display object 20 to be a determination target. The re-layout process on the second display surface 11B fails due to its small area. Thus, the display control unit 132 sets the second display surface 11C to be the determination target. The re-layout process on the second display surface 11C is successfully performed. Thus, the display control unit 132 confirms the second display surface 11C to be the movement destination. As a result, the display object 20 moves to the position of the second display surface 11C to be displayed on the second display surface 11C.

Figure 25:
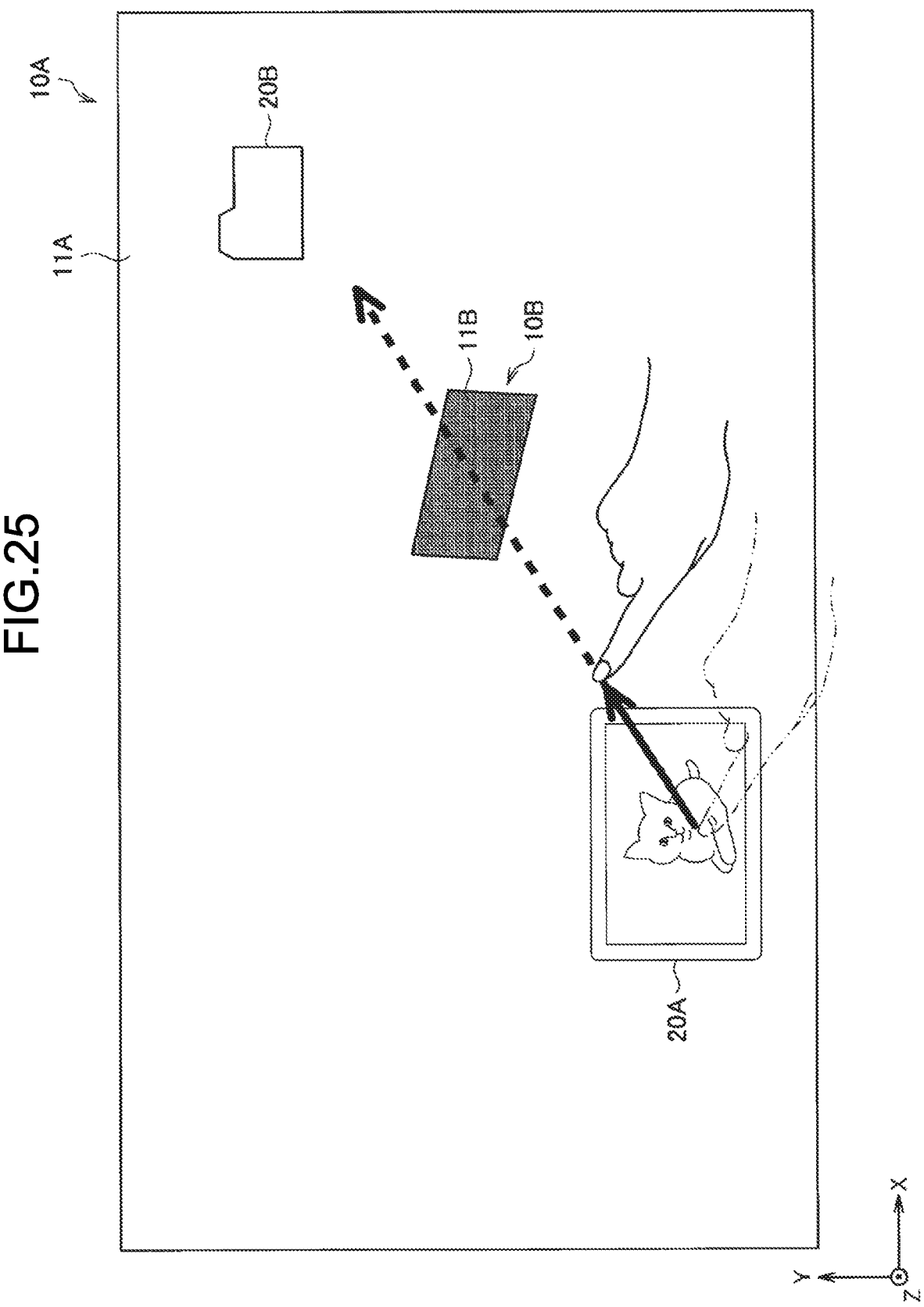
FIG. 25 is a diagram illustrating a specific example of the display control process based on a user operation for designating a movement direction according to the embodiment.

FIG. 25 is a diagram illustrating a specific example of a display control process based on a user operation for designating a movement direction according to the present embodiment. As illustrated in FIG. 25, a real object 10B is placed on a table 10A. A top surface 11A of the table 10A is the first display surface, and a top surface 11B of the real object 10B is the second display surface. Display objects 20A and 20B are displayed on the first display surface 11A. The display object 20A is an image, and the display object 20B is an image storage application. The user is assumed to have flicked the display object 20A in a direction toward the second display surface 11B and the display object 20B. The display control unit 132 first sets the second display surface 11B closer to the display object 20 to be a determination target. The color correction process on the second display surface 11B fails due to its darkness. Thus, the display control unit 132 sets the image storage application displayed as the display object 20, to be the determination target. The image storage application can process images. Thus, the display control unit 132 confirms the image storage application displayed as the display object 20B to be the movement destination. As a result, the image displayed as the display object 20A moves to the position of the display object 20B to be processed by the image storage application.

Figure 26:
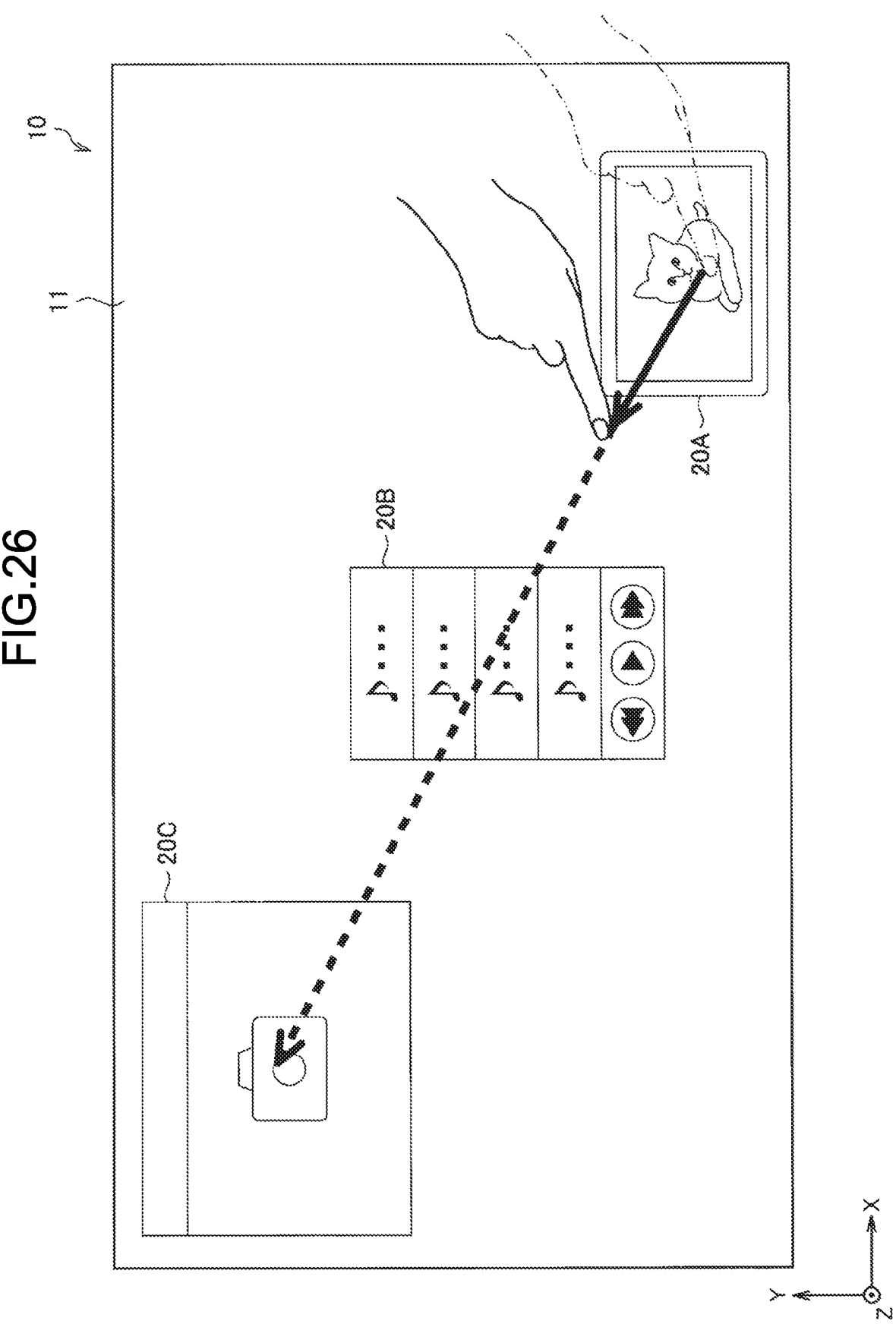
FIG. 26 is a diagram illustrating a specific example of the display control process based on a user operation for designating a movement direction according to the embodiment.

FIG. 26 is a diagram illustrating a specific example of a display control process based on a user operation for designating a movement direction according to the present embodiment. As illustrated in FIG. 26, display objects 20A, 20B, and 20C are displayed on a table 10. The top surface 11 of the table 10 is the first display surface. The display object 20A is an image, the display object 20B is a music player application, and the display object 20C is an image viewing application. The user is assumed to have flicked the display object 20A in a direction toward the display objects 20B and 20C. The display control unit 132 first sets the display object 20B closer to the display object 20 to be a determination target. However, the music player application displayed as the display object 20B cannot process images. Thus, the display control unit 132 sets the image viewing application displayed as the display object 20C to be the determination target. The image viewing application can process images. Thus, the display control unit 132 confirms the image viewing application displayed as the display object 20C to be the movement destination. As a result, the image displayed as the display object 20A moves to the position of the display object 20C to be processed by the image viewing application.

FIG. 27 is a diagram illustrating a specific example of a display control process based on a user operation for designating a movement direction according to the present embodiment. As illustrated in a left diagram of FIG. 27, real objects 10B and 100 are placed on a table 10A. A top surface 11A of the table 10A is the first display surface. A display object 20 is displayed on the first display surface 11A. An inclined surface 11B of the real object 10B is the second display surface. The real object 100 is a keyboard and has a shape with minute recesses and protrusions, so as not to be detected as a display surface. The user is assumed to have flicked the display object 20 in a direction toward the real objects 10B and 100. In this case, the real object 100 existing in the flicking direction does not have a display surface and thus is not set as a determination target. The inclined surface 11B, which is the second display surface in the flicking direction, is set to be the determination target. Therefore, the display control unit 132 confirms the inclined surface 11B of the real object 10B to be the movement destination. Thus, as illustrated in a right diagram of FIG. 27, the display object 20 moves to the position of the inclined surface 11B to be displayed on the inclined surface 11B.

(4.3) Operated Display Object Display Control

When the display object can receive a user operation (for example, when a user operation is required), the display control unit 132 typically selects the display surface capable of receiving the user operation, as the display surface for displaying the display object.

When displaying the display object on a display surface incapable of receiving the user operation, the display control unit 132 displays another display object for receiving the user operation for the display object, on the display surface capable of receiving user operation. For example, the display control unit 132 displays the other display object, for receiving the user operation on the display object displayed on the display surface incapable of receiving the user operation, on a display surface close to the display surface incapable of receiving the user operation. Such a process is mainly performed when a display object capable of receiving a user operation (in other words, a display object that requires a user operation) is displayed on a display surface incapable of receiving user operation. This enables a display surface incapable of receiving user operation to be also used as a display surface for a display object that requires the user operation.

The display control unit 132 may display on the first display surface, the other display object for receiving a user operation on the display object displayed on the second display surface. For example, the display control unit 132 displays the other display object, for receiving the user operation for the display object displayed on the second display surface incapable of receiving the user operation, on the first display surface close to the second display surface incapable of receiving the user operation. With the operated display object displayed close to the operation target display object, the user can intuitively recognize that the operation target display object can be operated by operating the operated display object.

Process Flow

Figure 28:
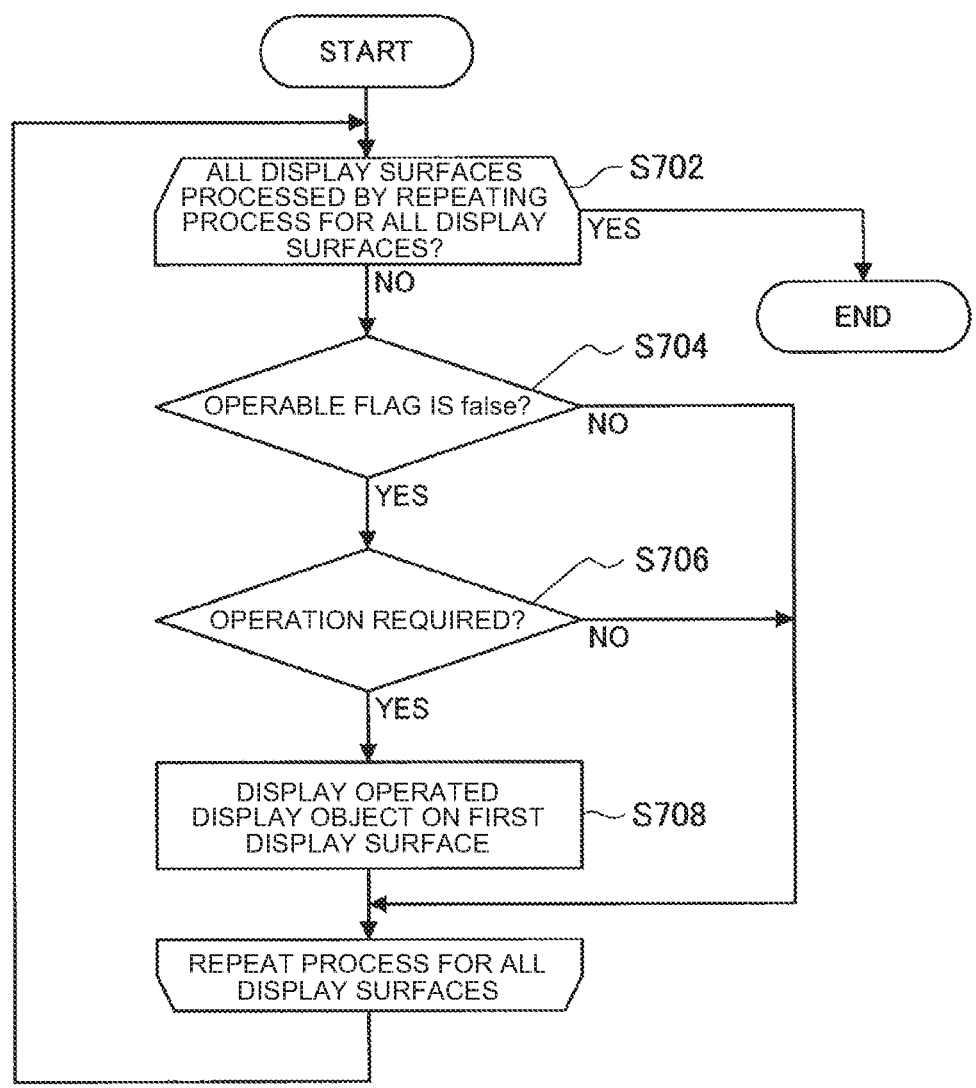
FIG. 28 is a flowchart illustrating an example of a flow of an operated display object display control process executed by the information processing system according to the embodiment.

FIG. 28 is a flowchart illustrating an example of a flow of an operated display object display control process executed by the information processing system 100 according to the present embodiment. As illustrated in FIG. 28, the display control unit 132 determines whether all the display surfaces have been processed (Step S702). When there is a surface that has not been processed yet (Step S702/NO), the following processes are performed while switching the target display surface. The display control unit 132 determines whether the operable flag of the display surface is false (Step S704), and determines whether the display object displayed on the display surface requires a user operation (Step S706). When it is determined that the operable flag on the display surface is false and that a user operation is required (Step S704/YES and Step S706/YES), the display control unit 132 displays the operated display object on the first display surface (Step S708). On the other hand, when it is determined that the operable flag on the display surface is true or that no user operation is required (Step S704/NO or Step S706/NO), the display control unit 132 does not display the operated display object. The display control unit 132 repeats the processes related to the above Steps S704 to S708 for all the display surfaces. When all the display surfaces have been processed (Step S702/YES), the process ends.

Specific Example

Figure 29:
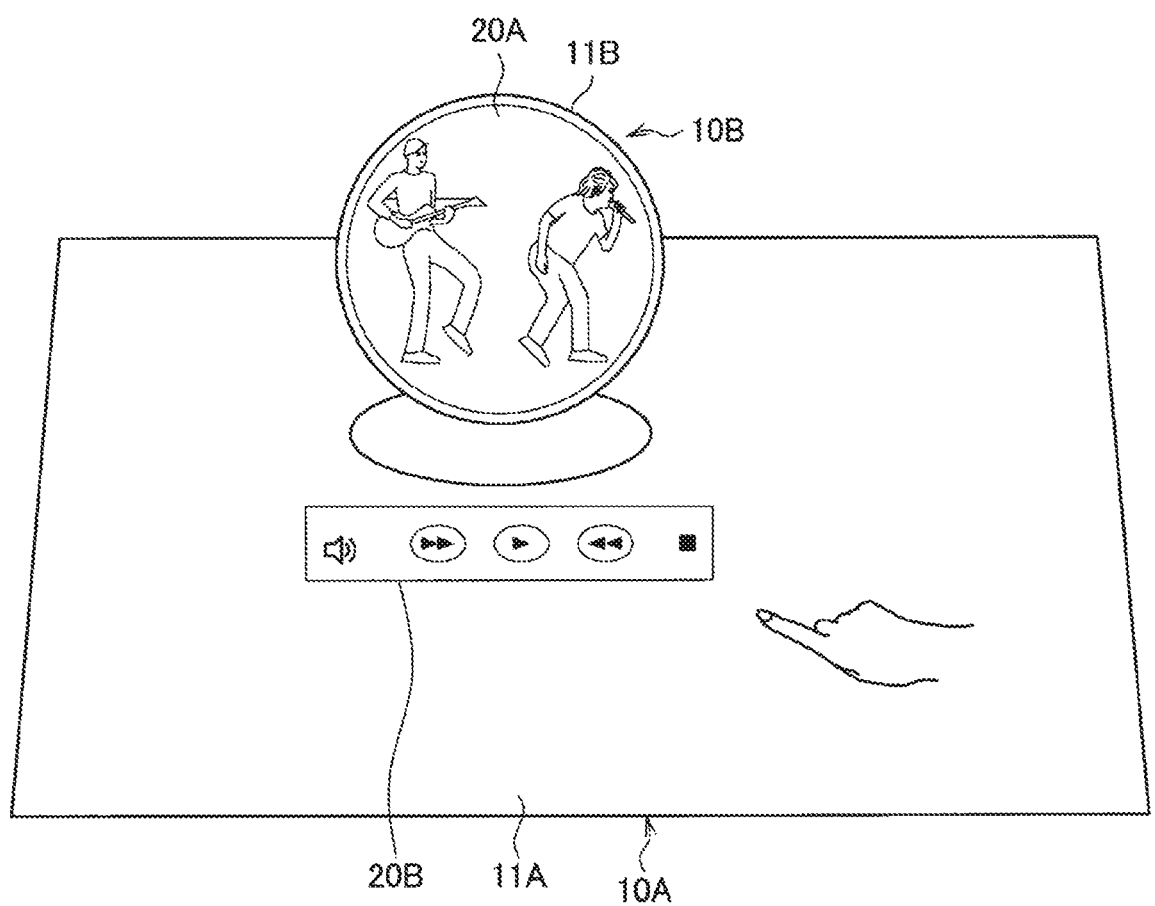
FIG. 29 is a diagram illustrating a specific example of the operated display object display control according to the embodiment.

FIG. 29 is a diagram illustrating a specific example of an operated display object display control according to the present embodiment. As illustrated in FIG. 29, a real object 10B is placed on a table 10A. A top surface 11A of the table 10A is the first display surface, and a circular inclined surface 11B of the real object 10B is the second display surface. A music player application is displayed on the second display surface 11B as the display object 20A. The first display surface 11A is assumed to be capable of receiving user operation, but the second display surface 11B is assumed to be incapable of receiving user operation. Thus, the display control unit 132 moves the display object 20B displayed as the display object 20A for receiving user operation on the music player application, to a region in the first display surface 11A adjacent to the second display surface 11B. Thus, the user can operate the music player application displayed as the display object 20A by touching a play button, a pause button, or the like of the display object 20B.

In the example illustrated in FIG. 29, the display object 20B is displayed in the facing direction of the first display surface 11A on which the related display object 20A (the direction in which the inclined surface is inclined) is displayed. The display position of the operated display object 20B is not limited to this example. Another example will be described with reference to FIG. 30.

Figure 30:
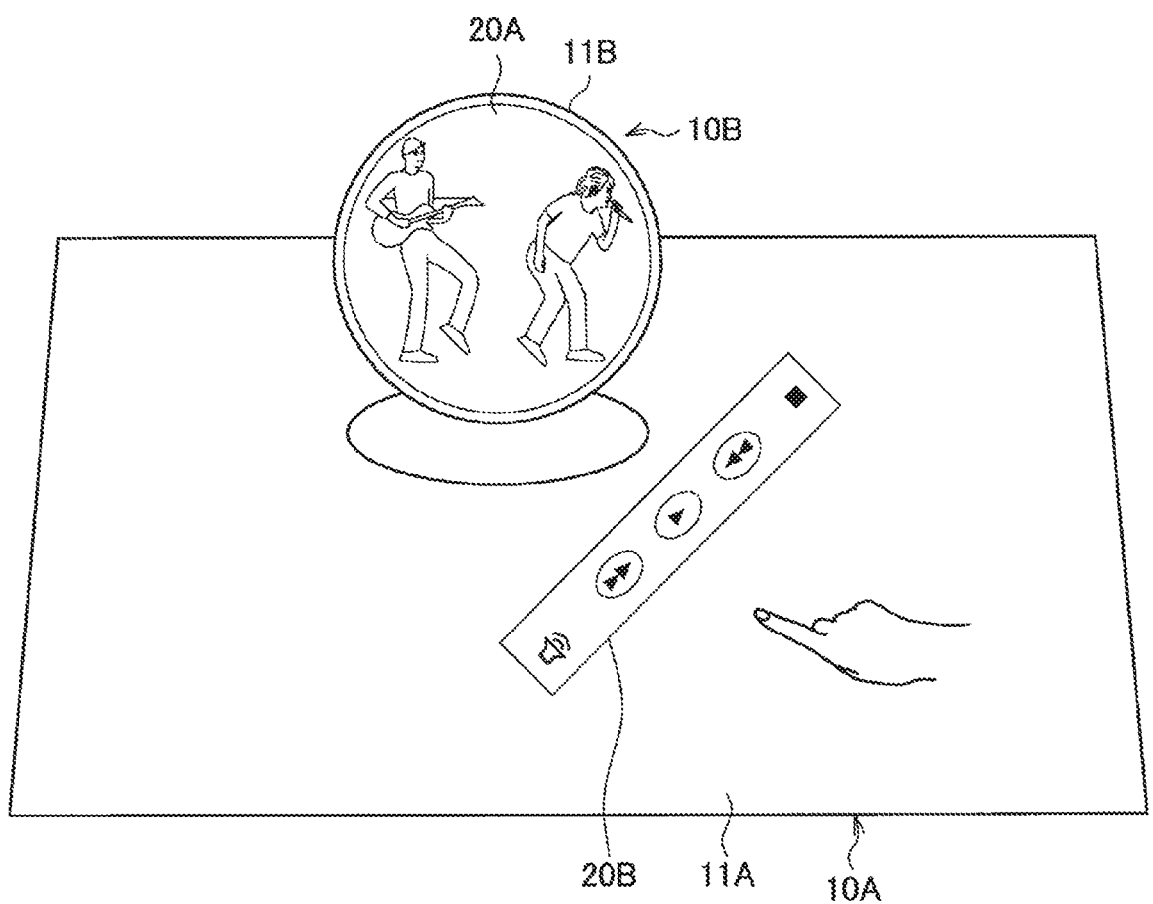
FIG. 30 is a diagram illustrating a specific example of the operated display object display control according to the embodiment.

FIG. 30 is a diagram illustrating a specific example of operated display object display control according to the present embodiment. The specific example illustrated in FIG. 30 is different from the specific example described with reference to FIG. 29 only in the display position of the display object 20B. In this specific example, the display object 20B is displayed in the direction of the user's finger. The user is assumed to exist in the direction of the user's finger as viewed from the display position of the display object 20A. Thus, with the display object 20B displayed in the direction of the user's finger, the display object 20B can be displayed to face the user. Therefore, the user can more easily operate the music player application displayed as the display object 20A. Note that this user's finger may be, for example, a finger after the flicking operation to move the display object 20A to the inclined surface 11A of the real object 11B.

(4.4) Correction Process

Hereinafter, an example of the correction process will be described.

Coordinate Correction Process

The display control unit 132 applies coordinate correction based on the gradient of the display surface, to the display object. When the display surface has a gradient, that is, when the optical axis of the projector and the display surface are not orthogonal with each other, the display control unit 132 performs affine transformation based on the magnitude of the gradient. Thus, the display object can be displayed on the display surface with a gradient, without being distorted. When the shape of the display surface is a curved surface or the like, the display control unit 132 applies coordinate correction conforming to the shape of the display surface to the display object. Thus, the display object can be displayed on a display surface that is a non-planer surface such as a curved surface, without being distorted.

Re-Layout Process

The display control unit 132 changes the internal layout of the display object based on the size (area) or shape of the display surface. A display object may include a plurality of UI elements such as icons, images, or frames. In such a case, the display control unit 132 changes the arrangement of UI elements, enlarges/reduces each UI element, or activates a scroll function inside the display object to hide some UI elements. As a result, the size or the shape of the display object fits the display surface. Thus, the display object fitted to the display surface can be displayed.

Color Correction Process

The display control unit 132 applies color correction based on the color of the display surface, to the display object. The display control unit 132 applies color correction based on a color complementary to the color of the display surface, to the display object. For example, when the color of the display surface is pink, the display control unit 132 applies color correction for adjusting the color balance to blue, on the display object. As a result, the white region of the display object can still be displayed in white on the pink display surface.

An example of the correction process is as described above.

When mapping and displaying the display object on the display surface, the display control unit 132 performs various correction processes on the display object depending on the situation. Examples of a situation where it is desirable to apply the re-layout process include a situation where the shapes of the display surface and the display object do not match or a situation where the areas of the display surface and the display object do not match. Examples of a situation where it is desirable to apply the coordinate correction process include a situation where the display surface has gradient, or a situation where the display surface is non-planer. Examples of a situation where it is desirable to apply the color correction process include a situation where the color of the display surface is not white.

The display control unit 132 attempts a correction process to be applied depending on the situation, when selecting a display surface for displaying a display object. Then, the display control unit 132 selects a display surface on which all the correction processes to be applied have been successfully performed, as a display surface for displaying the display object. Successful correction process indicates that the result of the correction process on the display object is within an acceptable range. A failure of the correction process indicates that the result of the correction process on the display object is outside the acceptable range. The acceptable range is a range enabling a predetermined visibility to be ensured when the corrected display object is displayed. Typically, the re-layout process fails when the area of the display surface is smaller than a predetermined value, and the coordinate correction process fails when the gradient of the display surface is too large.

Specific Example

Figure 31:
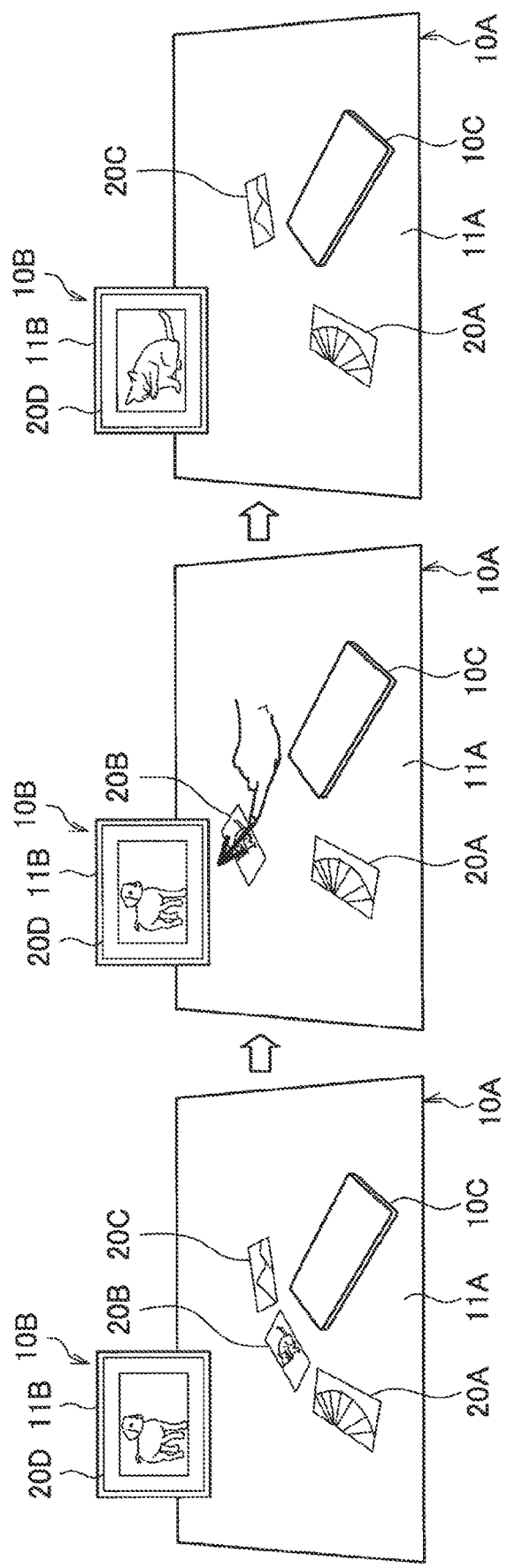
FIG. 31 is a diagram illustrating a specific example of a coordinate correction process according to the embodiment.

FIG. 31 is a diagram illustrating a specific example of the coordinate correction process according to the present embodiment. As illustrated in a left diagram of FIG. 31, a real object 10B is placed on a table 10A. A top surface 11A of the table 10A is the first display surface, and an inclined surface 11B of the real object 10B is the second display surface. When the user places a smartphone 10C on the table 10A, the information processing system 100 acquires an image from the smartphone 10C through wireless communications with the smartphone 10C. Then, the information processing system 100 displays the acquired images as display objects 20A to 20C on the first display surface 11A in the vicinity of the smartphone 10C. A display object 20D is displayed on the second display surface 11B. The display object 20D is an image viewing application that has an outer view of a photo frame, can display an image therein, and is currently displaying an image of a dog. As illustrated in the center diagram of FIG. 31, the user is assumed to have flicked the display object 20B in the direction of the second display surface 11B (i.e., the display object 20D). As a result, as illustrated in a right diagram of FIG. 31, an image of a cat displayed as the display object 20B moves to the position of the display object 20D to be processed by the image viewing application (that is, to be displayed). When the image moves, the display control unit 132 performs the coordinate correction process based on the gradient of the second display surface 11B. Due to this coordinate correction process, the image flicked to the second display surface 11B is displayed on the second display surface 11B without being distorted.

FIG. 32 is a diagram illustrating a specific example the coordinate correction process according to the present embodiment. As illustrated in the upper-left diagram of FIG. 32, a real object 10B is placed on a table 10A. A top surface 11A of the table 10A is the first display surface, and an inclined surface 11B of the real object 10B is the second display surface. The second display surface is a curved surface curved toward a farther side. A display object 20 is displayed on the first display surface 11A. The display object 20 is an image. An image actually projected from the projector, as the display object 20, is illustrated in a lower left diagram of FIG. 32. The user is assumed to have flicked the display object 20 in a direction toward the second display surface 11B. As a result, as illustrated in an upper right diagram of FIG. 32, the display object 20 moves to the position of the second display surface 11B to be displayed on the second display surface 11B. When the display object moves, the display control unit 132 performs spherical coordinate transformation based on the curved shape of the second display surface 11B. A lower right diagram of FIG. 32 illustrates a corrected image to be actually projected from the projector as the display object 20. Due to this coordinate correction process, the image flicked to the second display surface 11B is displayed on the second display surface 11B without being distorted.

Figure 33:
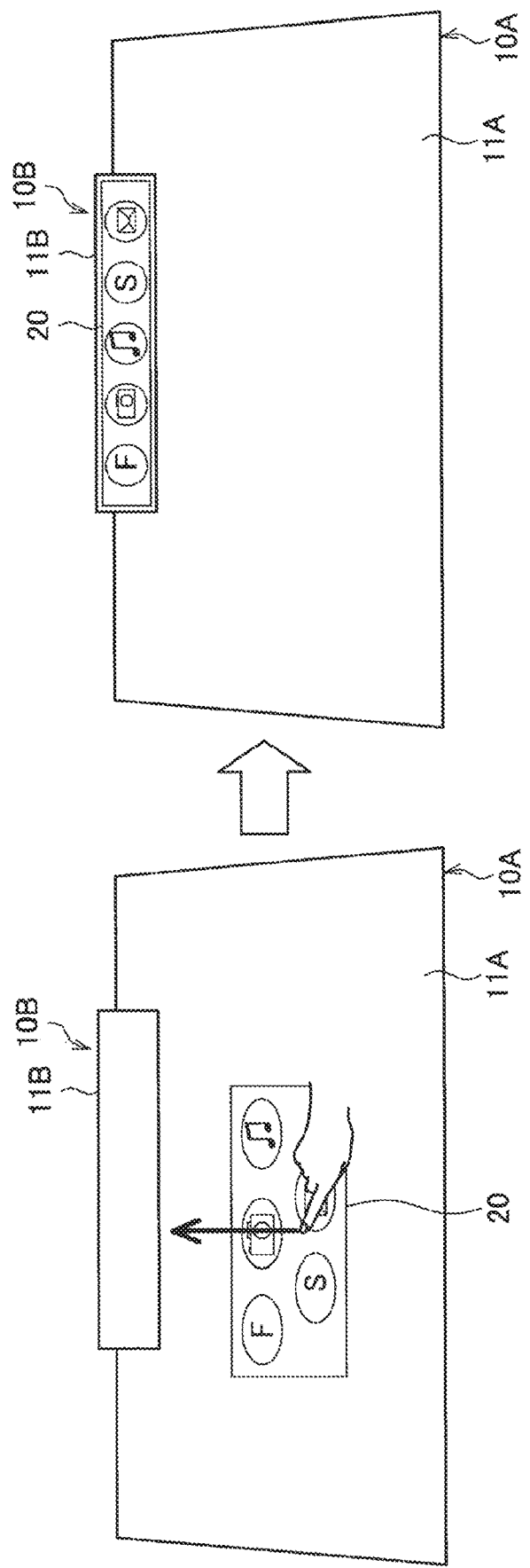
FIG. 33 is a diagram illustrating a specific example of a re-layout process according to the embodiment.

FIG. 33 is a diagram illustrating a specific example of a re-layout process according to the present embodiment. As illustrated in a left diagram of FIG. 33, a real object 10B is placed on a table 10A. A top surface 11A of the table 10A is the first display surface. An inclined surface 11B of the real object 10B is the second display surface. A display object 20 is displayed on the first display surface 11A. The display object 20 has a structure in which a plurality of icons are arranged in a form of tiles. The user is assumed to have flicked the display object 20 in a direction toward the second display surface 11B. As a result, as illustrated in a right diagram of FIG. 33, the display object 20 moves to the position of the second display surface 11B to be displayed on the second display surface 11B. When moving the image, the display control unit 132 performs a re-layout process to linearly arrange the icons included in the display object 20 to be suitable for the elongated shape of the second display surface 11B that is narrower in the vertical direction and longer in the horizontal direction than the display object 20 before the movement. With such a re-layout process, the display object 20 can be displayed to be visible on the second display surface 11B.

Figure 34:
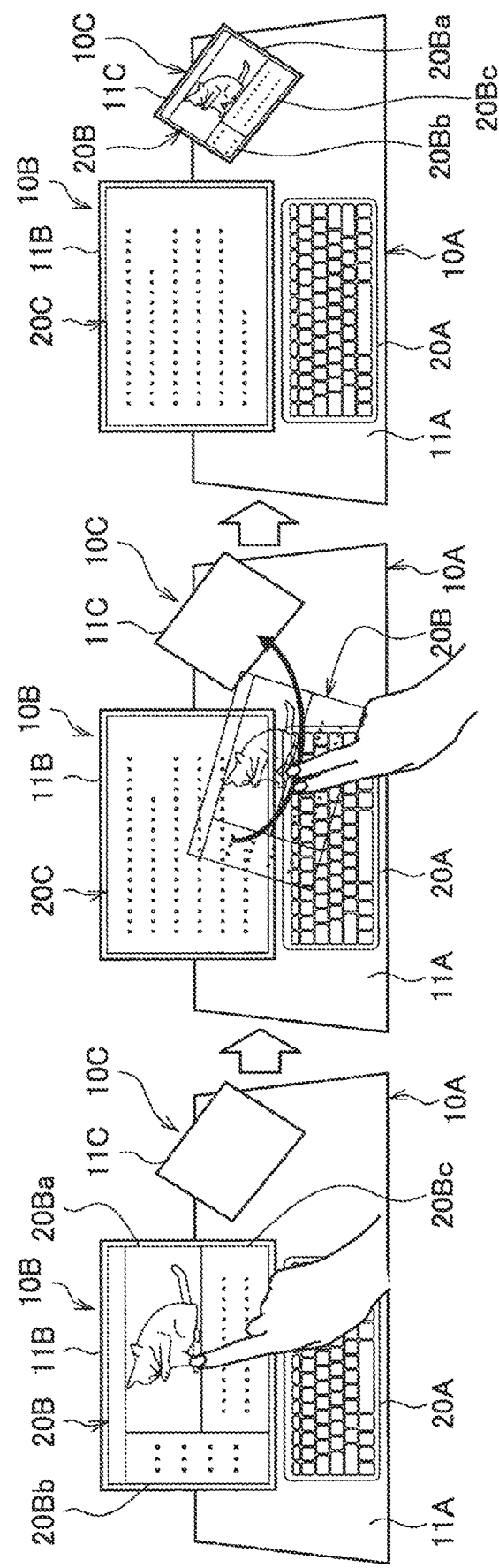
FIG. 34 is a diagram illustrating a specific example of the re-layout process according to the embodiment.

FIG. 34 is a diagram illustrating a specific example of the re-layout process according to the present embodiment. As illustrated in a left diagram of FIG. 34, real objects 10B and 10C are placed on a table 10A. A top surface 11A of the table 10A is the first display surface. An inclined surfaces 11B and 11C of the real objects 10B and 10C are the second display surfaces. A display object 20A is displayed on the first display surface 11A, and a display object 20B is displayed on the second display surface 11B. The display object 20A is an on-screen keyboard and receives user operations for the display object 20B. The display object 20B is a web browser application. The display objects 20A and 20B can receive user operations. Note that touching using one finger can be received as a user operation for Web browsing, for example. In the display object 20B, a UI element 20B*b* is arranged on the left side, a UI element 20B*a* is arranged on the upper right side of the UI element 20B*b*, and a UI element 20B*c* is arranged on the lower right side of the UI element 20B*b*.

As illustrated in a center diagram of FIG. 34, the user is assumed to have dragged and dropped the display object 20B onto the display surface 11C. For example, a dragging and dropping operation using two fingers is received as a user operation for moving the display object 20B. As a result, as illustrated in a right diagram of FIG. 34, the display object 20B moves to the position of the display surface 11C to be displayed on the display surface 11C. When the display object is moved, the display control unit 132 performs a re-layout process to change the arrangement of the UI elements 20B*a* and 20B*b* included in the display object 20B, due to the reduction in the area of the display surface before and after the movement. In the display object 20B after the re-layout process, the UI element 20B*a* is arranged on the upper side, the UI element 20B*b* is arranged on the lower left side of the UI element 20B*a*, and the UI element 20B*c* is arranged on the lower right side of the UI element 20B*a*. With such a re-layout process, the display object 20B can be displayed to be visible on a display surface after the movement that is smaller than the display surface before the movement. Note that the display object 20C that was hidden beneath the display object 20B is displayed on the display surface 11B from which the display object 20B has moved.

FIG. 35 is a diagram illustrating a specific example of the color correction process according to the present embodiment. As illustrated in an upper-left diagram of FIG. 35, a real object 10B is placed on a table 10A. A top surface 11A of the table 10A is the first display surface, and an inclined surface 11B of the real object 10B is the second display surface. The second display surface 11B is assumed to be colored in pink. A display object 20 is displayed on the first display surface 11A. The display object 20 is an image. An image actually projected from the projector, as the display object 20, is illustrated in a lower left diagram of FIG. 35. The user is assumed to have flicked the display object 20 in a direction toward the second display surface 11B. As a result, as illustrated in an upper right diagram of FIG. 35, the display object 20 moves to the position of the second display surface 11B to be displayed on the second display surface 11B. When the display object moves, the display control unit 132 performs the color correction process based on the color of the second display surface 11B. Because the color of the second display surface 11B as the movement destination is pink, the display control unit 132 applies color correction for adjusting the color balance to blue, on the display object 20. A lower right diagram of FIG. 35 illustrates an image after the color correction to be actually projected from the projector as the display object 20. By such a color correction process, the image flicked to the second display surface 11B is naturally displayed on the second display surface 11B, as in the case where the color of the second display surface is white.

(5) Other Display Control Process

Feedback Indicating that Mvement cannot be Performed

When there is no display surface suitable as the movement destination of the display object, the display control unit 132 performs feedback indicating that the movement cannot be performed. Various feedbacks that indicate that the movement cannot be performed are conceivable. For example, the display control unit 132 may move the display object as the movement target back to the original position. Such a feedback indicating that the movement cannot be performed can notify the user of the absence of the display surface that is suitable as the movement destination of the display object.

Figure 36:
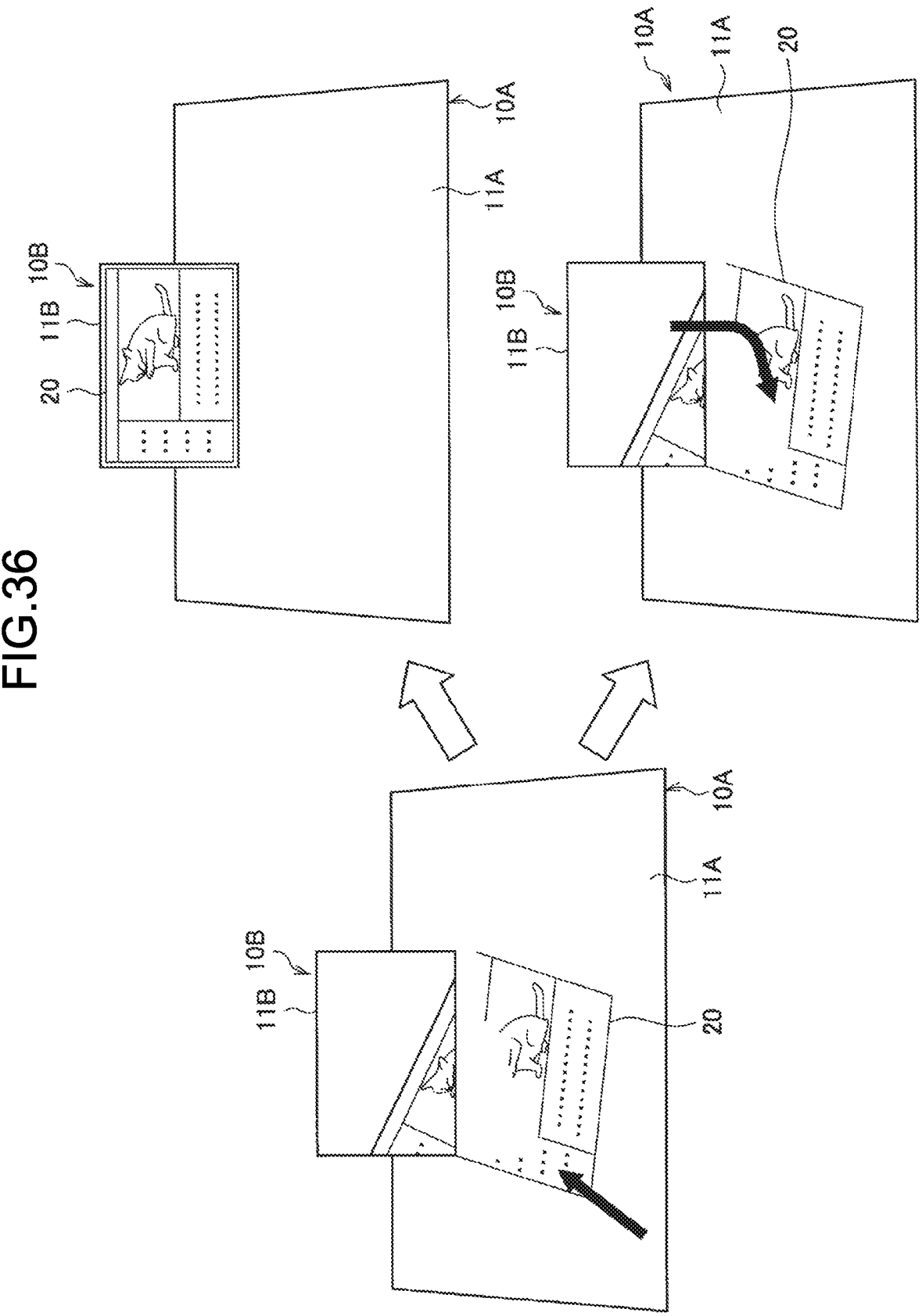
FIG. 36 is a diagram illustrating a specific example of a feedback indicating that movement cannot be performed according to the embodiment.

FIG. 36 is a diagram illustrating a specific example of the feedback indicating that the movement cannot be performed according to the present embodiment. As illustrated in a left diagram of FIG. 36, a real object 10B is placed on a table 10A. A top surface 11A of the table 10A is the first display surface, and an inclined surface 11B of the real object 10B is the second display surface. The user is assumed to have flicked the display object 20 displayed in the first display surface 11A in a direction toward the second display surface 11B. When the second display surface 11B is suitable as a movement destination, the display object 20 moves to the second display surface 11B to be displayed on the second display surface 11B, as illustrated in an upper right diagram of FIG. 36. On the other hand, when the second display surface 11B is not suitable as the movement destination, the display object 20 once moves toward the second display surface 11B, but returns to the first display surface 11A, as illustrated in a lower right diagram of FIG. 36. With such a feedback, the user can recognize that the second display surface 11B is not suitable as the movement destination of the display object 20.

Display Control in Response to Change in State of Display Surface

The display control unit 132 controls display of the display object in response to a change in the state of the display surface on which the display object is displayed. For example, the display control unit 132 may perform the coordinate correction process when the gradient or shape of the display surface changes. Furthermore, the display control unit 132 may perform the re-layout process when the area of the display surface is increased or decreased. The display control unit 132 may perform a color correction process when the color or the lightness of the display surface changes. The display control in response to a change in the state of the display surface enables the display object to be continuously displayed appropriately even when the state of the display surface changes.

Figure 37:
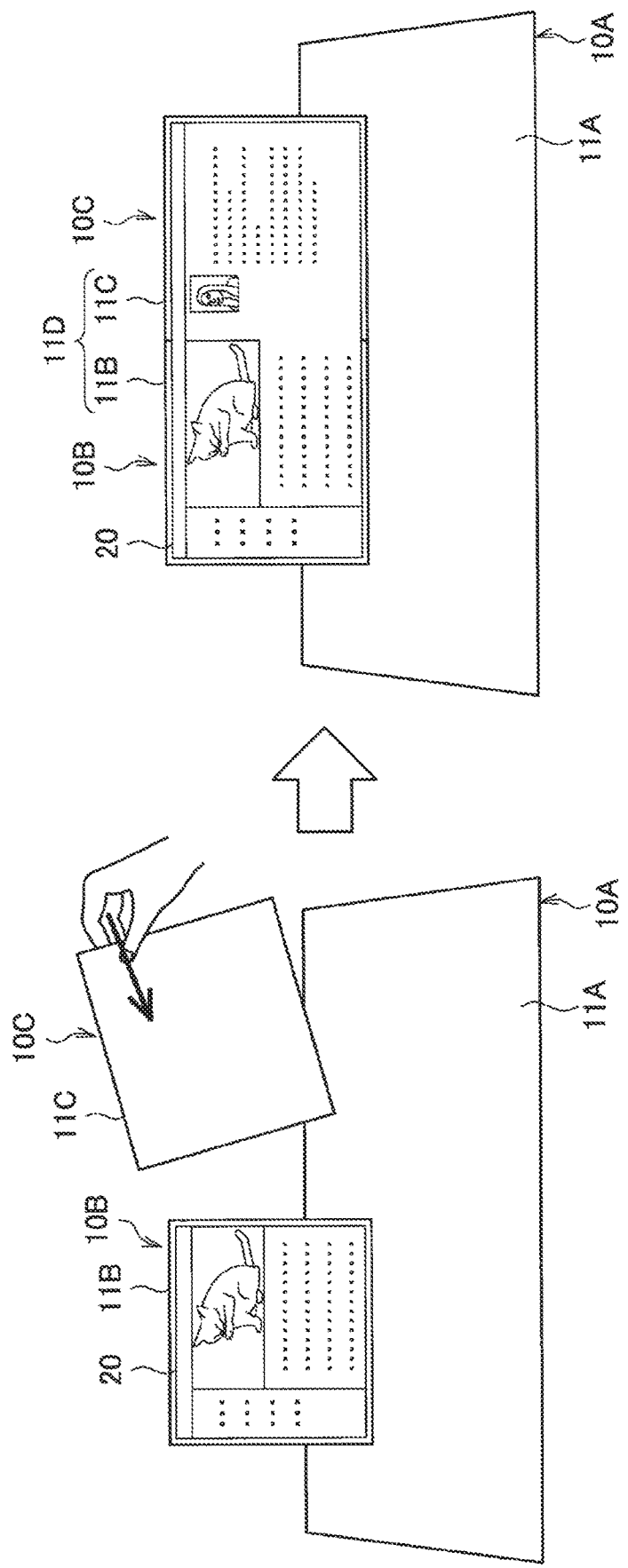
FIG. 37 is a diagram illustrating a specific example of display control in response to a change in a state of a display surface according to the embodiment.

FIG. 37 is a diagram illustrating a specific example of the display control in response to a change in the state of the display surface according to the present embodiment. As illustrated in a left diagram of FIG. 37, a real object 10B is placed on a table 10A. A top surface 11A of the table 10A is the first display surface, and an inclined surface 11B of the real object 10B is the second display surface. A display object 20 is displayed on the second display surface 11B. In such a situation, a real object 10C is assumed to be added to be arranged side by side with the real object 10B. As a result, as illustrated in a right diagram of FIG. 37, the inclined surface 11B of the real object 10B and the inclined surface 11C of the real object 10C are detected as one second display surface 11D. Therefore, the display control unit 132 performs a re-layout process so that the size of the display object 20 fits the second display surface 11D. In this manner, even when the area of the display surface on which the display object 20 is displayed changes, the display object 20 having a size that fits the display surface continues to be displayed.

Display Control in Response to Cancel Operation

When a predetermined user operation (that is, a cancel operation) is performed, the display control unit 132 cancels the display control based on the latest user operation. For example, when the cancel operation is performed after moving the display object in response to a user operation for moving the display object, the display control unit 132 displays the display object at a position before the movement. Various cancel operations are conceivable. For example, the cancel operation may be a double tap, a shaking the head, a uttering a word cancel, or the like. By performing display control in response to the cancel operation, the user can easily cancel the operation, whereby the user can enjoy higher usability.

Figure 38:
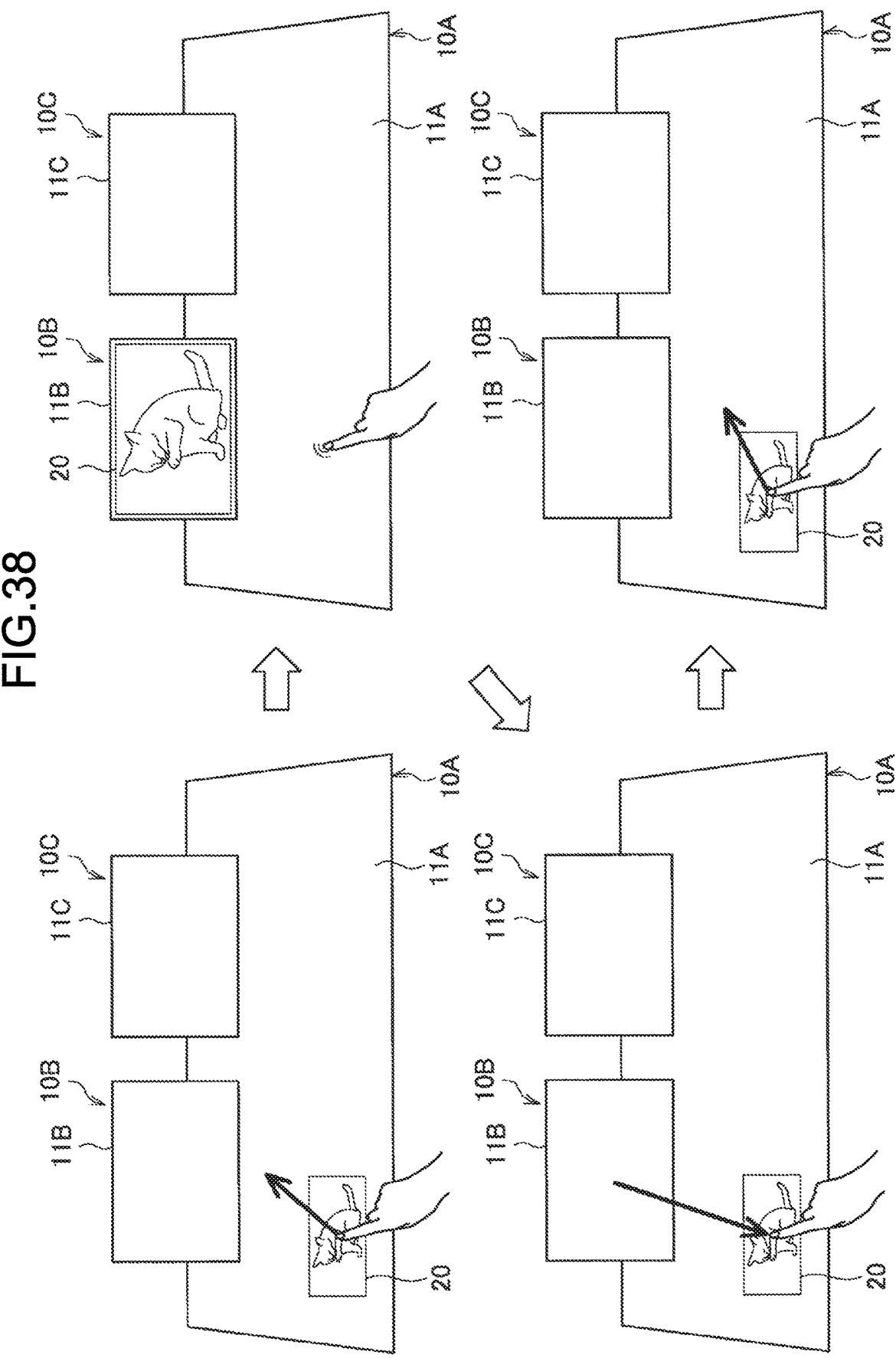
FIG. 38 is a diagram illustrating a specific example of display control in response to a cancel operation according to the embodiment.

FIG. 38 is a diagram illustrating a specific example of the display control in response to a cancel operation according to the present embodiment. As illustrated in an upper left diagram in FIG. 38, real objects 10B and 10C are placed on a table 10A. A top surface 11A of the table 10A is the first display surface, and an inclined surfaces 11B and 11C of the real objects 10B and 10C are the second display surfaces. The user is assumed to have flicked the display object 20 displayed in the first display surface 11A in a direction toward the second display surface 11B. As a result, as illustrated in an upper right diagram of FIG. 38, the display object 20 moves to the position of the second display surface 11B to be displayed on the second display surface 11B. When the movement destination intended by the user is not the second display surface 11B but is the second display surface 11C, the user performs a cancel operation by double tapping the first display surface 11A. As a result, as illustrated in a lower left diagram of FIG. 38, the movement of the display object 20 to the second display surface 11B is canceled, and the display object 20 returns to the original position. Thereafter, as illustrated in a lower right diagram of FIG. 38, the user retries flicking the display object 20 in the direction toward the second display surface 11C. As a result, the display object 20 moves to the position of the second display surface 11C to be displayed on the second display surface 11C.

(6) Conclusion

The information processing system 100 according to the present embodiment selects a surface of a real object on which a display object is mapped and displayed, based on the three-dimensional information on the real object. The selection candidates not only include the first display surface but also include the second display surface that is typically a surface of a real object placed on the first display surface. Therefore, the information processing system 100 can effectively use the surface of the real object existing in the real space.

The information processing system 100 automatically determines whether a surface in the real space can be used as a display surface. Therefore, the user can display the display object on a currently available display surface, meaning that there is no need to prepare a dedicated screen, clean up the room, or clean up the first display surface.

The information processing system 100 can optimize the display surface on which the display object is to be displayed and the content of the display object based on the properties of the display surface. For example, the information processing system 100 automatically determines whether the display surface is capable of receiving user operation, and selectively displays display objects that do not require user operations on display surfaces incapable of receiving user operation. On the other hand, the information processing system 100 can display the display object requiring user operation on a display surface incapable of receiving user operation, while separately displaying an operated display object. Thus, the information processing system 100 can perform flexible display control.

The information processing system 100 moves the display object based on a user operation. The information processing system 100 can move a display object to an optimal display surface based on the properties of the display object and the display surface, regardless of whether the user operation is for designating the movement destination or the movement direction. Furthermore, the information processing system 100 can seamlessly move display objects between the first surface and the second surface.

4. Second Embodiment

In a second embodiment, the surface on the user side of the real object held by the user is used as a display surface to display another display object corresponding to another real object in the direction of the back side of the display surface. First of all, an overview of an information processing system 100 according to the present embodiment will be described with reference to FIG. 39.

(1) Overview

Figure 39:
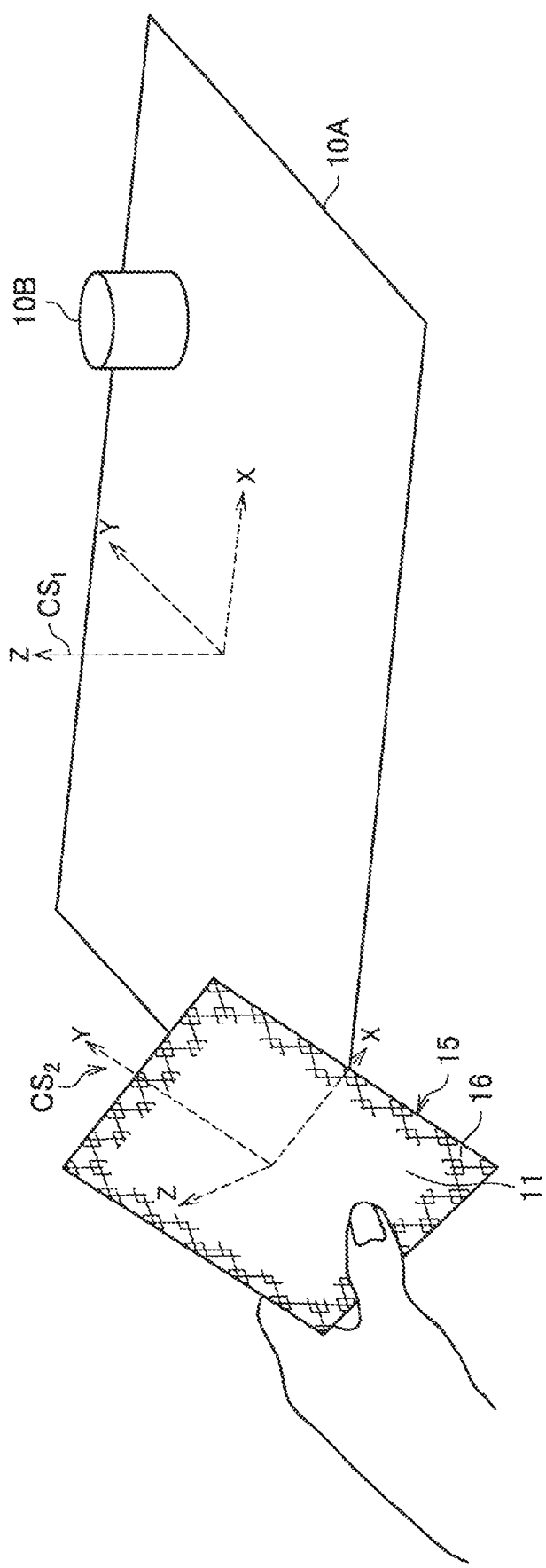
FIG. 39 is a diagram illustrating an overview of an information processing system according to a second embodiment.

FIG. 39 is a diagram illustrating an overview of an information processing system 100 according to the present embodiment. As illustrated in FIG. 39, a real object 10B is placed on a table 10A. In addition, the user is holding a real object 15 (corresponding to a first real object) by his or her hand. The information processing system 100 uses the surface on the user side as the display surface 11, among the surfaces of the real object 15. The information processing system 100 displays the display object on the display surface 11. Hereinafter, the real object 15 having the display surface 11 is also referred to as a screen. This screen 15 is a plate-like object made of any appropriate material such as paper, wood, or resin. As illustrated in FIG. 39, a marker 16 may be provided on the surface of the screen 15 in some cases. The marker 16 is used to detect the position and orientation of the display surface 11. In the example illustrated in FIG. 39, the area surrounded by the marker 16 is the display surface 11.

Referring to FIG. 39, a global coordinate system $CS_1$ that is a coordinate system in the real space and a local coordinate system $CS_2$ that is a coordinate system of the screen 15 are illustrated. The global coordinate system $CS_1$ is defined by an X axis and a Y axis that are two-dimensional coordinate axes on a horizontal plane, and by a Z axis that is an axis orthogonal to the XY plane. The local coordinate system $CS_2$ is defined by an X axis and a Y axis that are two-dimensional coordinate axes on the display surface 11, and by a Z axis that is an axis orthogonal to the XY plane. The global coordinate system $CS_1$ may be set in advance in the information processing system 100. The information processing system 100 acquires the local coordinate system $CS_2$ based on a captured image of the screen 15 or of the marker 16 provided on the screen 15 and the depth information. Then, the information processing system 100 recognizes the relative position and orientation of the global coordinate system $CS_1$ with respect to the local coordinate system $CS_2$ based on the global coordinate system $CS_1$ and the local coordinate system $CS_2$. Note that the coordinate axes attached to drawings are based on the local coordinate system $CS_2$.

The information processing system 100 displays a display object corresponding to an arbitrary real object in the real space on the display surface 11 of the screen 15. Such a real object is also referred to as a target object (also referred to as a second real object). For example, the information processing system 100 displays a display object corresponding to the real object 10B provided more on the depth direction side (−Z axis side of the local coordinate system $CS_2$) than the display surface 11, on the display surface 11.

Such display is the same as AR display in which an AR object is superimposed and displayed on a captured image while a captured image in the real space is displayed in real time by a terminal device including an imaging device, such as a smartphone and a display device. With the present embodiment, display that is equivalent to the AR display provided by a terminal device including an imaging device and a display device, can be provided by the screen 15 that does not include the imaging device or the display device.

(2) Overall Process Flow

Figure 40:
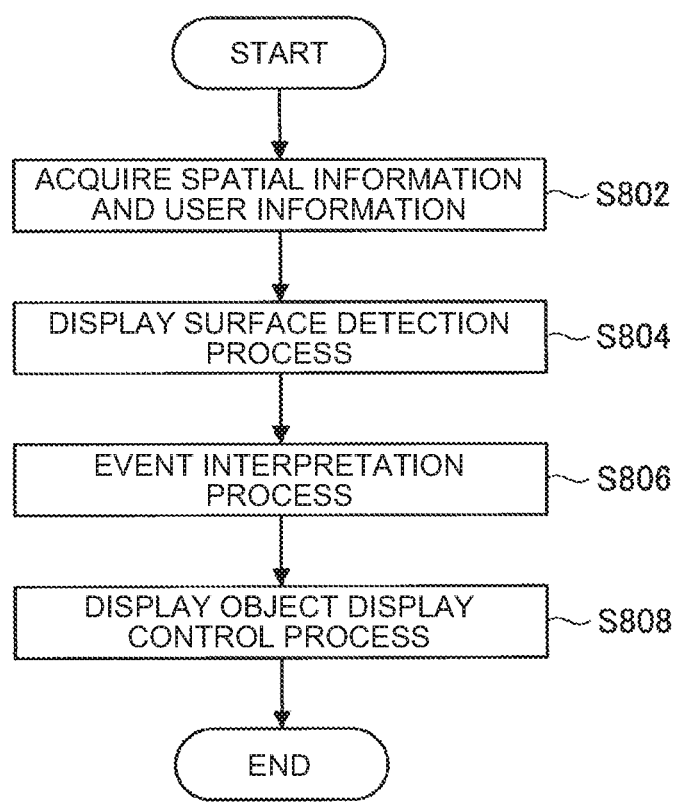
FIG. 40 is a flowchart illustrating an example of a flow of a display control process executed by the information processing system according to the embodiment

FIG. 40 is a flowchart illustrating an example of a flow of a display control process executed by an information processing system 100 according to the present embodiment. As illustrated in FIG. 40, the acquisition unit 120 first acquires the spatial information and user information (Step S802). Next, the display surface management unit 131 executes a display surface detection process (Step S804). Next, the display surface management unit 131 executes an event interpretation process (Step S806). Then, the display control unit 132 executes a display object display control process (Step S808).

The display surface detection process, the operability determination process, and the display object display control process will be described in detail below.

(3) Display Surface Detection Process

The display surface detection process according to the present embodiment includes the same process as the display surface detection process according to the first embodiment. In particular, in the present embodiment, the display surface management unit 131 detects the position and orientation of the screen, and detects the surface on the user side of the screen as the display surface.

For example, the display surface management unit 131 recognizes a user action based on the captured image and depth information, recognizes a real object held by the user as a screen, and detects the user side surface of the screen as the display surface based on the orientations of the screen and the user. In addition, the display surface management unit 131 may recognize a real object provided with a predetermined marker as a screen and detect a surface provided with the marker as a display surface. For example, the marker is of a predetermined form such as a barcode, a two-dimensional code, or a predetermined pattern, and is detected by image recognition on a captured image. The display surface management unit 131 detects the position and orientation of the display surface based on the position and orientation of the marker.

The markers are categorized into reference markers and related markers. The reference marker is a marker the detection result of which is used alone for the display control process. The reference marker may also be referred to as a first marker. The related marker is a marker the detection result of which is used in combination with the detection result of the reference marker, for the display control process. The related marker may also be referred to as a second marker. The screen is provided with at least a reference marker and may be additionally provided with one or more related markers.

The position and orientation of the display surface can be stored in the marker information accumulation table as the position and orientation of the marker. Table 6 below illustrates an example of items in the marker information accumulation table.

TABLE 6

Example of items in marker information accumulation table

| Marker ID | Position | Orientation |
| --- | --- | --- |

In Table 6 above, "Marker ID" indicates identification information on a marker, and "Position" and "Orientation" indicate the position and the orientation of the marker.

Hereinafter, an example of the flow of the display surface detection process using the marker information accumulation table illustrated in Table 6 will be described with reference to FIG. 41.

Figure 41:
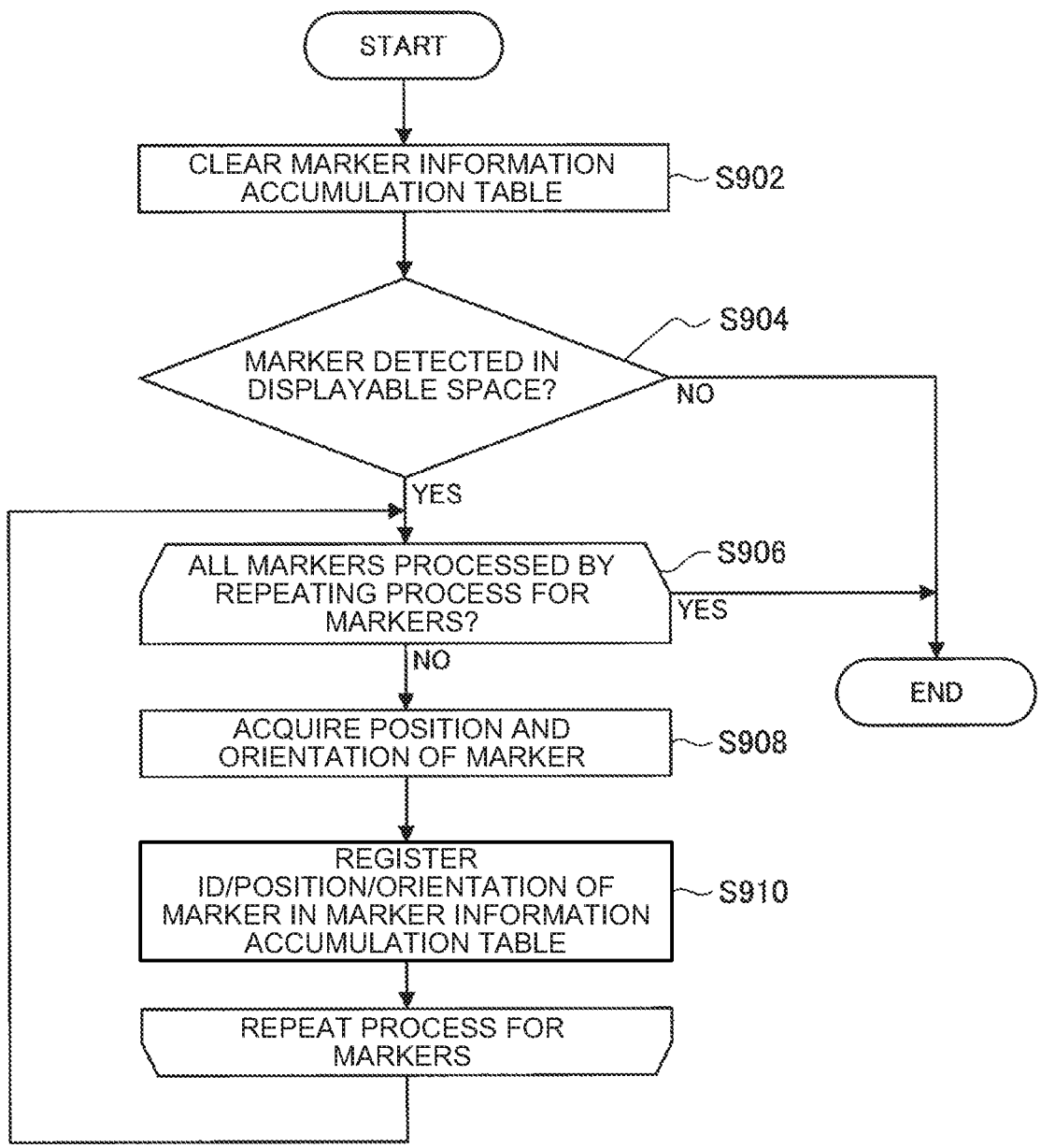
FIG. 41 is a flowchart illustrating an example of a flow of a display surface detection process executed by the information processing system according to the embodiment.

FIG. 41 is a flowchart illustrating an example of a flow of a display surface detection process executed by the information processing system 100 according to the present embodiment. As illustrated in FIG. 41, first of all, the display surface management unit 131 clears the marker information accumulation table (Step S902). Next, the display surface management unit 131 determines whether a marker is detected in a displayable space (Step S904). When it is determined that no marker is detected (Step S904/NO), the process ends. When it is determined that a marker is detected (Step S904/YES), the display surface management unit 131 determines whether all the detected markers have been processed (Step S906). Then, when there is an unprocessed marker (Step S906/NO), the display surface management unit 131 performs the following processes while switching the target marker. The display surface management unit 131 acquires the position and the orientation of the marker (Step S908). Next, the display surface management unit 131 registers the ID, the position, and the orientation of the marker in the marker information accumulation table (Step S910). The display surface management unit 131 repeats the processes related to Steps S908 to S910 for all the markers. When all the markers have been processed (Step S906/YES), the process ends.

(4) Event Interpretation Process

The event interpretation process is a process for determining whether a predefined event should be fired. The display control unit 132 determines whether a predefined event firing condition is satisfied. The event firing condition is defined based on a state such as the position and the orientation of the screen. When a marker is provided on the screen, the event firing condition is defined based on the position and the orientation of the marker. In the following description, it is assumed that the event firing condition is defined based on the position and the orientation of the marker. The event definition is stored in the event definition accumulation table. Table 7 below illustrates an example of items in the event definition accumulation table.

TABLE 7

Example of items in event definition accumulation table

| Reference marker | | | Related marker | | | Event | |
|---|---|---|---|---|---|---|---|
| ID | Position condition | Orientation condition | ID | Position condition | Orientation condition | Action | Firing flag |

One row of the event definition accumulation table corresponds to one event definition. The event definition includes information on a firing condition related to the reference marker, on a firing condition related to the related marker, and on an event fired when the firing condition is satisfied. The event definition may not include the firing condition for the related marker. The firing condition related to the reference marker includes an ID, a position condition, and an orientation condition of a reference marker. Thus, the firing condition is satisfied when the reference marker having a predetermined ID is in a predetermined orientation at a predetermined position. The same applies to related markers. The information on the event includes an action to be executed when the firing condition is satisfied, and a firing flag indicating whether the action is being executed.

An example of the flow of an event definition interpretation process using the event definition accumulation table illustrated in Table 7 will be described below with reference to FIG. 42.

Figure 42:
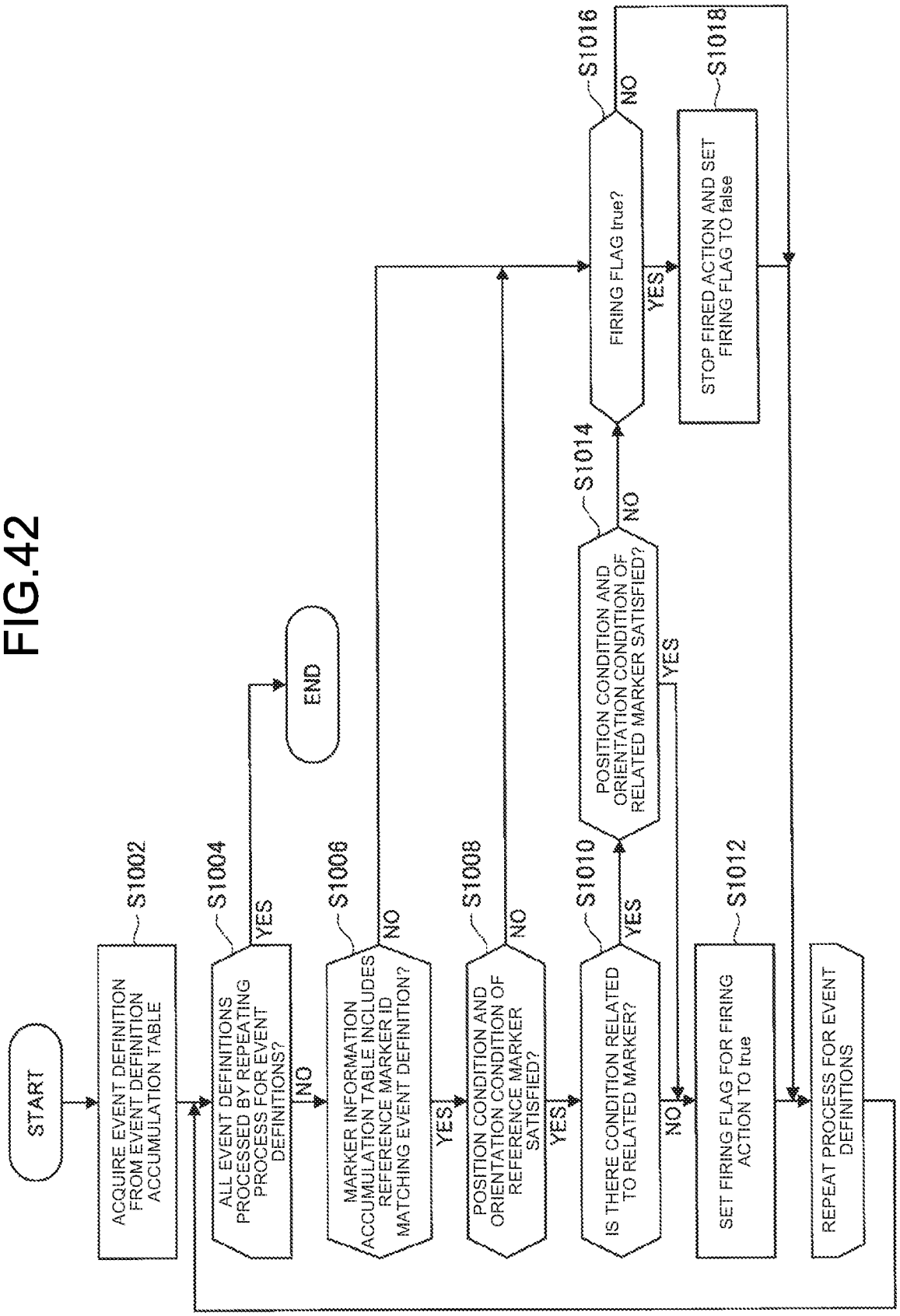
FIG. 42 is a flowchart illustrating an example of a flow of an event interpretation process executed by the information processing system according to the embodiment.

FIG. 42 is a flowchart illustrating an example of a flow of an event interpretation process executed by the information processing system 100 according to the present embodiment. As illustrated in FIG. 42, first of all, the display control unit 132 acquires an event definition from the event definition accumulation table (Step S1002). Next, the display control unit 132 determines whether all the event definitions have been processed (Step S1004). When there is an event definition that has not been processed yet (Step S1004/NO), the display control unit 132 performs the following processes while switching the target event definition.

The display control unit 132 determines whether the marker information accumulation table includes a reference marker ID that matches the event definition (Step S1006). When it is determined that the marker information accumulation table does not include the reference marker ID that matches the event definition (Step S1006/NO), the process proceeds to Step S1016 described later. On the other hand, when it is determined that the marker information accumulation table includes a reference marker ID that matches the event definition (Step S1006/YES), the display control unit 132 determines whether the position condition and orientation condition of the reference marker are satisfied (Step S1008). When it is determined that the position condition and the orientation condition of the reference marker are not satisfied (Step S1008/NO), the process proceeds to Step S1016 described later. On the other hand, when it is determined that the position condition and orientation condition of the reference marker are satisfied (Step S1008/YES), the display control unit 132 determines whether there is a condition related to the related marker (Step S1010). When it is determined that there is no condition related to the related marker (Step S1010/NO), the display control unit 132 fires the action related to the event definition and sets the firing flag to true (Step S1012). On the other hand, when it is determined that there is a condition related to the related marker (Step S1010/YES), the display control unit 132 determines whether the position condition and the orientation condition of the related marker are satisfied (Step S1014). When it is determined that the position condition and the orientation condition of the related marker are satisfied (Step S1014/YES), the process proceeds to Step S1012 described above. On the other hand, when it is determined that the position condition and the orientation condition of the related marker are not satisfied (Step S1014/NO), the display control unit 132 determines whether the firing flag is true (Step S1016). When it is determined that the firing flag is true (Step S1016/YES), the display control unit 132 stops the firing action and sets the firing flag to false (Step S1018). When it is determined that the firing flag is false (Step S1016/NO), the display control unit 132 ends the process related to the target event definition.

The display control unit 132 repeats the processing related to Steps S1006 to S1018 for all the event definitions. When all the event definitions have been processed (Step S1004/YES), the process ends.

(5) Display Control Process

The display control unit 132 maps and displays a display object, corresponding to a target object, on the surface of the screen, based on the relative relationship between the screen and the target object (that is, relative positions and/or relative orientations). Specifically, the display control unit 132 displays on the display surface, which is the surface on the user side among the surfaces of the screen, a display object corresponding to the target object located in the direction opposite to the user of the display surface (that is, the depth direction). Note that an action of positioning and orientating the screen to have the target object located in the depth direction may be referred to as capturing the target object within the display surface. When the user holds the screen so that the screen is positioned and orientated to have the target object captured within the display surface, the display surface corresponding to the target object is displayed on the display surface of the screen. Note that the target object is not limited to a real object, and may be other types of display objects.

The display control unit 132 performs displaying related to the event fired by the event interpretation process. Specifically, the display control unit 132 displays on the display surface, a display object based on the event definition that satisfies the firing condition.

The display control process according to the present embodiment will be described in detail below with reference to specific examples.

Product Display Using Marker

The display control unit 132 controls displaying of the display object based on the type of marker provided on the screen. As a result, the user can view a desired display object by selectively using screens with different markers. Furthermore, the display control unit 132 controls the displaying of the display object based on the distance between the screen and the target object. As a result, the user can view a desired display object by moving the screen toward and away from the target object. These points will be described with reference to specific examples illustrated in FIGS. 43 and 44. For the specific examples, event definitions illustrated in Table 8 below are assumed to be defined.

demonstrate the waterproofness. Furthermore, a marker 16B is provided on a screen 15B held by a user. The marker 16B corresponds to a reference marker the ID of which is 2. The watch 10B is captured within a display surface 11B within a frame as the marker 16B. In this state, the display control unit 132 displays a display object 20B indicating the three-dimensional model of the watch 10B on the display surface 11B. The display object 20B displayed on the display surface 11B will be described with reference to FIG. 44.

Figure 44:
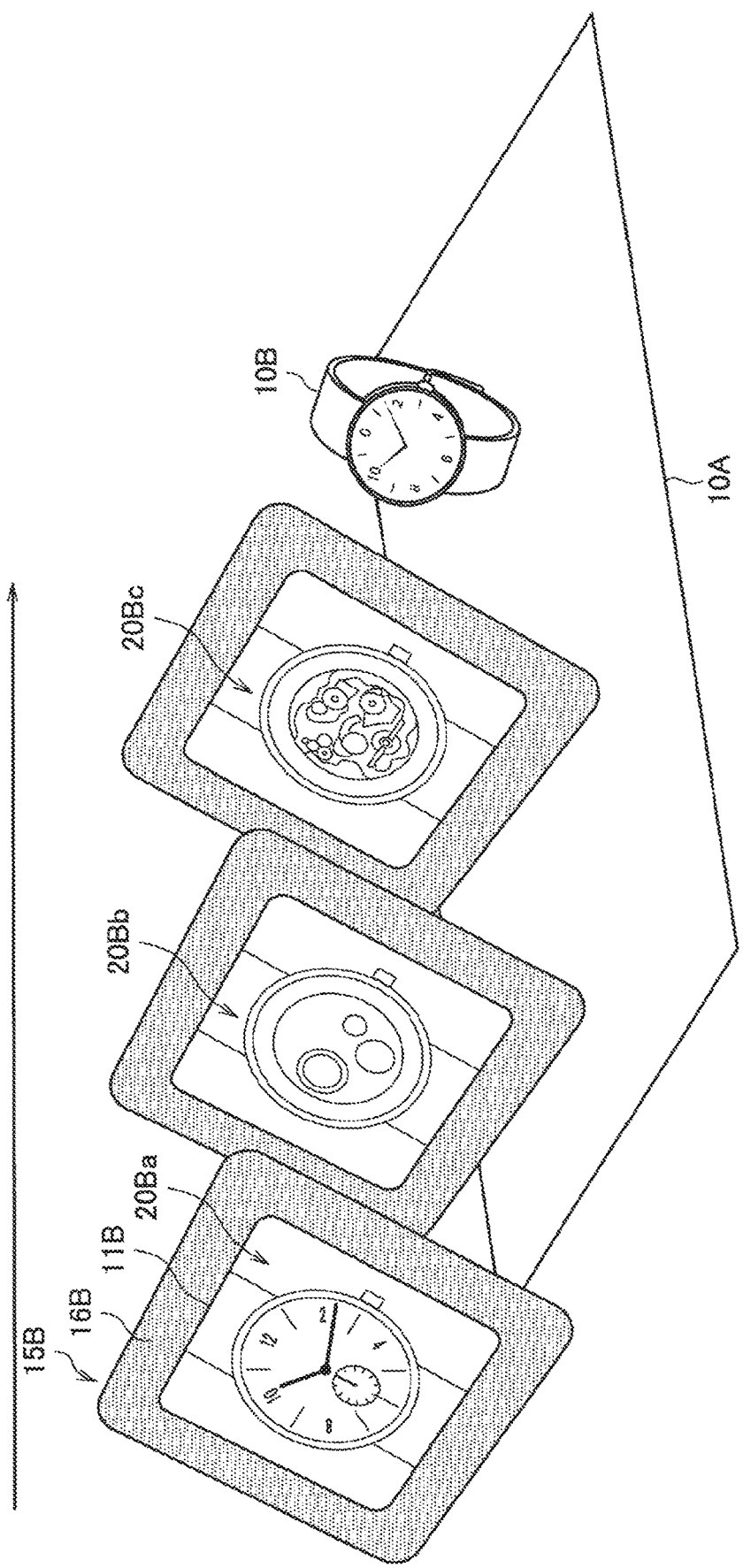
FIG. 44 is a diagram illustrating a specific example of the product displaying using a marker according to the embodiment.

FIG. 44 is a diagram illustrating a specific example of product displaying using a marker according to the present embodiment. As illustrated in FIG. 44, when the distance between the screen 15B and the watch 10B is long (for example, 60 cm or more), a display object 20B*a* corresponding to a non-see-through three-dimensional model is displayed. At a shorter distance between the screen 15B and the watch 10B (for example, when the distance is not less than 30 cm and less than 60 cm), a display object 20B*b* corresponding to a see-through image of an internal structure of the watch 10B is displayed. At an even shorter distance between the screen 15B and the watch 10B (for example, when the distance is less than 30 cm), a display object 20B*c* corresponding to a see-through image of a further internal structure of the watch 10B is displayed.

Displaying of Three-Dimensional Model Based on Map

The display control unit 132 controls displaying of a display object based on an orientation of a screen. For

TABLE 8

Example of event definition accumulation table

| Reference marker | | Related marker | | Event | |
|---|---|---|---|---|---|
| ID | Position condition | Orientation condition | ID | Position condition | Orientation condition | Action | Firing flag |
| 1 | Position and angle at which watch is captured within display surface | — | — | — | — | Display movie demonstrating waterproofness | — |
| 2 | | | — | — | — | Display three-dimensional model. Switch three-dimensional model based on distance 60 cm or more: non-see-through image less than 60 cm: see-through image, internal structure layer 1 less than 30 cm: see-through image, internal structure layer 2 | — |

Figure 43:
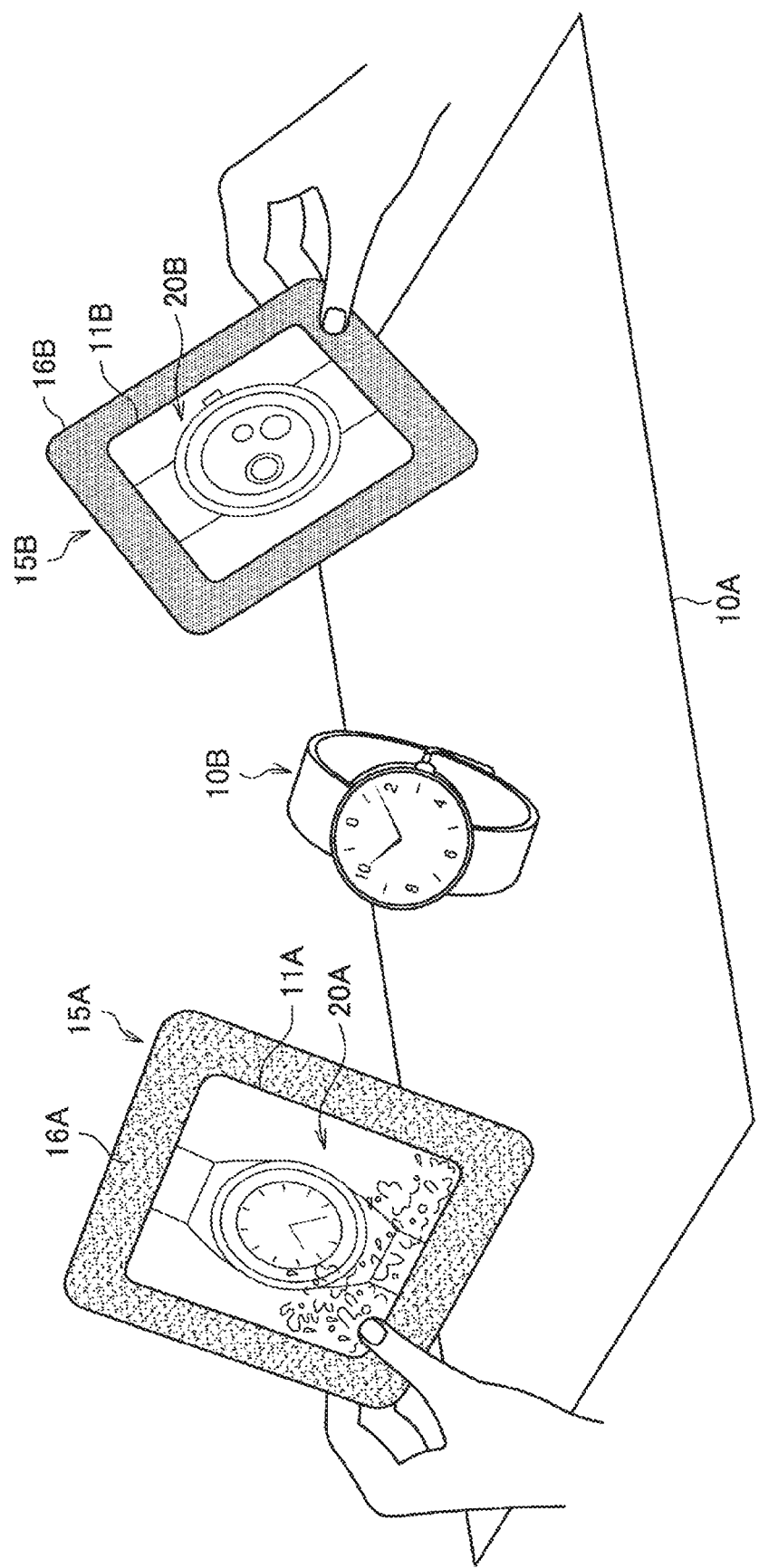
FIG. 43 is a diagram illustrating a specific example of product displaying using a marker according to the embodiment.

FIG. 43 is a diagram illustrating a specific example of product displaying using a marker according to the present embodiment. As illustrated in FIG. 43, a watch 10B as a target object is placed on a table 10A. A frame-shaped marker 16A is provided on a screen 15A held by a user. The marker 16A corresponds to a reference marker the ID of which is 1. The watch 10B is captured within the display surface 11A within the frame as the marker 16A. In this state, the display control unit 132 displays, on the display surface 11A, a display object 20A as a movie showing the watch 10B operating even when it is dipped in water to example, the display control unit 132 displays a three-dimensional model of a target object as a display object. In that case, the display control unit 132 scales the three-dimensional model according to the amount of rotation about the perpendicular line of the display surface. Furthermore, the display control unit 132 changes the orientation of the three-dimensional model according to the relative orientations of the target object and the display surface. This enables the user to scale or tilt the three-dimensional model by rotating or tilting the screen. These points will be described with reference to specific examples illustrated in FIGS. 45 to 47. For the specific examples, event definitions illustrated in Table 9 below are assumed to be defined.

TABLE 9

Example of event definition accumulation table

| Reference marker | | Related marker | | Event | |
|---|---|---|---|---|---|
| Position ID | Position condition | Orientation condition | Position ID | Orientation condition | Action | Firing flag |
| 1 | Position and angle at which map is captured within display surface | — | — | — | Display three-dimensional model. Magnification ratio is changed based on rotation in yaw direction, and inclination of three-dimensional model is changed based on rotation in pitch direction or roll direction. | — |

Figure 45:
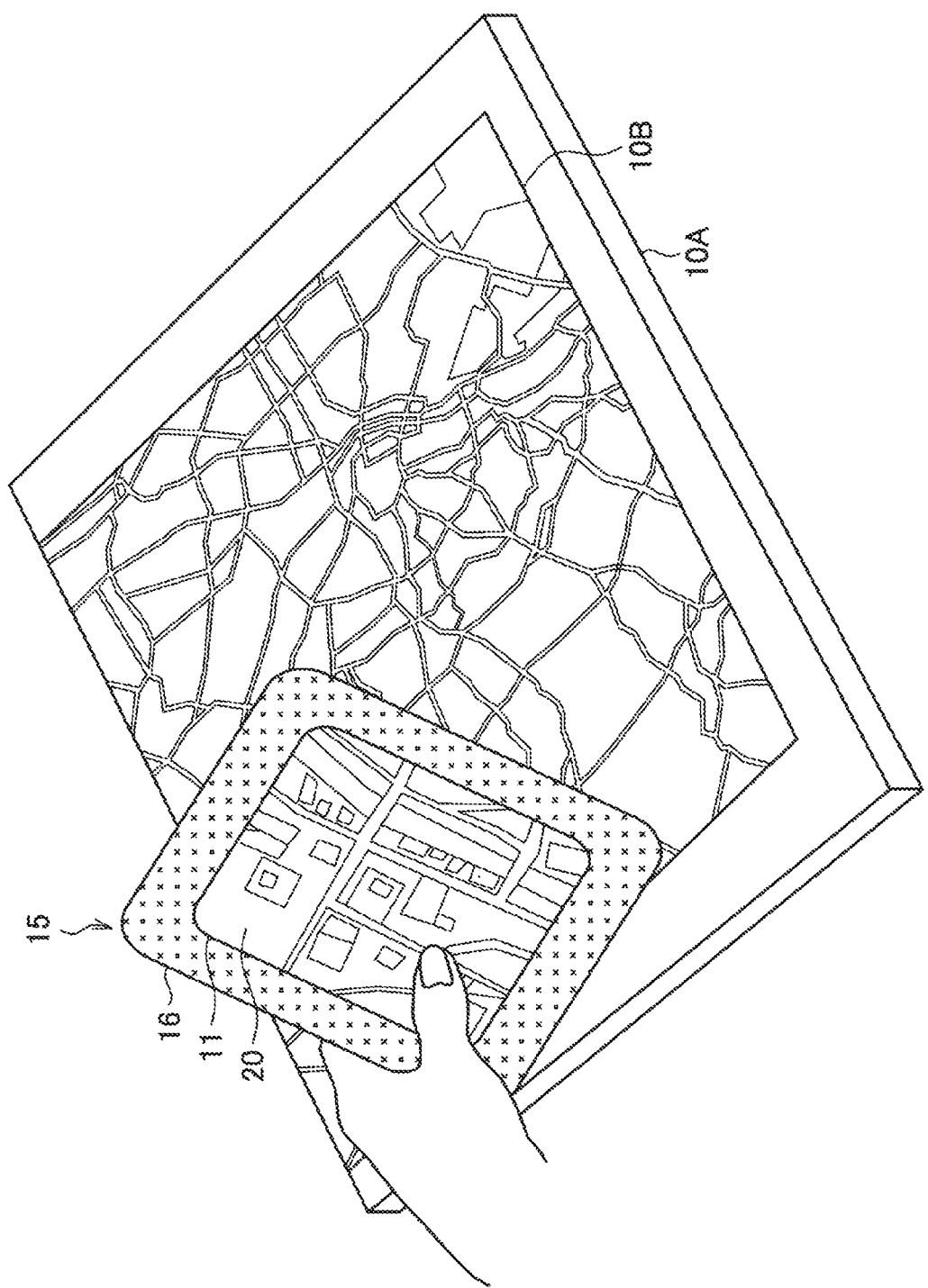
FIG. 45 is a diagram illustrating a specific example of displaying of a three-dimensional model based on a map, according to the embodiment.
Figure 46:
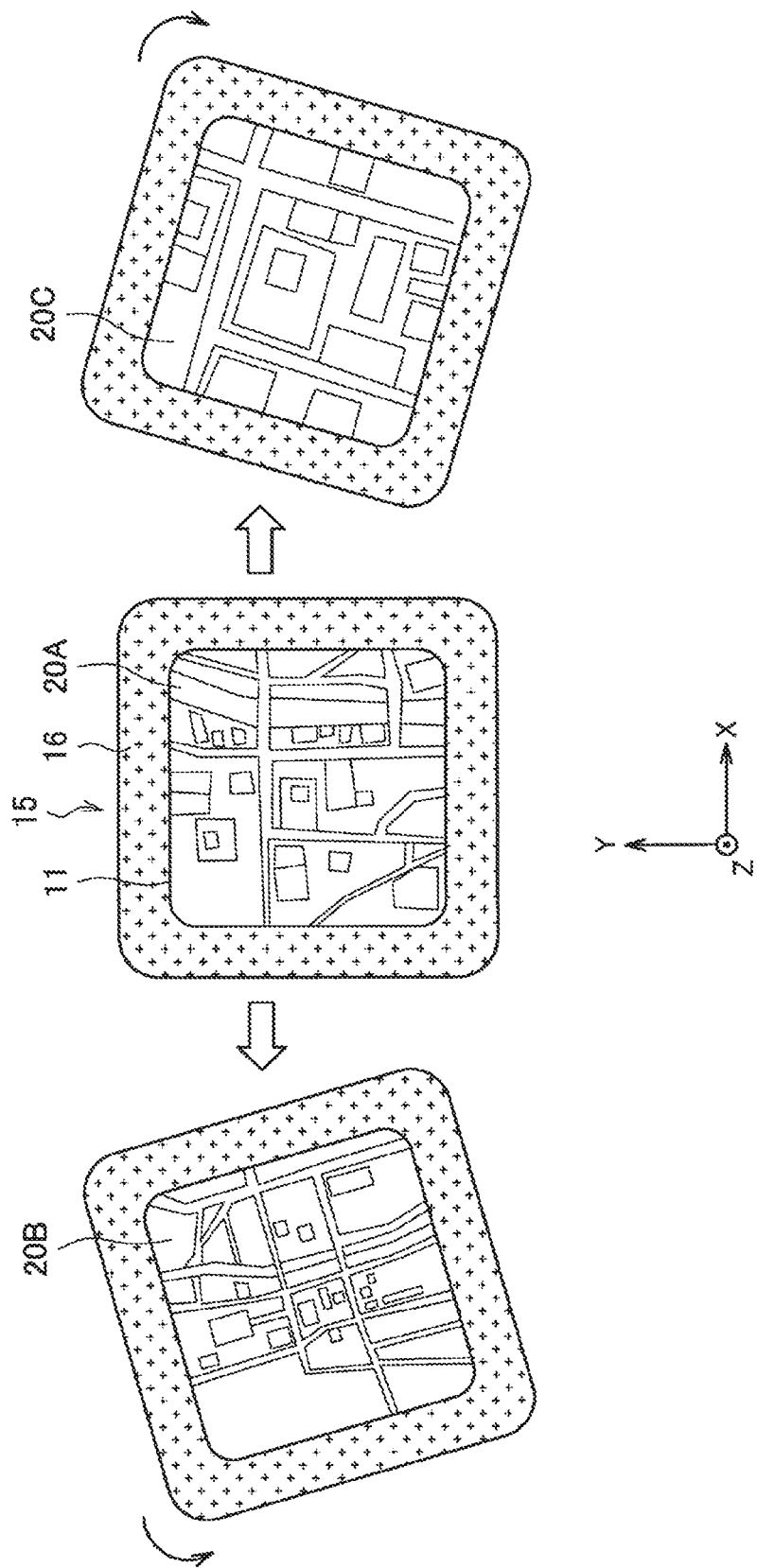
FIG. 46 is a diagram illustrating a specific example of displaying of a three-dimensional model based on a map, according to the embodiment.

FIG. 45 is a diagram illustrating a specific example of displaying of a three-dimensional model based on a map, according to the present embodiment. As illustrated in FIG. 45, a map 10B as a target object is placed on a table 10. A marker 16A is attached to a screen 15A held by the user. A marker 16 corresponds to a reference marker the ID of which is 1. The map 10B is captured within a display surface 11 within a frame as the marker 16. In this state, the display control unit 132 displays a display object 20 corresponding to the three-dimensional model of the map 10B on the display surface 11 as illustrated in FIG. 43. Which range of the map 10B is displayed as the three-dimensional model is As illustrated in FIG. 46, the display control unit 132 changes the magnification ratio of the three-dimensional model displayed as the display object 20 based on the rotation about the z axis (corresponding to the rotation in the yaw direction). Furthermore, as illustrated in FIG. 47, the display control unit 132 changes the orientation of the three-dimensional model displayed as the display object 20, based on the rotation about the x axis (corresponding to the rotation in the pitch direction) or the rotation about the y axis (corresponding to the rotation in the roll direction).

FIG. 46 is a diagram illustrating a specific example displaying of a three-dimensional model based on a map, according to the present embodiment. As illustrated in a center diagram of FIG. 46, in a state where the screen 15 is not rotated about the z axis (that is, a state where the display surface 11 is not rotated about the z axis), the display control unit 132 displays a three-dimensional model as a display object 20A at a default magnification ratio. As illustrated in a left diagram of FIG. 46, when the user rotates the screen 15 counterclockwise about the z axis, the display control unit 132 displays a zoomed-out three-dimensional model as a display object 20B. As illustrated in a right diagram of FIG. 46, when the user rotates the screen 15 clockwise about the z axis, the display control unit 132 displays a zoomed-in three-dimensional model as the display object 20B. The zoom-out/zoom-in magnification is based on the amount of rotation in the corresponding direction.

Figure 47:
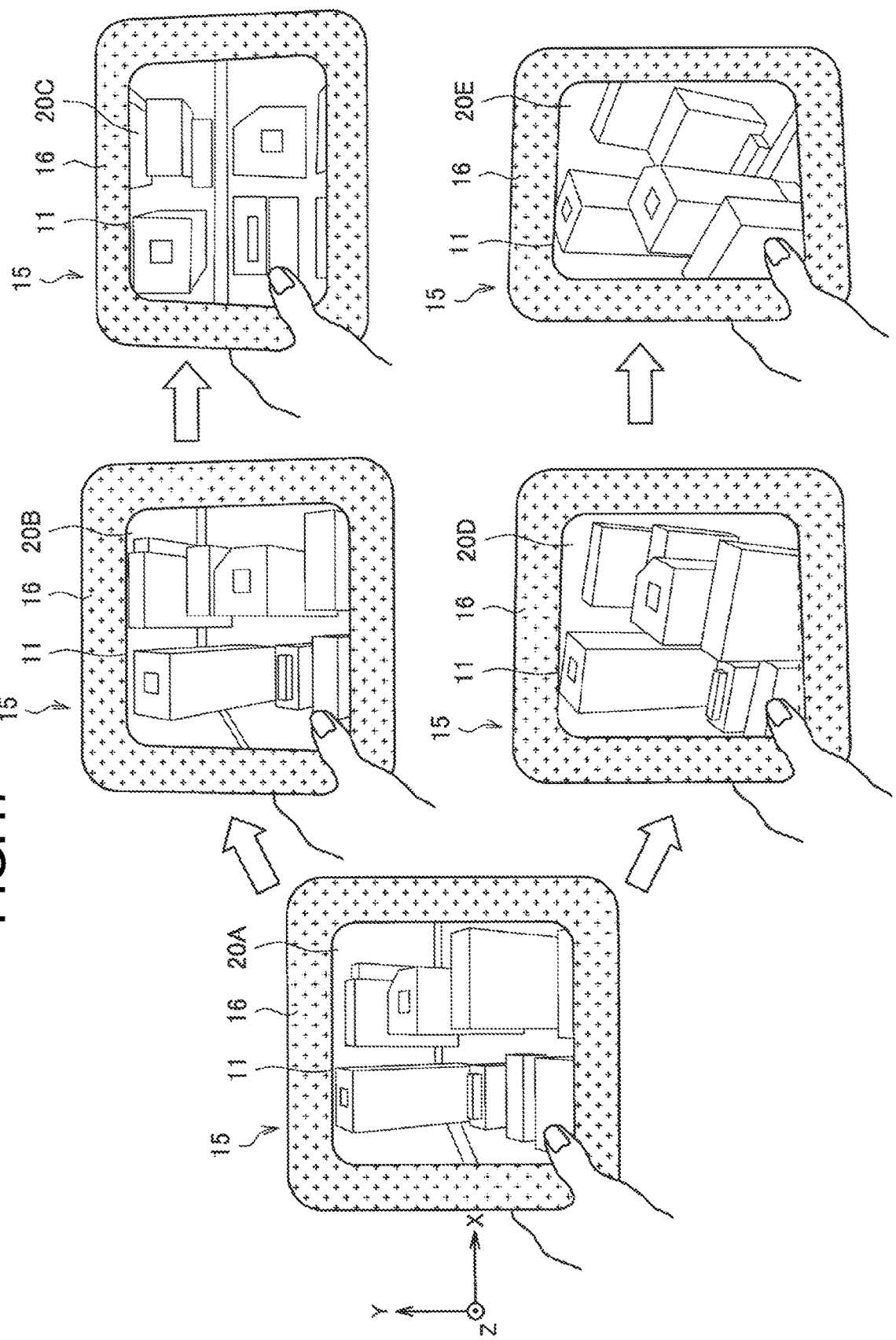
FIG. 47 is a diagram illustrating a specific example of displaying of a three-dimensional model based on a map, according to the embodiment.

FIG. 47 is a diagram illustrating a specific example of displaying of a three-dimensional model based on a map, according to the present embodiment. As illustrated in a left diagram of FIG. 47, the display control unit 132 displays a display object 20A corresponding to the three-dimensional model of the map 10B on the display surface 11. As illustrated in an upper center diagram of FIG. 47, when the user rotates the screen 15 about the x axis toward the farther side, the display control unit 132 displays a display object 20B that is a three-dimensional model as viewed from view point at a higher altitude than that of the display object 20A. As illustrated in an upper right diagram of FIG. 47, when the user rotates the screen 15 about the x axis further toward the farther side, the display control unit 132 displays a display object 20C that is a three-dimensional model as viewed from a view point at a higher altitude than that of the display object 20B. As illustrated in a lower center diagram of FIG. 47, when the user rotates the screen 15 about the y axis toward the right, the display control unit 132 displays a display object 20D that is a three-dimensional model as viewed from a view point that is more on the right side than that of the display object 20A. As illustrated in a lower right diagram of FIG. 47, when the user rotates the screen 15 about the y axis further toward the right, the display control unit 132 displays a display object 20E that is a three-dimensional model as viewed from a view point that is more on the right side than that of the display object 20D.

Display Control in Response to Screen Bending Deformation

The screen may be deformable by bending. In such a case, the display control unit 132 controls the displaying of the display object based on the amount of bending deformation of the screen. As a result, the user can view a desired display object by bending the screen. The screen may be provided with a plurality of markers. In such a case, the display control unit 132 controls the displaying of the display object based on relative orientations of a first marker and a second marker that have changed due to the bending deformation of the screen. By using the relative orientations of the markers for detecting bending deformation, detection accuracy for the amount of the bending deformation can be improved. These points will be described with reference to specific examples illustrated in FIGS. 48 and 49. For the specific examples, event definitions illustrated in Table 10 below are assumed to be defined.

TABLE 10

Example of event definition accumulation table

| Reference marker | | Related marker | | Event | |
|---|---|---|---|---|---|
| Position ID | Orientation condition | Position ID | Orientation condition | Action | Firing flag |
| 1 | Position and angle at which animal in picture book is captured within display surface | 2 | — | Same angle as reference marker | Display image of animal without scaling | — |
| 1 | Position and angle at which animal in picture book is captured within display surface | 2 | — | Smaller angle than reference marker | Display zoom-in image of animal with angle difference reflected on magnification ratio. | — |
| 1 | Position and angle at which animal in picture book is captured within display surface | 2 | — | Larger angle than reference marker | Display zoom-out image of animal with angle difference reflected on magnification ratio. | — |

Figure 48:
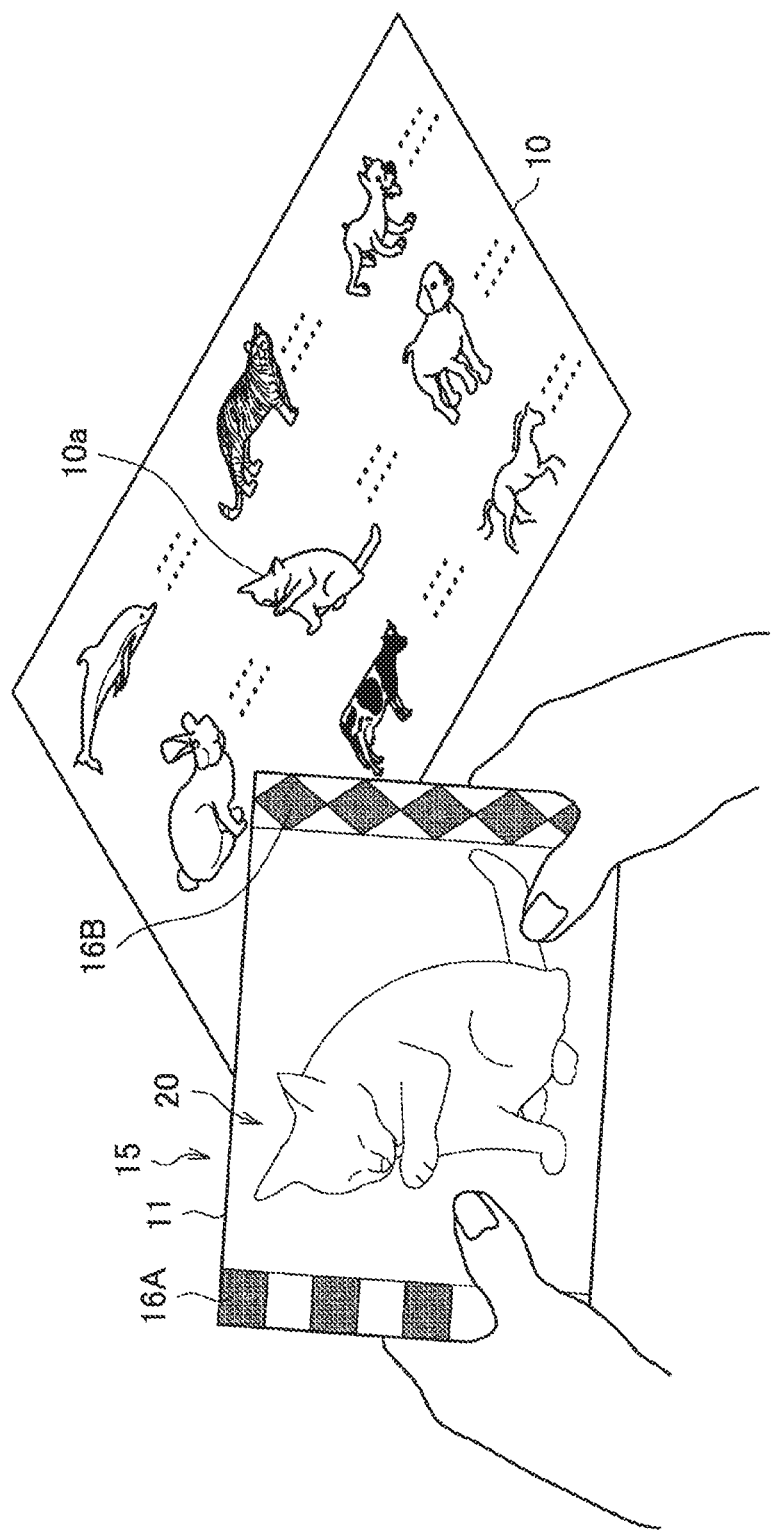
FIG. 48 is a diagram illustrating a specific example of display control in response to screen bending deformation according to the embodiment.
Figure 49:
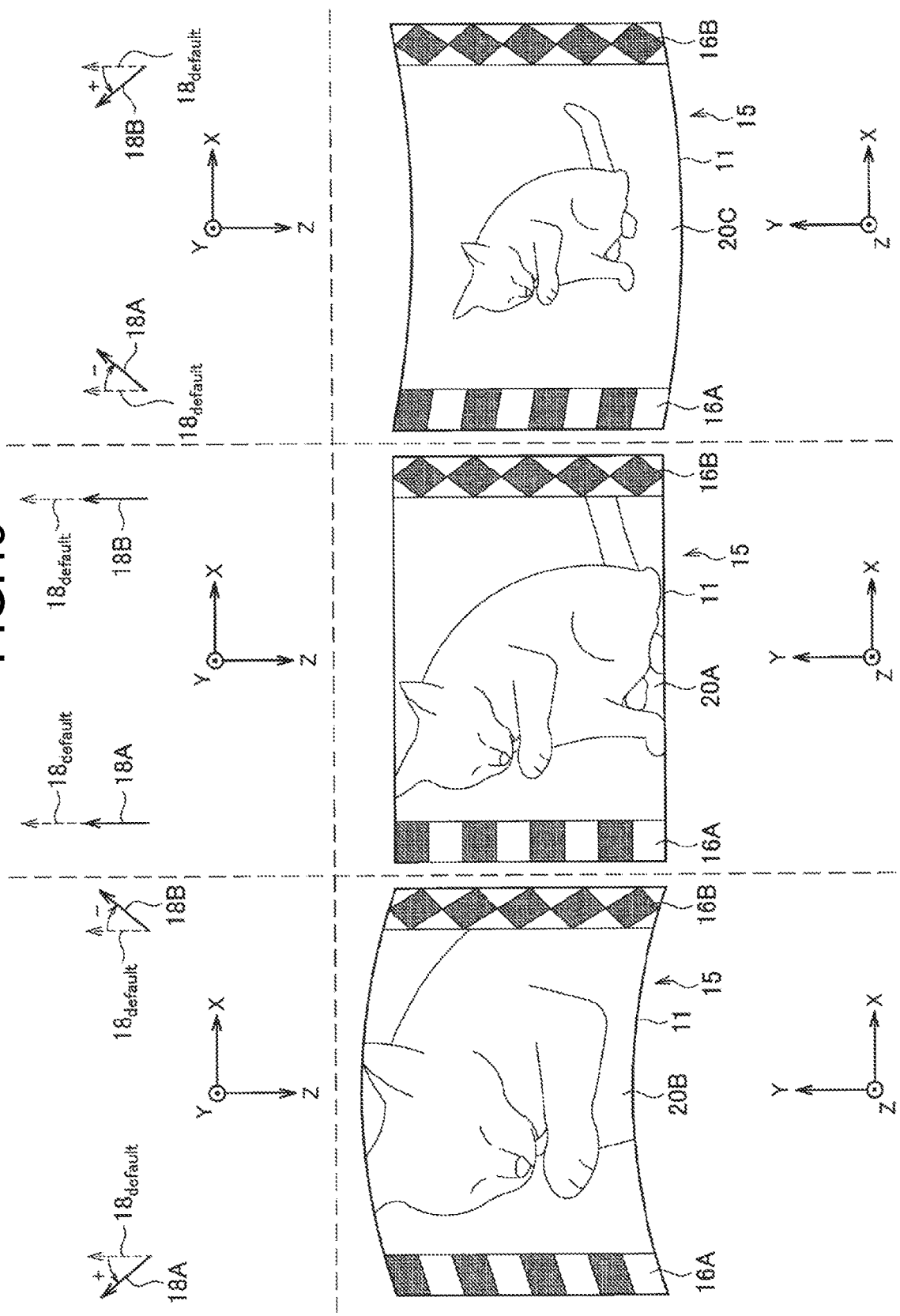
FIG. 49 is a diagram illustrating a specific example of display control in response to screen bending deformation according to the embodiment.

FIG. 48 is a diagram illustrating a specific example of the display control in response to screen bending deformation according to the present embodiment. As illustrated in FIG. 48, the screen 15 is directed toward an animal picture book 10 as the target object. A cat photograph 10a in the picture book 10 is captured within the display surface 11. Thus, the display control unit 132 displays a display object 20 including an image of a cat corresponding to the cat photograph 10a, on the display surface 11. Markers 16A and 16B are provided on the left and right sides of the screen 15. The marker 16A is a reference marker and the marker 16B is a related marker. As illustrated in FIG. 49, the display control unit 132 scales the display object 20 based on the bending deformation of the screen 15, that is, based on the relative orientations of the marker 16A and the marker 16B.

FIG. 49 is a diagram illustrating a specific example of the display control in response to screen bending deformation according to the present embodiment. Lower diagrams of FIG. 49 illustrate the states of bending deformation of the screen 15 and the states of the display object 20, and upper diagrams of FIG. 49 illustrate the states of the markers 16A and 16B in the depth direction (−Z axis direction). Note that the coordinate axes are different between the upper diagrams and the lower diagrams.

As illustrated in center diagrams of FIG. 49, when the screen 15 is not bent and deformed, the display control unit 132 displays a cat image at the default magnification ratio as the display object 20A. As illustrated in left diagrams of FIG. 49, when the screen 15 is bent and deformed with the center on the farther side (i.e., the side opposite to the user) and the left and right ends on the closer side (i.e., the user side), the display control unit 132 displays a zoomed-in cat image as a display object 20B. As illustrated in right diagrams of FIG. 49, when the screen 15 is bent and deformed with the center on the closer side (i.e., the user side) and the left and right ends on the farther side (i.e., the side opposite to the user), the display control unit 132 displays a zoomed-out cat image as a display object 20C.

Whether the bending deformation is occurring and the amount of bending deformation may be detected based on the relative orientations of the marker 16A and the marker 16B. The relative orientations may be obtained, for example, through comparison between differences in angles between the depth directions of the markers 16A and 16B and a reference direction.

For example, in the example illustrated in the center diagrams of FIG. 49, a depth direction 18A of the marker 16A matches a default depth direction $18_{default}$, and a depth direction 18B of the marker 16B matches the default depth direction $18_{default}$. Thus, the angle of the marker 16B matches the angle of the marker 16A. Thus, the display control unit 132 determines that the screen 15 is not bent and deformed, and displays the image of the cat without scaling.

For example, in the example illustrated in the left diagrams of FIG. 49, the depth direction 18A of the marker 16A has shifted in a positive direction (counterclockwise in the xz plane) from the default depth direction $18_{default}$. On the other hand, the depth direction 18B of the marker 16B has shifted in a negative direction (clockwise in the xz plane) from the default depth direction $18_{default}$. The angle of the marker 16B is smaller than the angle of the marker 16A. Thus, the display control unit 132 determines that the screen 15 is bent and deformed with the center on the farther side and the left and right ends on the closer side, and displays the zoomed-in image of the cat.

For example, in the example illustrated in the right diagrams of FIG. 49, the depth direction 18A of the marker 16A has shifted in the negative direction (clockwise in the xz plane) from the default depth direction $18_{default}$. On the other hand, the depth direction 18B of the marker 16B has shifted in the positive direction (counterclockwise in the xz plane) from the default depth direction $18_{default}$. Thus, the angle of the marker 16B is larger than the angle of the marker 16A. Thus, the display control unit 132 determines that the screen 15 is bent and deformed with the center on the closer side and the left and right ends on the farther side, and displays the zoomed-out image of the cat.

Walkthrough Image Display Based on Type of Marker

The display control unit 132 controls displaying of the display object based on the type of marker provided on the screen. As a result, the user can view a desired display object by selectively using screens with different markers. This point will be described with reference to specific examples illustrated in FIG. 50. For the specific examples, event definitions illustrated in Table 11 below are assumed to be defined.

TABLE 11

Example of event definition accumulation table

| Reference marker | | Related marker | | Event | |
|---|---|---|---|---|---|
| Position ID condition | Orientation condition | Position ID condition | Orientation condition | Action | Firing flag |
| 1 | Position and angle at which room model is captured within display surface | — — | — | Render three-dimensional model of room with tatami mat material used for floor. Generate walk-through image based on relative positions and relative orientations of model and screen. | — |
| 2 | | — — | — | Render three-dimensional model of room with wooden floor material used for floor. Generate walk-through image based on relative positions and relative orientations of model and screen. | — |

Figure 50:
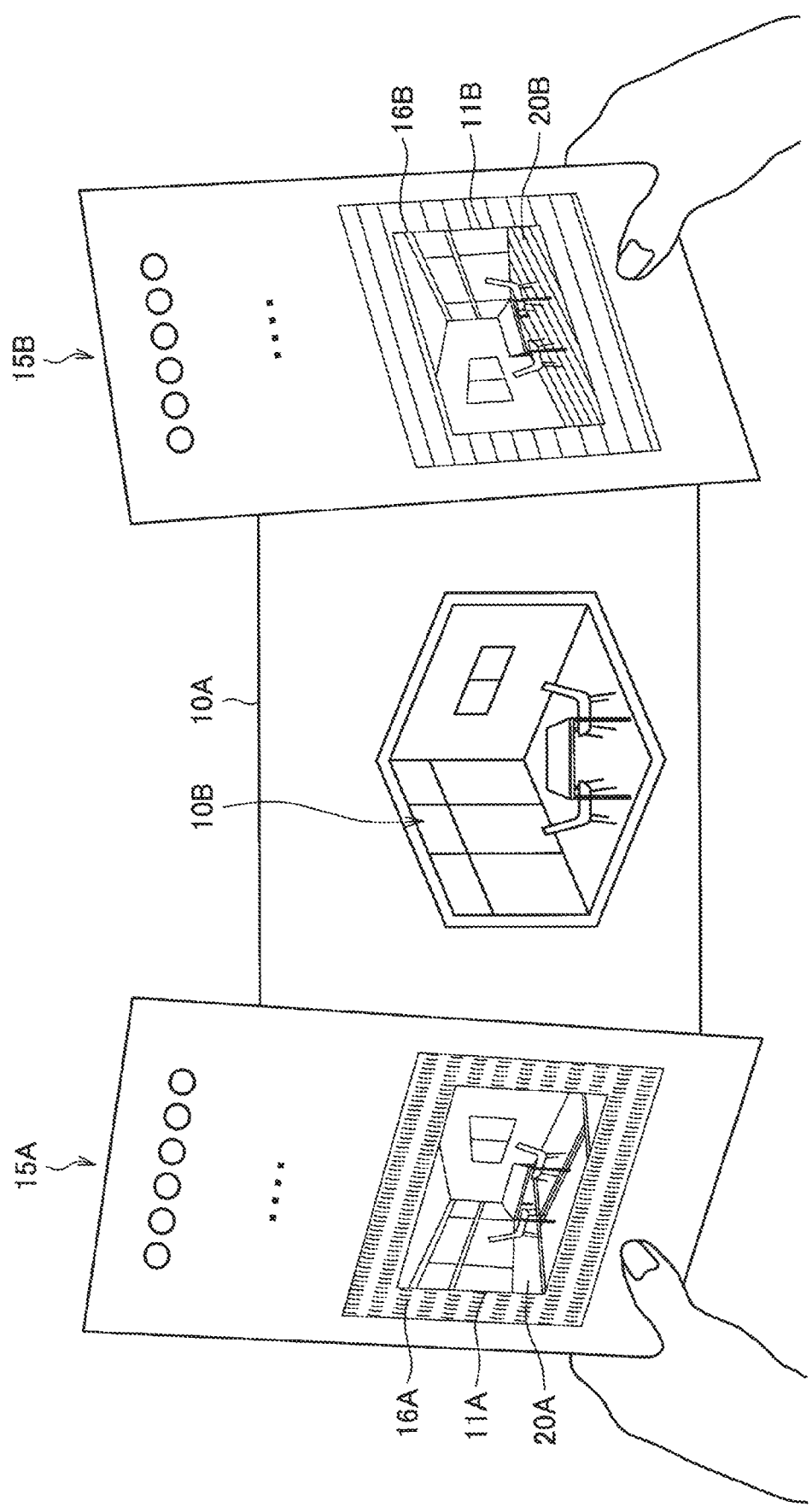
FIG. 50 is a diagram illustrating a specific example of walkthrough image displaying based on a type of a marker according to the embodiment.

FIG. 50 is a diagram illustrating a specific example of walkthrough image displaying based on a type of a marker according to the present embodiment. As illustrated in FIG. 50, a room model 10B as a target object is placed on a table 10A. A marker 16A indicating a tatami mat material is provided on a screen 15A held by a user. The marker 16A corresponds to a reference marker the ID of which is 1. The room model 10B is captured within the display surface 11A within the frame as the marker 16A. Under these conditions, the display control unit 132 generates a walk-through image of the room based on the relative positions and relative orientations of the room model 10B and the screen 15A while rendering the three-dimensional model of the room with the tatami mat material on the floor, and displays the image as a display object 20A. Further, a marker 16B indicating a wooden floor material is provided on a screen 15B held by a user. The marker 16B corresponds to a reference marker the ID of which is 2. The room model 10B is captured within the display surface 11B within the frame as the marker 16B. Under these conditions, the display control unit 132 generates a walk-through image of the room based on the relative positions and relative orientations of the room model 10B and the screen 15B while rendering the three-dimensional model of the room with the wooden floor material on the floor, and displays the image as a display object 20B. The display control unit 132 generates the walk-through image as an image inside the three-dimensional model of the room as viewed from a viewpoint position and in a line-of-sight direction respectively corresponding to the relative positions and the relative orientations of the screen 15A or 15B and the model 10B.

The screens 15A and 15B illustrated in FIG. 50 are, for example, room interior catalogs. The user can easily recognize the difference in the room atmosphere between materials by switching between the screens corresponding to the respective materials to be held over the room model 10B. Furthermore, a walk-through image of a three-dimensional model thus displayed enables the difference in atmosphere between the materials to be easily felt. Thus, the user can easily search for a material he or she wants from the catalog.

Video Displaying Based on Type of Marker

The display control unit 132 controls displaying of the display object based on the type of marker provided on the screen. As a result, the user can view a desired display object by selectively using screens with different markers. Furthermore, the display control unit 132 maps and displays a display object corresponding to another display object displayed on the surface of the target object on the display surface of the screen. As a result, the user can display a desired display object on the screen by holding the screen not only over the real object but also over the display object. These points will be described with reference to specific examples illustrated in FIG. 51. For the specific examples, event definitions illustrated in Table 12 below are assumed to be defined.

TABLE 12

Example of event definition accumulation table

| Reference marker | | Related marker | | Event | |
|---|---|---|---|---|---|
| Position ID condition | Orientation condition | Position ID condition | Orientation condition | Action | Firing flag |
| 1 | Position and angel at which weekend in calendar is captured within display surface | — — | — | Display movie of use case where family is spending quality time watching TV on weekend. | — |
| 1 | Position and angel at which morning time in | — — | — | Display movie of use case of watching news | — |

TABLE 12-continued

Example of event definition accumulation table

| | Reference marker | | Related marker | | Event | |
|---|---|---|---|---|---|---|
| ID | Position condition | Orientation condition | ID | Position condition | Orientation condition | Action | Firing flag |
| | calendar is captured within display surface | | | | | program on TV. | |
| 2 | Position and angel at which Christmas day in calendar is captured within display surface | — — | — | | | Display movie of use case where camera is used for Christmas party. | — |
| 2 | Position and angel at which field day in calendar is captured within display surface | — — | — | | | Display movie of use case where camera is used for field day. | — |

Figure 51:
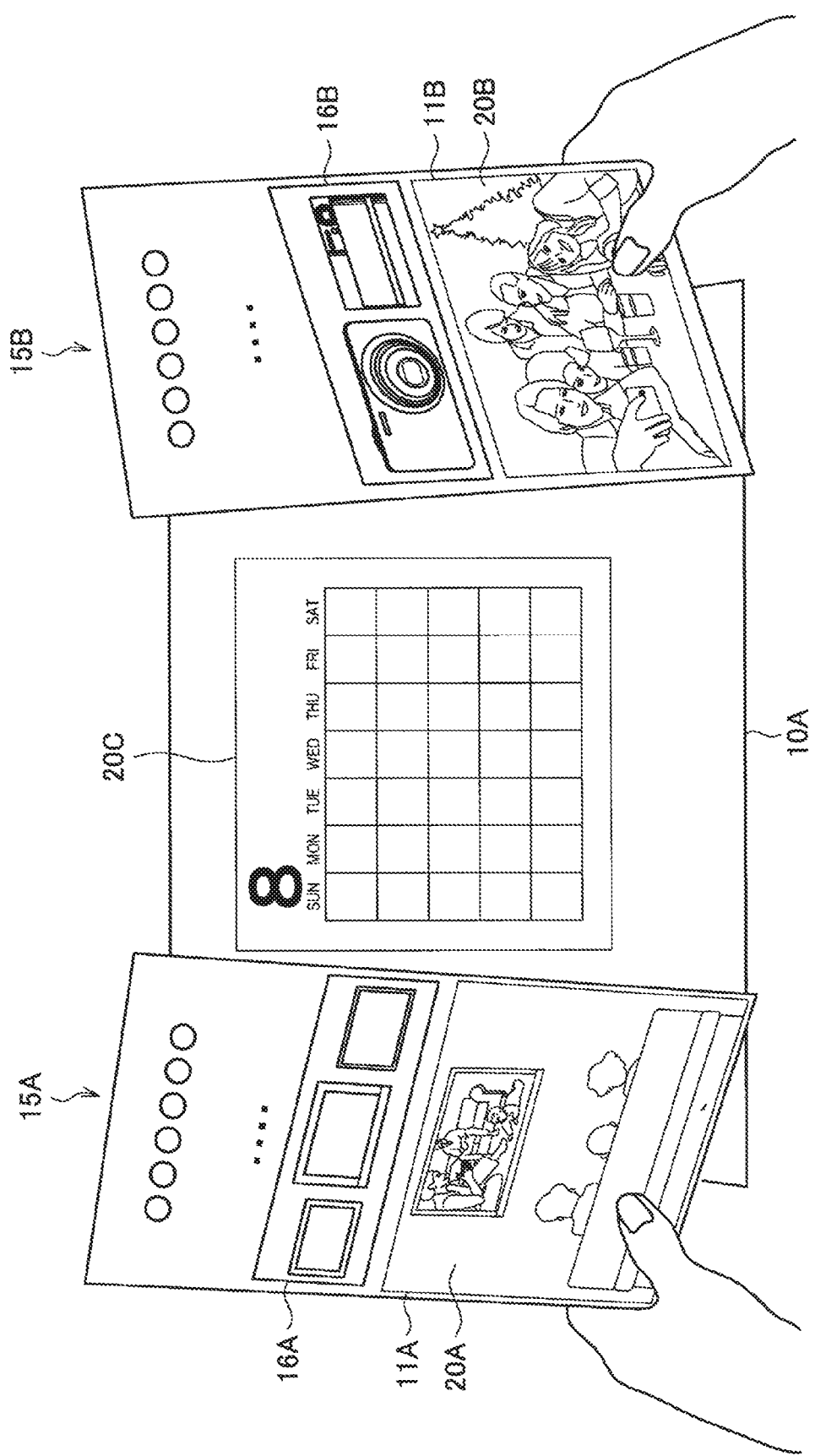
FIG. 51 is a diagram illustrating a specific example of movie displaying based on a type of a marker according to the embodiment.

FIG. 51 is a diagram illustrating a specific example of movie displaying based on a type of a marker according to the present embodiment. As illustrated in FIG. 51, a calendar display object 20C as a target object is displayed on a table 10A. A marker 16A indicating a Television set (TV) product is provided on a screen 15A held by a user. The marker 16A corresponds to a reference marker the ID of which is 1. The weekend, in the calendar display object 20C displayed on the table 10A, is assumed to be captured within the display surface 11A close to the marker 16A. In this case, the display control unit 132 displays a display object 20A including a movie of a use case where a family is spending a quality time watching TV on the weekend. Further, a marker 16B indicating a camera product is provided on a screen 15B held by the user. The marker 16B corresponds to a reference marker the ID of which is 2. Christmas day, in the calendar display object 20C displayed on the table 10A, is assumed to be captured within the display surface 11B close to the marker 16B. In this case, the display control unit 132 displays a display object 20B including a movie of a use case where a camera is used in a Christmas party.

The screens 15A and 15B illustrated in FIG. 51 are, for example, a catalog of electrical appliances. The user can easily recognize the use case for each product by switching between the screens corresponding to the respective products to be held over the calendar. This allows the user to easily imagine how a catalog product can be used throughout the year.

Translation Based on Relative Positions of Markers

The display control unit 132 controls displaying of the display object based on the relative relationship (relative positions and/or relative orientations) between a first marker and a second marker provided on a screen. In particular, the display control unit 132 controls the displaying of the display object based on whether the first marker and the second marker are on the same plane. When the screen is made of paper or the like, it can be easily folded. The user can easily display a desired display object by folding the screen. These points will be described with reference to specific examples illustrated in FIGS. 52 and 53. For the specific examples, event definitions illustrated in Table 13 below are assumed to be defined.

TABLE 13

Example of event definition accumulation table

| | Reference marker | | | Related marker | | Event | |
|---|---|---|---|---|---|---|---|
| ID | Position condition | Orientation condition | ID | Position condition | Orientation condition | Action | Firing flag |
| 1 | Position and angle at which product is captured within display surface | | 2 | Not on same plane as reference marker | | E to J translation | — |
| 1 | | | 3 | Not on same plane as reference marker | | Display graphic image corresponding to word | — |
| 1 | | | 4 | Not on same plane as reference marker | | Display word with larger size | — |

Figure 52:
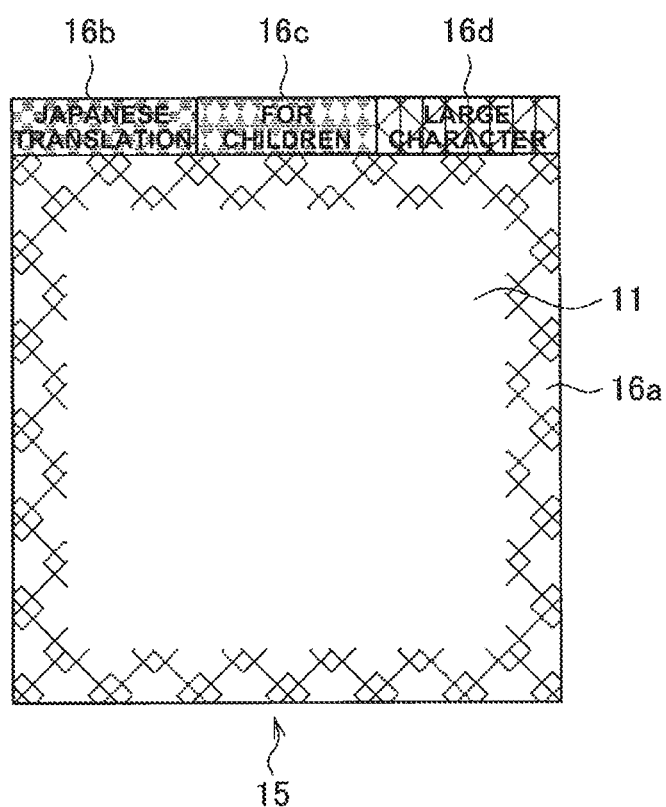
FIG. 52 is a diagram illustrating a specific example of translation based on relative positions of markers according to the embodiment.

FIG. 52 is a diagram illustrating a specific example of translation based on relative positions of markers according to the present embodiment. As illustrated in FIG. 52, a frame-shaped marker 16a is provided on the screen 15, and an area surrounded by the marker 16a is a display surface 11. An upper portion of the screen 15 is provided with a marker 16b related to translation into Japanese, a marker 16c related to translation for children, and a marker 16d related to a character size. The marker 16a corresponds to a reference marker the ID of which is 1. The marker 16b corresponds to a related marker the ID of which is 2. The marker 16c corresponds to a related marker the ID of which is 3. The marker 16d corresponds to a related marker the ID of which is 4. The screen 15 is made of paper, and each of the markers 16b to 16d can be folded.

Figure 53:
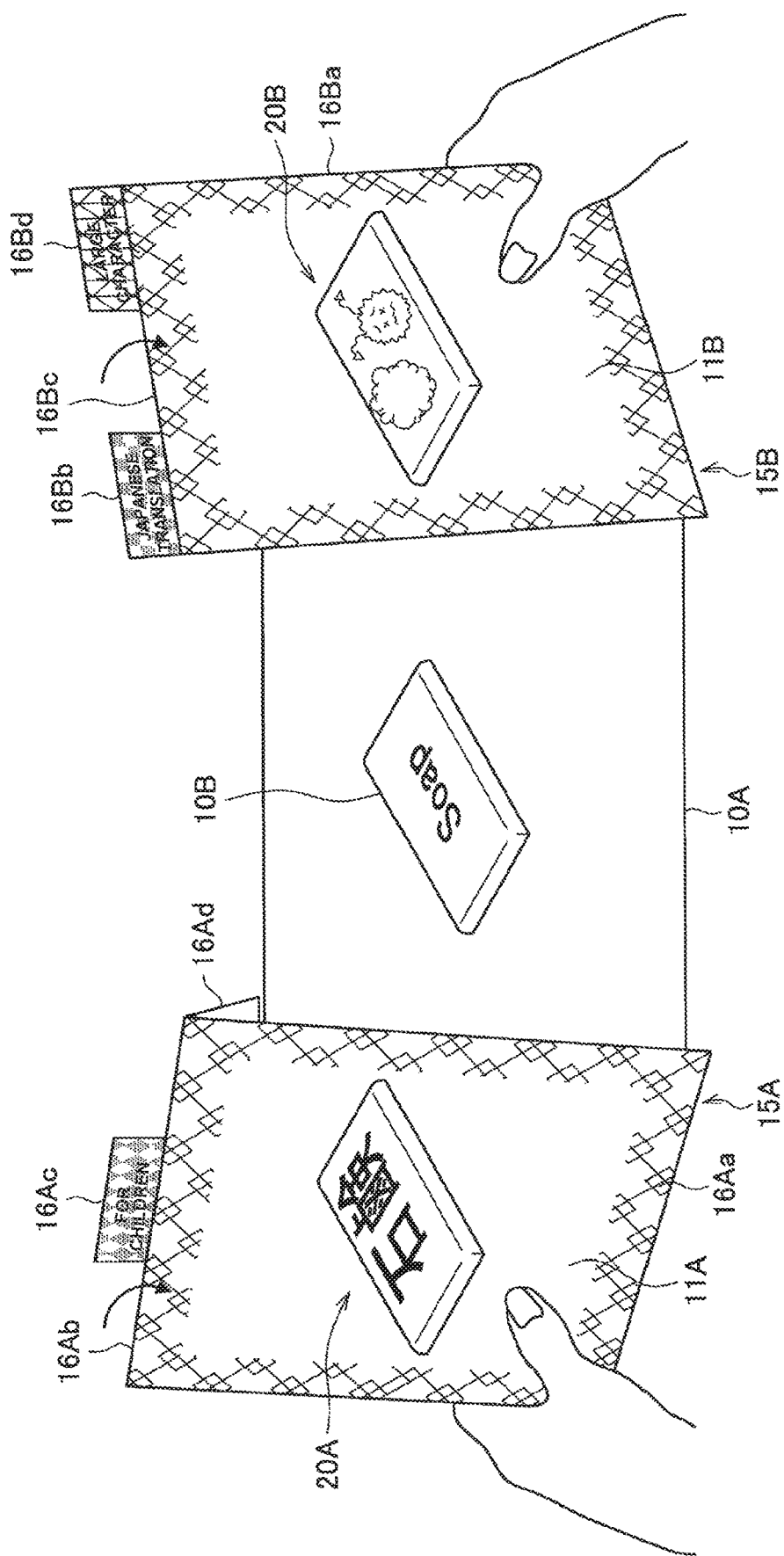
FIG. 53 is a diagram illustrating a specific example of translation based on relative positions of markers according to the embodiment.

FIG. 53 is a diagram illustrating a specific example of translation based on relative positions of markers according to the present embodiment. As illustrated in FIG. 53, a soap 10B, with "Soap" written on a surface, as a target object is placed on a table 10A. A screen 15A has the same configuration as the screen 15 described with reference to FIG. 52. The soap 10B is captured within a display surface 11A within the frame as a marker 16Aa. Markers 16Ab and 16Ad of the screen 15A are folded so as not to be on the same plane as the marker 16Aa. As a result, the display control unit 132 displays a display object 20A as a result of translating "Soap", written on the surface of the soap 10B, into Japanese with a larger character size. The screen 15B has the same configuration as the screen 15 described with reference to FIG. 52. The soap 10B is captured within a display surface 11B within a frame as a marker 16Ba. A marker 16Bc of the screen 15B is folded so as not to be on the same plane as the marker 16Aa. As a result, the display control unit 132 displays a display object 20B including graphic images of bubbles and a germ as a graphic corresponding to "Soap" written on the surface of the soap 10B.

With the screen 15 illustrated in FIG. 52, the information processing system 100 can translate a display of a product that is difficult to read or understand into a display that is easy for a user to read or understand. Thus, usability can be improved for a person who would have difficulty in reading or understanding the description of a general product such as a child, a foreigner, or an elderly person, for example.

Note that whether the reference marker and the related marker are on the same plane may vary depending on factors other than folding. For example, when the related marker is covered by a real object (corresponding to a third real object), the display surface management unit 131 fails to detect the related marker and detects that the related marker is not on the same plane as the reference marker. Therefore, the display control unit 132 may control the displaying of the display object based on the related marker covered by the real object. An example of this will be described with reference to FIGS. 54 and 55.

Figure 54:
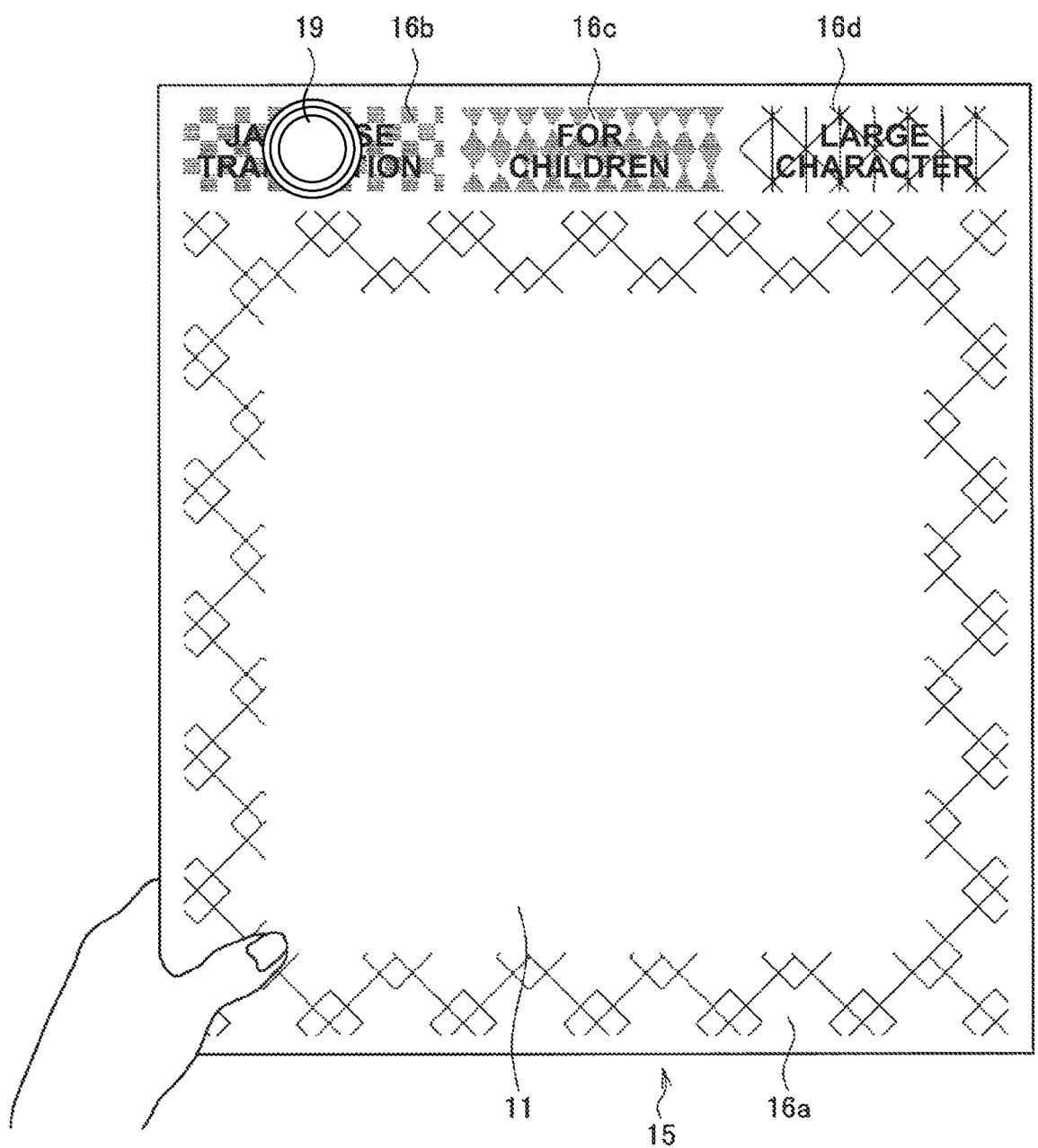
FIG. 54 is a diagram illustrating a specific example of translation based on relative positions of markers according to the embodiment.

FIG. 54 is a diagram illustrating a specific example of translation based on relative positions of markers according to the present embodiment. As illustrated in FIG. 54, a marker 16b of a screen 15 is covered by a magnet 19 to be hidden. As a result, the display control unit 132 determines that the marker 16b is not on the same plane as the marker 16a, and displays a display object as a result of translating English into Japanese on the display surface 11.

Figure 55:
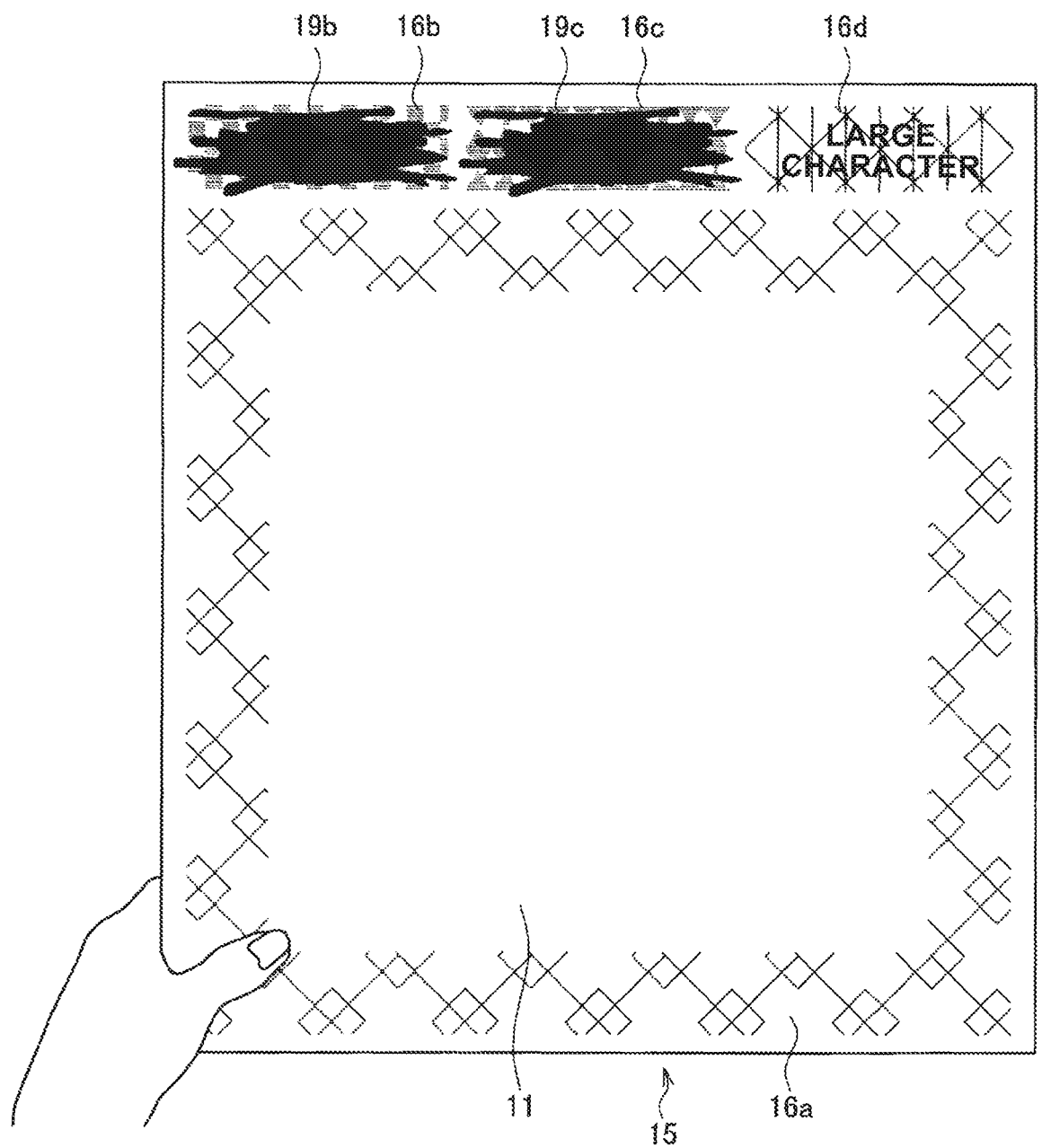
FIG. 55 is a diagram illustrating a specific example of translation based on relative positions of markers according to the embodiment.

FIG. 55 is a diagram illustrating a specific example of translation based on relative positions of markers according to the present embodiment. As illustrated in FIG. 55, markers 16b and 16c on a screen 15 are struck out by a Magic Marker. In other words, the markers 16b and 16c are covered and hidden by inks 19b and 19c of the Magic Marker. As a result, the display control unit 132 determines that the markers 16b and 16c are not on the same plane as the marker 16a, and displays a display object that is a result of translating English into Japanese and includes a graphic image corresponding to the word, on the display surface 11.

Variations of display control related to the screen 15 illustrated in FIG. 52 have been described above. Hereinafter, other variations of the marker related to display control based on the relative position of the marker will be described.

For example, the reference marker and the related marker may be overlapped. In that case, the display control unit 132 controls displaying of the display object according to the related marker overlaid on the reference marker. This point will be described with reference to FIG. 56.

Figure 56:
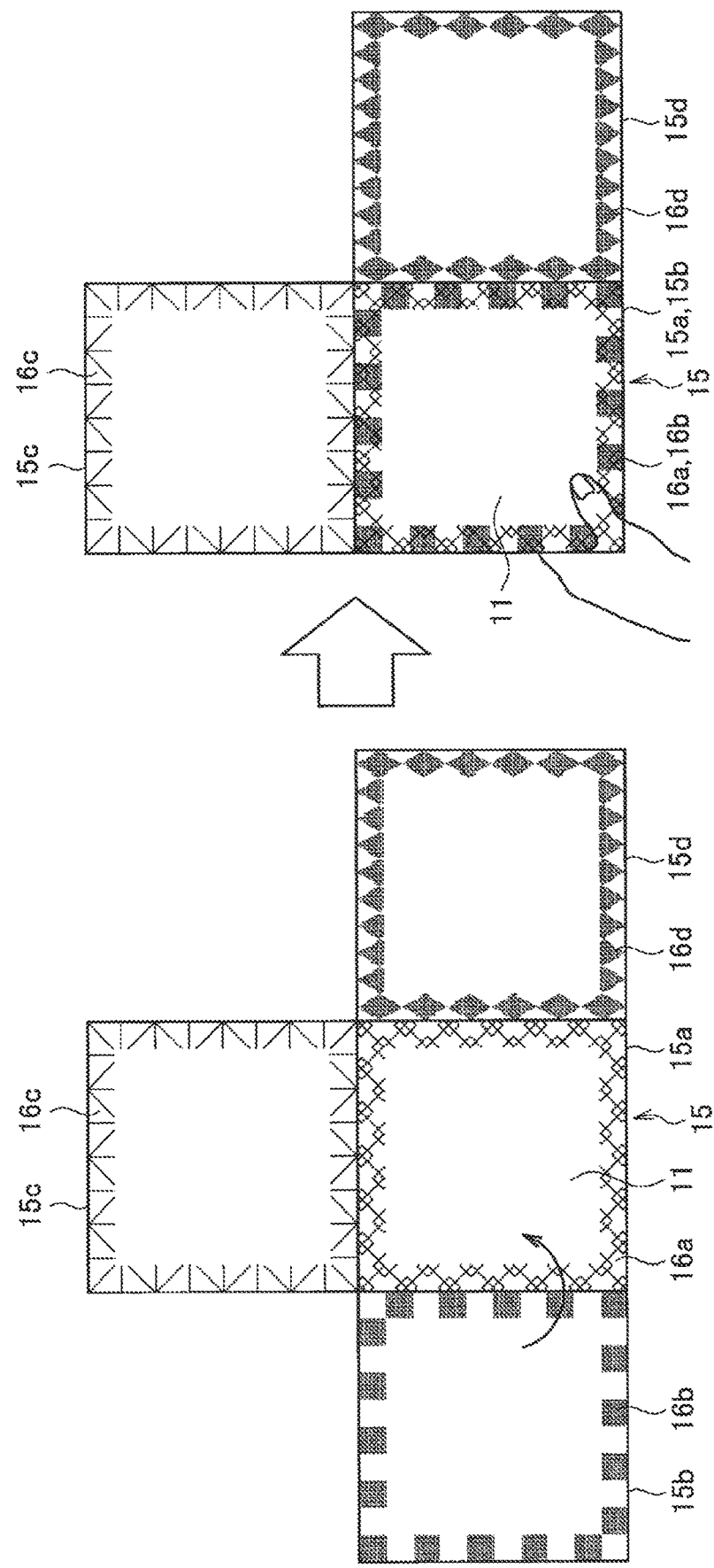
FIG. 56 is a diagram illustrating a specific example of display control based on relative positions of markers according to the embodiment.

FIG. 56 is a diagram illustrating a specific example of display control based on relative positions of markers according to the present embodiment. As illustrated in a left diagram of FIG. 56, a screen 15 includes surfaces 15a to 15d, and two or more surfaces can be overlaid on each other by folding the boundary between the surfaces. The surfaces 15a to 15d are respectively provided with markers 16a to 16d. The surface 15a is not transparent, and the surfaces 15b to 15d are transparent or semitransparent. Thus, even when the surfaces 15b to 15d are overlaid on the surface 15a, the markers 16b to 16d overlaid on the marker 16a are detectable in outer view. For example, as illustrated in a right drawing of FIG. 56, when the surface 15b is overlaid on the surface 15a, the marker 16b is overlaid on the marker 16a. Therefore, the display control unit 132 performs display control based on the marker 16b being overlaid on the marker 16a.

The user him or herself may function as a screen. For example, the user's hand may function as a screen, and the surface such as the back of the hand may function as a display surface. A specific example of this case will be described with reference to FIG. 57.

FIG. 57 is a diagram illustrating a specific example of display control based on relative positions of markers according to the present embodiment. As illustrated in a left diagram of FIG. 57, a frame-shaped marker 16a is provided on the back of the user's hand, a marker 16b is provided on the nail of the index finger, and a marker 16c is provided on the nail of the middle finger. The inside of the frame of the marker 16a functions as a display surface 11. Thus, the hand functions as a screen 15. As illustrated in the right diagram of FIG. 57, when the user folds the middle finger, the relative relationship between the marker 16a and the marker 16c changes. Thus, the display control unit 132 performs display control based on the relative relationship after the change.

Display Control to Prompt Change in Screen Position or Angle

The display control unit 132 may display information instructing the user to change the position or orientation of the screen, that is, the position or orientation of the display surface. For example, the display control unit 132 displays information as an instruction to move the screen to the position and angle at which the target object is captured within the display surface. In addition, the display control unit 132 may display information that teaches how to use the screen, such as bending deformation for enlarging or reducing the display object. Thus, the user can understand how to use the screen, to use the screen comfortably. This point will be described with reference to FIG. 58.

Figure 58:
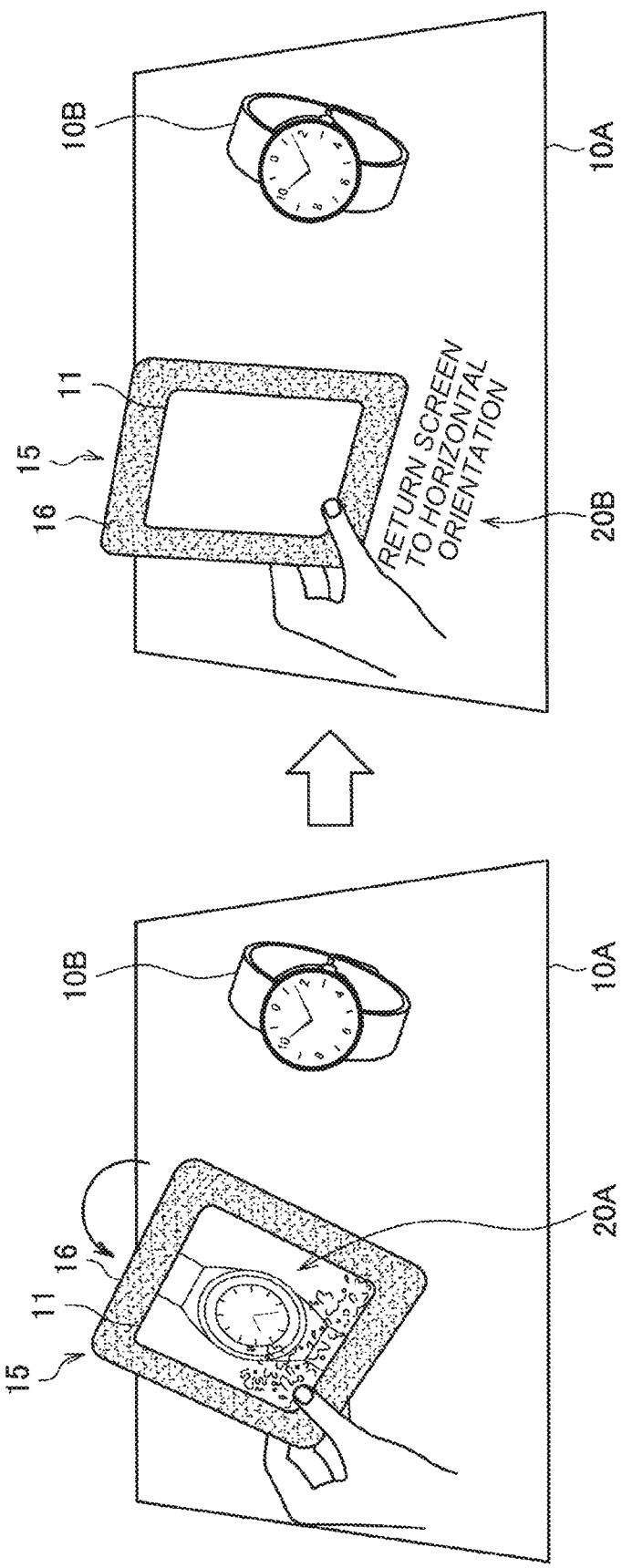
FIG. 58 is a diagram illustrating a specific example of display control for prompting a change in a position or an angle of a screen according to the embodiment.

FIG. 58 is a diagram illustrating a specific example of the display control for prompting a change in an angle of a screen according to the present embodiment. As illustrated in a left diagram of FIG. 58, a watch 10B as a target object is placed on a table 10A. A frame-shaped marker 16 is provided on a screen 15 held by a user. The watch 10B is captured within a display surface 11 within a frame as the marker 16. The display control unit 132 displays a display object 20 including a movie demonstrating waterproofness on the display surface 11. As illustrated in a right diagram of FIG. 58, when the screen 15 is excessively held upright by the user, the watch 10B cannot be captured within the display surface 11, and the display object 20A ceases to be displayed. Instead, the display control unit 132 displays a display object 20B as an instruction to return the screen to the horizontal orientation. When the user returns the screen to the horizontal orientation in response to this instruction, the display object 20A is displayed on the display surface 11 again as illustrated in a left diagram of FIG. 58.

(6) Conclusion

The information processing system 100 according to the present embodiment maps and displays a display object corresponding to a target object on a display surface of a screen surface, based on relative relationship between the screen and the target object. Specifically, the display object corresponding to a real object in the depth direction of the screen is displayed on the display surface of the screen, with the real-time position, orientation, and state of the screen reflected. The user can dynamically change the display object by moving the position or the orientation of the screen or bending the screen. The user can display a desired display object by changing the display object through an intuitive screen operation. Thus, an operation system with a low learning cost can be achieved.

Furthermore, according to the present embodiment, it is possible to display a display object using a real object with no electronic device, such as paper or a catalog, as a screen. This enables static media such as paper or catalogs to be much more expressive.

Furthermore, according to the present embodiment, a screen capable of displaying a display object can be made by printing a marker on a medium such as paper. Thus, a display medium can be provided at a cost lower than that in a case where display device is prepared.

5. Hardware Configuration Example

Figure 59:
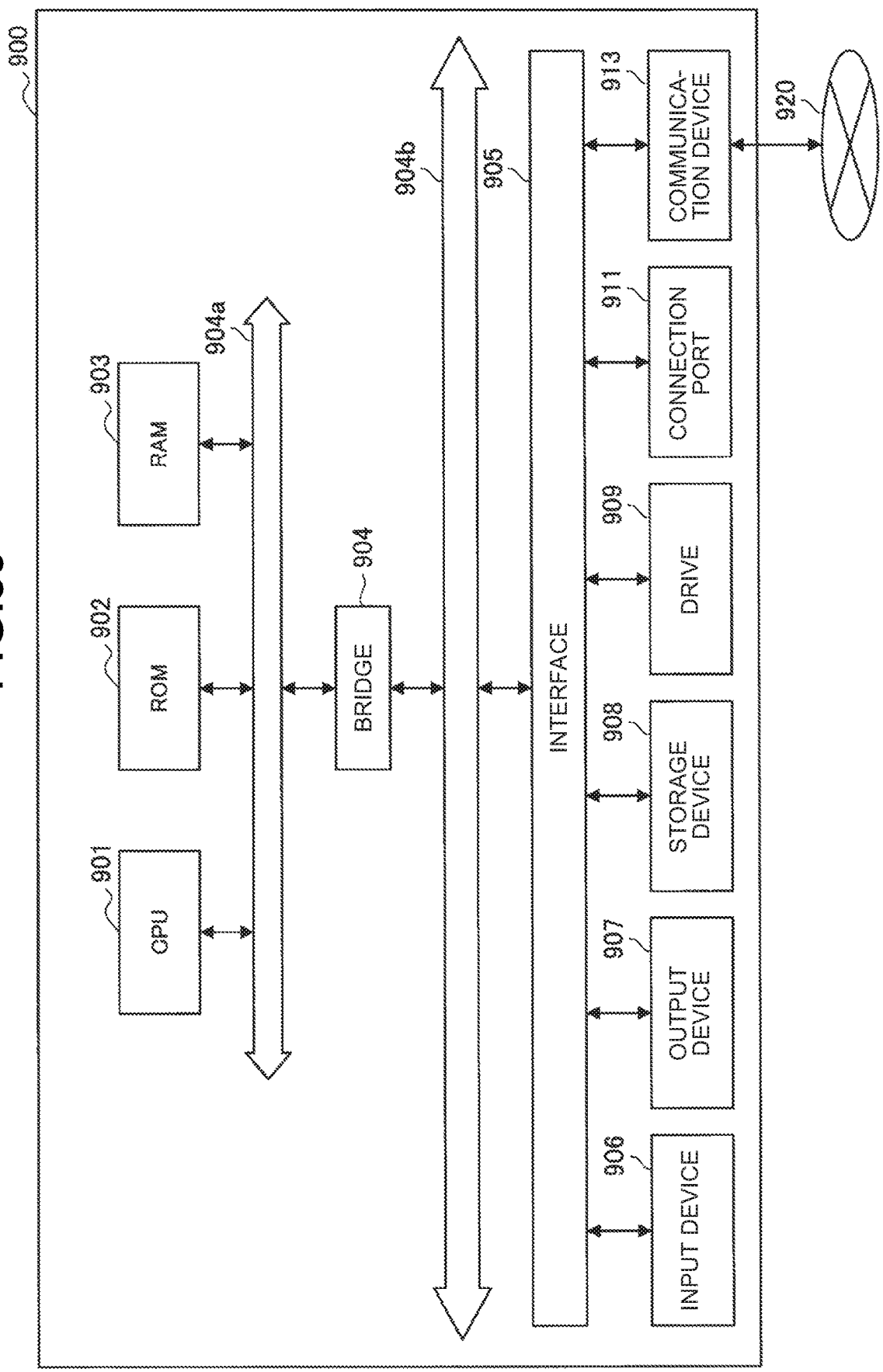
FIG. 59 is a block diagram illustrating an example of a hardware configuration of the information processing apparatus according to the present embodiment.

Finally, with reference to FIG. 59, a hardware configuration of the information processing apparatus according to the present embodiment will be described. FIG. 59 is a block diagram illustrating an example of a hardware configuration of the information processing apparatus according to the present embodiment. Note that an information processing apparatus 900 illustrated in FIG. 59 can implement the information processing system 100 illustrated in FIG. 2, for example. Information processing by the information processing system 100 according to the present embodiment is implemented by cooperation between software and hardware as described below.

As illustrated in FIG. 59, the information processing apparatus 900 includes a central processing unit (CPU) 901, a read only memory (ROM) 902, a random access memory (RAM) 903, and a host bus 904a. The information processing apparatus 900 also includes a bridge 904, an external bus 904b, an interface 905, an input device 906, an output device 907, a storage device 908, a drive 909, a connection port 911, and a communication device 913. The information processing apparatus 900 may include a processing circuit such as an electric circuit, a DSP, or an ASIC in place of or in addition to the CPU 901.

The CPU 901 functions as an arithmetic processing unit and a control unit, and controls the overall operation in the information processing apparatus 900 according to various programs. Furthermore, the CPU 901 may be a microprocessor. The ROM 902 stores programs used by the CPU 901, calculation parameters, and the like. The RAM 903 temporarily stores programs used in the execution of the CPU 901, parameters that appropriately change in the execution, and the like. The CPU 901 can form, for example, the acquisition unit 120 and the control unit 130 illustrated in FIG. 2.

The CPU 901, the ROM 902, and the RAM 903 are mutually connected by the host bus 904a including a CPU bus and the like. The host bus 904a is connected to the external bus 904b, such as a peripheral component interconnect/interface (PCI) bus, via the bridge 904. The host bus 904a, the bridge 904, and the external bus 904b are not necessarily separately configured, and these functions may be implemented on one bus.

The input device 906 is implemented by, for example, a device such as a mouse, a keyboard, a touch panel, buttons, a microphone, a switch, and a lever to which information is input by the user. Furthermore, the input device 906 may be, for example, a remote control device using infrared rays or other radio waves, or may be an external connection device such as a mobile phone or a PDA corresponding to the operation of the information processing apparatus 900. Furthermore, the input device 906 may include, for example, an input control circuit that generates an input signal based on the information input by the user using the input means described above, and outputs the generated input signal to the CPU 901. The user of the information processing apparatus 900 can input various data to the information processing apparatus 900 and give an instruction on processing operations by operating the input device 906.

Alternatively, the input device 906 can be formed by a device that detects information about the user. Examples of the input device 906 can include various sensors such as an image sensor (for example, a camera), a depth sensor (for example, a stereo camera), an acceleration sensor, a gyro sensor, a geomagnetic sensor, an optical sensor, a sound sensor, a distance sensor, and a force sensor. Furthermore, the input device 906 may obtain information related to the state of the information processing apparatus 900 itself, such as the orientation and movement speed of the information processing apparatus 900 and information related to the ambient environment of the information processing apparatus 900, such as lightness and noise around the information processing apparatus 900. Furthermore, the input device 906 may include a global navigation satellite system (GNSS) module that receives a GNSS signal from a GNSS satellite (for example, a global positioning system (GPS) signal from a GPS satellite), thereby measuring position information including the latitude, longitude, and altitude of the device. Furthermore, regarding the position information, the input device 906 may detect the position by performing transmission/reception via Wi-Fi (registered trademark), with mobile phones, PHSs, smartphones, or the like, or through short-range communication, or the like. The input device 906 can form, for example, the input unit 110 illustrated in FIG. 2.

The output device 907 is formed of a device capable of visually or aurally notifying the user of the acquired information. Examples of such devices include display devices such as CRT display devices, liquid crystal display devices, plasma display devices, EL display devices, laser projectors, LED projectors, and lamps; voice output devices such as speakers and headphones; and printer devices. The output device 907 outputs, for example, results obtained by various processes performed by the information processing apparatus 900. Specifically, the display device visually displays the results obtained by the various processes performed by the information processing apparatus 900 in various formats, such as text, image, table, and graph. The voice output device converts an audio signal composed of reproduced audio data, acoustic data, and the like into an analog signal and aurally outputs it. The output device 907 can form, for example, the output unit 150 illustrated in FIG. 2.

The storage device 908 is a device for data storage formed as an example of a storage unit of the information processing apparatus 900. The storage device 908 is implemented by, for example, a magnetic storage unit device such as an HDD, a semiconductor storage device, an optical storage device, a magneto-optical storage device, or the like. The storage device 908 may include a storage medium, a recording device that records data in the storage medium, a reading device that reads data from the storage medium, and a deletion device that deletes data recorded in the storage medium. The storage device 908 stores programs and various data executed by the CPU 901, various data acquired from the outside, and the like. The storage device 908 can form, for example, the storage unit 140 illustrated in FIG. 2.

The drive 909 is a reader/writer for a storage medium, and is built in or externally attached to the information processing apparatus 900. The drive 909 reads information recorded in a removable storage medium such as a mounted magnetic disk, optical disk, magneto-optical disk, or semiconductor memory, and outputs the information to the RAM 903. The drive 909 can also write information to a removable storage medium.

The connection port 911 is an interface connected to an external device, and serves as a connection port to an external device capable of transmitting data by universal serial bus (USB), for example.

The communication device 913 is, for example, a communication interface formed of a communication device or the like for connecting to a network 920. The communication device 913 is, for example, a communication card for a wired or wireless local area network (LAN), Long Term Evolution (LTE), Bluetooth (registered trademark), or wireless USB (WUSB). The communication device 913 may be a router for optical communication, a router for an asymmetric digital subscriber line (ADSL), a modem for various communications, or the like. The communication device 913 can transmit and receive signals and the like according to a predetermined protocol such as TCP/IP, for example, over the Internet or with another communication device.

The network 920 is a wired or wireless transmission path of information transmitted from a device connected to the network 920. Examples of the network 920 may include the Internet, a public network such as a telephone network and a satellite communication network, various local area networks (LANs) including Ethernet (registered trademark), a wide area network (WAN), or the like. The network 920 may also include a dedicated line network such as an Internet protocol-virtual private network (IP-VPN).

Heretofore, an example of the hardware configuration capable of implementing the functions of the information processing apparatus 900 according to the present embodiment has been illustrated. Each component described above may be implemented using a general-purpose member, or may be implemented by hardware specialized for the function of each component. Therefore, it is possible to change the hardware configuration to be used as appropriate according to the technical level at the time of carrying out the present embodiment.

A computer program for implementing each function of the information processing apparatus 900 according to the present embodiment as described above can be created and implemented on a PC or the like. In addition, a computer-readable recording medium in which such a computer program is stored can be provided. Examples of the recording medium include a magnetic disk, an optical disk, a magneto-optical disk, a flash memory, and the like. Furthermore, the above-described computer program may be distributed via, for example, a network without using any recording medium.

The preferred embodiments of the present disclosure have been described in detail above with reference to the accompanying drawings, but the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

For example, each device described in the present specification may be implemented as a single device, or a part or all of the devices may be implemented as separate devices.

For example, the information processing system 100 illustrated in FIG. 2 may be implemented as a single device or may be implemented as a plurality of devices. For example, the acquisition unit 120, the control unit 130, and the storage unit 140 may be included in a server device connected to the input unit 110 and the output unit 150 installed in the physical space via a network or the like.

Furthermore, the processes described with reference to the flowcharts in the present specification are not necessarily executed in the order illustrated. Some process steps may be performed in parallel. Additional process steps may be employed, and some process steps may be omitted.

Furthermore, the advantageous effects described in the present specification are merely illustrative or exemplary and are not limiting. That is, the technology according to the present disclosure can exhibit other effects that are apparent to those skilled in the art from the description of the present specification in addition to or instead of the advantageous effects described above.

The following configurations also belong to the technical scope of the present disclosure.

(1)

An information processing apparatus comprising:

an acquisition unit that acquires three-dimensional information on a real object including one or more real objects; and a control unit that controls a method of interaction between a user and a virtual object mapped and displayed on a surface of the real object, based on the three-dimensional information on the real object.

(2)

The information processing apparatus according to (1), wherein the control unit detects, in the surface of the real object, a display surface on which the virtual object is able to be mapped and displayed.

(3)

The information processing apparatus according to (2), wherein the control unit detects the display surface based on at least one of gradient, area, color, or lightness of the surface of the real object.

(4)

The information processing apparatus according to (3), wherein the control unit classifies the display surface into a surface capable of receiving a user operation when the area is equal to or larger than a predetermined threshold, and otherwise classifies the display surface into a surface incapable of receiving the user operation.

(5)

The information processing apparatus according to (4), wherein when displaying the virtual object on the display surface incapable of receiving the user operation, the control unit displays another virtual object for receiving a user operation on the virtual object, on the display surface capable of receiving the user operation.

(6)

The information processing apparatus according to (5), wherein the control unit detects as the display surface, a first display surface with a largest area and a second display surface other than the first display surface, and displays on the first display surface, another virtual object for receiving a user operation on the virtual object displayed on the second display surface.

(7)

The information processing apparatus according to any one of (2) to (6), wherein when a user operation for designating the display surface as a movement destination and moving the virtual object is performed, the control unit displays the virtual object on the display surface designated.

(8)

The information processing apparatus according to any one of (2) to (7), wherein when a user operation for designating a movement direction of the virtual object is performed, the control unit displays the virtual object on the display surface in the movement direction.

(9)

The information processing apparatus according to (8), wherein the control unit detects as the display surface, a first display surface having a largest area and a second display surface other than the first display surface, and selects as a movement destination of the virtual object, an application corresponding to another existing display object displayed on the display surface or the second display surface.

(10)

The information processing apparatus according to (8) or (9), wherein the control unit determines based on an area, gradient, color, or lightness of the display surface as a determination target and an area, color, or content of the virtual object as a movement target, whether the virtual object as the movement target is able to be moved to the display surface as the determination target.

The information processing apparatus according to any one of (2) to (10), wherein the control unit applies coordinate correction corresponding to gradient of the display surface as a movement destination, to the virtual object.

(12)

The information processing apparatus according to any one of (2) to (11), wherein the control unit changes an internal layout of the virtual object according to an area or a shape on the display surface as a movement destination.

(13)

The information processing apparatus according to any one of (2) to (12), wherein the control unit applies color correction based on a color of the display surface as a movement destination, to the virtual object.

(14)

The information processing apparatus according to any one of (2) to (13), wherein the control unit displays, when a predetermined user operation is performed after the virtual object has been moved in response to a user operation for moving the virtual object, the virtual object at a position of the virtual object before being moved.

(15)

The information processing apparatus according to any one of (2) to (14), wherein the control unit maps and displays, based on relative relationship between a first real object and a second real object, a virtual object corresponding to the second real object on a display surface that is a surface of the first real object.

(16)

The information processing apparatus according to (15), wherein the control unit displays the virtual object corresponding to the second real object positioned in a direction from the display surface opposite to the user, on the display surface that is a surface on side of the user among surfaces of the first real object.

(17)

The information processing apparatus according to (15) or (16), wherein the control unit controls displaying of the virtual object based on an orientation of the first real object.

(18)

The information processing apparatus according to (17), wherein the control unit displays the virtual object that is a three-dimensional model of the second real object, and enlarges and reduces the three-dimensional model based on an amount of rotation about a perpendicular line on the display surface.

(19)

The information processing apparatus according to (17) or (18), wherein the control unit displays the virtual object that is a three-dimensional model of the second real object, and changes an orientation of the three-dimensional model based on relative orientations of the second real object and the display surface.

(20)

The information processing apparatus according to any one of (15) to (19), wherein the control unit controls displaying of the virtual object based on a distance between the first real object and the second real object.

(21)

The information processing apparatus according to any one of (15) to (20), wherein the control unit controls displaying of the virtual object based on a type of a marker provided on the first real object.

(22)

The information processing apparatus according to any one of (15) to (21), wherein the control unit controls displaying of the virtual object based on relative relationship between a first marker and a second marker provided on the first real object.

(23)

The information processing apparatus according to (22), wherein the first real object is capable of being deformed by bending, and the control unit controls displaying of the virtual object based on relative orientations of the first marker and the second marker changed by the first real object being deformed by bending.

(24)

The information processing apparatus according to (22) or (23), wherein the control unit controls displaying of the virtual object based on whether the first marker and the second marker are on same plane.

(25)

The information processing apparatus according to (24), wherein the control unit controls displaying of the virtual object based on the second marker covered by a third real object.

(26)

The information processing apparatus according to (24) or (25), wherein the control unit controls displaying of the virtual object based on the second marker being overlaid on the first maker.

(27)

The information processing apparatus according to any one of (15) to (26), wherein the control unit maps and displays on a surface of the first real object, a virtual object corresponding to another virtual object displayed on a surface of the second real object.

(28)

The information processing apparatus according to any one of (15) to (27), wherein the control unit displays information instructing the user to change a position or an orientation of the first real object.

(29)

An information processing method executed by a processor, the method comprising:

acquiring three-dimensional information on a real object including one or more real objects; and controlling a method of interaction between a user and a virtual object mapped and displayed on a surface of the real object, based on the three-dimensional information on the real object.

(30) A program causing a computer to function as:

an acquisition unit that acquires three-dimensional information on a real object including one or more real objects; and a control unit that controls a method of interaction between a user and a virtual object mapped and displayed on a surface of the real object, based on the three-dimensional information on the real object.

REFERENCE SIGNS LIST

10 TABLE
10 REAL OBJECT
20 DISPLAY OBJECT
30 REAL SPACE
100 INFORMATION PROCESSING SYSTEM
110 INPUT UNIT
120 ACQUISITION UNIT
121 SPATIAL INFORMATION ACQUISITION UNIT
122 USER INFORMATION ACQUISITION UNIT
130 CONTROL UNIT
131 DISPLAY SURFACE MANAGEMENT UNIT
132 DISPLAY CONTROL UNIT
140 STORAGE UNIT
150 OUTPUT UNIT

The invention claimed is:

1. An information processing apparatus, comprising: circuitry configured to:
    acquire three-dimensional information of a plurality of real objects;
    detect a first display surface in a surface of a first real object of the plurality of real objects;
    detect a second display surface in a surface of a second real object of the plurality of real objects;
    classify, based on an area of the surface of the first real object, the first display surface into a first surface capable to receive a first user operation, wherein the area of the surface of the first real object is equal to or greater than a threshold value;
    classify, based on an area of the surface of the second real object, the second display surface into a second surface incapable to receive the first user operation, wherein the area of the surface of the second real object is less than the threshold value;
    map and display a first virtual object on the second display surface;
    display a second virtual object on the first display surface based on the display of the first virtual object on the second display surface, the classification of the first display surface, and the classification of the second display surface; and
    control a method of interaction between a user and the second virtual object based on the three-dimensional information of the plurality of real objects.

2. The information processing apparatus according to claim 1, wherein the circuitry is further configured to detect the first display surface based on at least one of a gradient, the area, a color, or lightness of the surface of the first real object.

3. The information processing apparatus according to claim 1, wherein the circuitry is further configured to:
    detect the first display surface having a largest area among a plurality of display surfaces of the plurality of real objects; and
    display, on the first display surface, the second virtual object for reception of the first user operation on the first virtual object displayed on the second display surface.

4. The information processing apparatus according to claim 1, wherein
    the circuitry is further configured to display the second virtual object on the first display surface based on a second user operation, and
    the second user operation is for designation of the first display surface as a movement destination and a movement of the second virtual object.

5. The information processing apparatus according to claim 4, wherein the circuitry is further configured to apply coordinate correction corresponding to a gradient of the first display surface as the movement destination, to the second virtual object.

6. The information processing apparatus according to claim 4, wherein the circuitry is further configured to change an internal layout of the second virtual object based on one of an area or a shape of the first display surface as the movement destination.

7. The information processing apparatus according to claim 4, wherein the circuitry is further configured to apply color correction based on a color of the first display surface as the movement destination, to the second virtual object.

8. The information processing apparatus according to claim 1, wherein the circuitry is further configured to display the second virtual object on the first display surface in a movement direction of the second virtual object based on a second user operation for designation of the movement direction.

9. The information processing apparatus according to claim 8, wherein the circuitry is further configured to:
    detect the first display surface having a largest area among a plurality of display surfaces of the plurality of real objects; and
    select, as a movement destination of the second virtual object, an application corresponding to a display object displayed on one of the first display surface or the second display surface.

10. The information processing apparatus according to claim 8, wherein the circuitry is further configured to determine the second virtual object is movable to the first display surface based on
    an area, a gradient, a color, or lightness of the first display surface as a determination target, and
    an area, a color, or content of the second virtual object as a movement target.

11. The information processing apparatus according to claim 1, wherein
    the circuitry is further configured to display, based on a movement of the second virtual object, the second virtual object at a position of the second virtual object,
    the position of the second virtual object is before the movement of the second virtual object, and
    the movement of the second virtual object is based on a second user operation.

12. The information processing apparatus according to claim 1, wherein the circuitry is further configured to map and display, based on a relative relationship between a third real object of the plurality of real objects and the second real object, a third virtual object corresponding to the second real object on a third display surface of the third real object.

13. The information processing apparatus according to claim 12, wherein
  circuitry is further configured to display the third virtual object corresponding to the second real object, on the third display surface that is a specific surface on a side of the user among surfaces of the third real object, and
  the second real object is in a direction from the third display surface opposite to the user.

14. The information processing apparatus according to claim 12, wherein the circuitry is further configured to control the display of the third virtual object based on an orientation of the third real object.

15. The information processing apparatus according to claim 14, wherein the circuitry is further configured to:
  display the third virtual object that is a three-dimensional model of the second real object; and
  one of enlarge or reduce the three-dimensional model based on an amount of rotation about a perpendicular line on the third display surface.

16. The information processing apparatus according to claim 14, wherein the circuitry is further configured to:
  display the third virtual object that is a three-dimensional model of the second real object; and
  change an orientation of the three-dimensional model based on relative orientations of the second real object and the third display surface.

17. The information processing apparatus according to claim 12, wherein the circuitry is further configured to control the display of the third virtual object based on a distance between the third real object and the second real object.

18. The information processing apparatus according to claim 12, wherein the circuitry is further configured to control the display of the third virtual object based on a type of a marker on the third real object.

19. The information processing apparatus according to claim 12, wherein the circuitry is further configured to control the display of the third virtual object based on a relative relationship between a first marker and a second marker on the third real object.

20. The information processing apparatus according to claim 19, wherein
  the third real object is deformable based on a bending process,
  circuitry is further configured to control the display of the third virtual object based on a change in relative orientations of the first marker and the second marker, and
  the change in the relative orientations of the first marker and the second marker is based on the deformation of the third real object.

21. The information processing apparatus according to claim 19, wherein the circuitry is further configured to control the display of the third virtual object based on the first marker and the second marker that are on a same plane.

22. The information processing apparatus according to claim 21, wherein the circuitry is further configured to control the display of the third virtual object based on the second marker covered by a fourth real object of the plurality of real objects.

23. The information processing apparatus according to claim 21, wherein the circuitry is further configured to control the display of the third virtual object based on the second marker that is overlaid on the first marker.

24. The information processing apparatus according to claim 12, wherein the circuitry is further configured to map and display on the third display surface of the third real object, a fourth virtual object corresponding to a fifth virtual object displayed on the surface of the second real object.

25. The information processing apparatus according to claim 12, wherein the circuitry is further configured to display information that instructs the user to change one of a position or an orientation of the third real object.

26. An information processing method executed by a processor, the information processing method comprising:
  acquiring three-dimensional information of a plurality of real objects;
  detecting a first display surface in a surface of a first real object of the plurality of real objects;
  detecting a second display surface in a surface of a second real object of the plurality of real objects;
  classifying, based on an area of the surface of the first real object, the first display surface into a first surface capable to receive a user operation,
    wherein the area of the surface of the first real object is equal to or greater than a threshold value;
  classifying, based on an area of the surface of the second real object, the second display surface into a second surface incapable to receive the user operation,
    wherein the area of the surface of the second real object is less than the threshold value;
  mapping and displaying a first virtual object on the second display surface;
  displaying a second virtual object on the first display surface based on the display of the first virtual object on the second display surface, the classification of the first display surface, and the classification of the second display surface; and
  controlling a method of interaction between a user and the second virtual object based on the three-dimensional information of the plurality of real objects.

27. A non-transitory computer-readable medium having stored thereon computer-executable instructions that, when executed by a processor, cause the processor to execute operations, the operations comprising:
  acquiring three-dimensional information of a plurality of real objects;
  detecting a first display surface in a surface of a first real object of the plurality of real objects;
  detecting a second display surface in a surface of a second real object of the plurality of real objects;
  classifying, based on an area of the surface of the first real object, the first display surface into a first surface capable to receive a user operation,
    wherein the area of the surface of the first real object is equal to or greater than a threshold value;
  classifying, based on an area of the surface of the second real object, the second display surface into a second surface incapable to receive the user operation,
    wherein the area of the surface of the second real object is less than the threshold value;
  mapping and displaying a first virtual object on the second display surface;
  displaying a second virtual object on the first display surface based on the display of the first virtual object on the second display surface, the classification of the first display surface, and the classification of the second display surface; and
  controlling a method of interaction between a user and the second virtual object based on the three-dimensional information of the plurality of real objects.

* * * * *